US012756575B1

(12) United States Patent
Kaliski, Jr. et al.

(10) Patent No.: US 12,756,575 B1
(45) Date of Patent: Oct. 6, 2026

(54) METHODS AND SYSTEMS FOR GENERATING CONDENSED SIGNATURES FOR AN EVOLVING DATA SERIES AND APPLICATIONS THEREOF

(71) Applicant: VeriSign, Inc., Reston, VA (US)

(72) Inventors: Burton S. Kaliski, Jr., McLean, VA (US); Andrew Fregly, Reston, VA (US); Joseph Harvey, Clifton, VA (US); Swapneel Sheth, Fairfax, VA (US)

(73) Assignee: VeriSign, Inc., Reston, VA (US)

( * ) Notice: Subject to any disclaimer, the term of this patent is extended or adjusted under 35 U.S.C. 154(b) by 334 days.

(21) Appl. No.: 18/137,992

(22) Filed: Apr. 21, 2023

Related U.S. Application Data

(60) Provisional application No. 63/429,093, filed on Nov. 30, 2022, provisional application No. 63/416,909,
(Continued)

(51) Int. Cl.
*H04L 9/32* (2006.01)

(52) U.S. Cl.
CPC .......... *H04L 9/3247* (2013.01); *H04L 9/3236* (2013.01)

(58) Field of Classification Search
CPC ............................ H04L 9/3247; H04L 9/3236
See application file for complete search history.

(56) References Cited

U.S. PATENT DOCUMENTS 10,009,181 B2 6/2018 Kaliski, Jr. et al.
10,116,450 B1 * 10/2018 Brown .................. H04L 9/3239
(Continued)

FOREIGN PATENT DOCUMENTS

CN 110602239 A * 12/2019 ......... H04L 67/1097
WO WO-2019093574 A1 5/2019
(Continued)

OTHER PUBLICATIONS

Kaliski, B., "Merkle Tree Ladder Mode: Reducing the Size Impact of NIST PQC Signature Algorithms in Practice", NIST Fourth PQC Standardization Conference, Dec. 2022, pp. 1-32 https://csrc.nist.gov/Presentations/2022/merkle-tree-ladder-mode.

Kaliski, B., Fregly, A., Harvey, J., Sheth, S., "Merkle Tree Ladder Mode: Reducing the Size Impact of NIST PQC Signature Algorithms in Practice", Video courtesy of RSA Conference, Apr. 2023, pp. 1-38.

(Continued)

*Primary Examiner* — Javier O Guzman
(74) *Attorney, Agent, or Firm* — Lee & Hayes, P.C.

(57) ABSTRACT

A computer-implemented method for forming a data structure is provided. The method includes generating, by a signer, a hash-based data authentication structure and selecting a first strategy. The first strategy includes a process for updating a first data structure. The method further includes forming, by the signer, the first data structure according to the first strategy. The first data structure includes one or more node hash values from the hash-based data authentication structure and is configured for verifying digital signatures relative to the hash-based data structure. The method further includes publishing the first data structure for access by a verifier configured to determine whether the first data structure is capable of verifying a digital signature and to either: use the first data structure to verify the digital signature or access a subsequently published second data structure that has been updated according to the first strategy to verify the digital signature.

20 Claims, 7 Drawing Sheets

Related U.S. Application Data filed on Oct. 17, 2022, provisional application No. 63/406,699, filed on Sep. 14, 2022, provisional application No. 63/356,973, filed on Jun. 29, 2022.

(56) References Cited

U.S. PATENT DOCUMENTS

| | | | | |
|---|---|---|---|---|
| 10,153,905 | B2 | 12/2018 | Kaliski, Jr. | |
| 11,025,407 | B2 * | 6/2021 | Kaliski, Jr. | H04L 9/3239 |
| 2006/0005028 | A1 * | 1/2006 | Labaton | H04L 63/0442 713/176 |
| 2013/0055369 | A1 * | 2/2013 | Kumar | H04L 9/3247 726/7 |
| 2014/0181984 | A1 * | 6/2014 | Kundu | G06F 21/64 726/26 |
| 2017/0272250 | A1 * | 9/2017 | Kaliski, Jr. | H04L 9/3239 |
| 2018/0159689 | A1 * | 6/2018 | Keuffer | H04L 9/3221 |
| 2020/0364911 | A1 * | 11/2020 | Benzakour | G06V 30/422 |
| 2021/0184864 | A1 * | 6/2021 | Wentz | H04L 9/3218 |
| 2023/0179409 | A1 * | 6/2023 | Camenisch | H04L 9/0819 713/171 |
| 2024/0380856 | A1 * | 11/2024 | Unuchek | G06F 21/32 |

FOREIGN PATENT DOCUMENTS

| | | | | |
|---|---|---|---|---|
| WO | WO-2022002428 A1 * | 1/2022 | | H04L 9/0861 |
| WO | WO-2022140400 A1 * | 6/2022 | | H04L 9/50 |

OTHER PUBLICATIONS

Katz, J.: Analysis of a Proposed Hash-Based Signature Standard. In: Chen, L., McGrew, D., Mitchell, C. (eds) Security Standardisation Research. SSR 2016. LNCS, vol. 10074. Springer, Cham (2016). https://doi.org/10.1007/978-3-319-49100-4_12.

Khaburzaniya, I., Chalkias, K., Lewi, K., Malvai, H .: Aggregating and thresholdizing hash-based signatures using STARKs. In: Proceedings of the 2022 ACM on Asla Conference on Computer and Communications Security, pp. 393-407. ACM, New York (2022). https://doi.org/10.1145/3488932.3524128.

Kolbl, S., Lauridsen, L., Mendel, F., Rechberger, C., Efficient Short-Input Hashing for Post-Quantum Applications, in IACR Transactions on Symmetric Cryptology vol. 2016, No. 2, pp. 1-29, DOI 10.13154/tosc.v2016.i2.1-29, 2017.

Kudinov, M., Ronen, Hülsing, A., E. Yogev, E., SPHINCS+C: Compressing SPHINCS+ With (Almost) No Cost, In: Cryptology ePrint Archive, Paper 2022/778, https://eprint.iacr.org/2022/778, last accessed Nov. 18, 2022.

Lozano, G., Icann, "Registry Data Escrow Specification", Nov. 2020, https://datatracker/ietf.org/doc/html/rfc8909.

Merkle, R.: Secrecy, Authentication, and Public Key Systems. Ph.D. thesis, Stanford University (1979). http://www.ralphmerkle.com/papers/Thesis1979.pdf, last accessed Feb. 13, 2023.

Migration to Post-Quantum Cryptography. NIST National Cybersecurity Center of Excellence. https://www.nccoe.nist.gov/crypto-agility-considerations-migrating-post-quantum-cryptographic-algorithms, last accessed Feb. 16, 2023.

Mockapetris, P.: RFC 1034, Domain Names—Concepts and Facilities. IETF (1987). https://doi.org/10.17487/RFC1034.

Moody, D., "NIST Status Update on the 3rd Round", "NIST 3rd PQC Standardization Conference", Jun. 2021, https://csrc.nist.gov/CSRC/media/Presentations/status-update-on-the-3rd-round/images-media/session-1-moody-nist-round-3-update.pdf.

Moody, D., "The Beginning to the End: The First NIST PQC Standards", PKC 2022, Mar. 8-11, 2022, Mar. 8, 2022, https://csrc.nist.gov/csrc/media/Presentations/2022/the-beginning-of-the-end-the-first-nist-pqo-standa/images-media/pkc2022-march2022-moody.pdf.

Moriarty, K., B. Kaliski, J. Jonsson et al. PKCS #1: RSA Cryptography Specifications Version 2.2. IETF RFC 8017, DOI 10.17487/RFC8017, Nov. 2016. https://www.rfc-editor.org/info/rfc8017.

Mosca, M., Piani, M., "Quantum Threat Timeline Report 2020," https://globalriskinstitute.org/download/quantum-threat-timeline-report-2020/.

Mosca, M., Piani, M., "Quantum Threat Timeline Report 2022", Global Risk Institute, Dec. 2022, https://globalriskinstitute.org/mp-files/2022-quantum-threat-timeline-report-dec.pdf/.https://globalriskinstitute.org/mp-files/2022-quantum-threat-timeline-report-dec.pdf/.

National Institute of Standards and Technology (NIST), "SP 800-131A Transitioning the Use of Cryptographic Algorithms and Key Lengths", Mar. 2019, https://nvipubs.nist.gov/nistpubs/SpecialPublications/NIST.SP.800-131Ar2.pdf.

National Security Agency. Announcing the Commercial National Security Algorithm Suite 2.0. Sep. 2022, pp. 1-10. https://media.defense.gov/2022/Sep/07/2003071834/-1/-1/0/CSA_CNSA_2.0_ALGORITHMS_.PDF, last accessed Feb. 13, 2023.

NIST (National Institute of Standards and Technology), "SP 800-57 Recommendation for Key Management: Part 1—General", Oct. 2020, https://nvlpubs.nist.gov/nistpubs/SpecialPublications/NIST.SP.800-57pt1r5.pdf.

NIST CSRC, "PQC Standardization Process: Announcing Four Candidates to be Standardized, Plus Fourth Round Candidates", NIST, Jul. 5, 2022, https://csrc.nist.gov/news/2022/pqc-candidates-to-be-standardized-and-round-4.

Orman, H., Internet Security and Quantum Computing, Dec. 2021, https://eprint/iacr.org/2021/1637.pdf.

Post-Quantum Cryptography Standardization. NIST. https://csrc.nist.gov/projects/post-quantum-cryptography/post-quantum-cryptography-standardization. Accessed Sep. 12, 2022.

Rescorla, D., "The Transport Layer Security Protocol Version 1.3", RFC 8446, DOI 10.17487/RFC8446, Aug. 2018, https://www.rfc-editor.org/info/rfc8446.

RFC 4523—The Secure Shell (SSH) Transport Layer Protocol.

RFC 5734—Extensible Provisioning Protocol (EPP) Transport over TCP.

RFC 6698—The DNS-Based Authentication of Named Entities (DANE) Transport Layer Security (TLS) Protocol.

RFC 6781—DNSSEC Operational Practices, Version 2. IETF.

RFC 7481—Security Services for the Registration Data Access Protocol (RDAP).

RFC 7525—Recommendations for Secure Use of Transport Layer Security (TLS) and Datagram Transport Layer Security (DTLS).

RFC 8162—Using Secure DNS to Associate Certificates with Domain Names for S/MIME.

RFC 8247—Algorithm Implementation Requirements and Usage Guidance for the Internet Key Exchange Protocol Version 2 (IKEv2).

RFC 8301—Cryptographic Algorithm and Key Usage Update to DomainKeys Identified Mail (DKIM).

RFC 8310—Usage Profiles for DNS over TLS and DNS over DTLS.

RFC 8332—Use of RSA Keys with SHA-256 and SHA-512 in the Secure Shell (SSH) Protocol.

Fregly, Andrew, Projecting Impact of Post Quantum Cryptography on Registry Operations, ROW11—Jun. 21, 2022.

Fregly, Andrew, Projecting Impact of Post-Quantum Cryptography on Registry Operations, CENTR Workshop, May 31, 2023.

Shor, P.W., "Polynomial time algorithms for prime factorization and discrete logarithms on a quantum computer," SIAM Review 41.2 (1999): 303-332.

Sikeridis, D., Huntley, S., Ott, D., Devetsikiotis, M.: Intermediate certificate suppression in post-quantum TLS: An approximate membership querying approach, In: CoNEXT '22: Proceedings of the 18th International Conference on Emerging Networking Experiments and Technologies, pp. 35-42. ACM (2022). https://dl.acm.org/doi/abs/10.1145/3555050.3569127.

Sloane, N.J.A. The ruler function: 2^a(n) divides 2n. Or, a(n)=2-adic valuation of 2n. Entry A001511 in The On-Line Encyclopedia of Integer Sequences. https://oeis.org/A001511. Accessed Oct. 11, 2022.

Sloane, N.J.A. and A. Wilks. a(n)=a(floor(n/2))+n; also denominators in expansion of 1/sqrt(1-x) are 2^a(n); also 2n−number of 1's in

(56) References Cited

OTHER PUBLICATIONS binary expansion of 2n. Entry A005187 in The On-Line Encyclopedia of Integer Sequences. https://oeis.org/A005187. Accessed Oct. 11, 2022.

SPHINCS+: Stateless Hash-Based Signatures. https://sphincs.org/. Accessed Sep. 12, 2022.

Submission Requirements and Evaluation Criteria for the Post-Quantum Cryptography Standardization Process, NIST, https://csrc.nist.gov/CSRC/media/Projects/Post-Quantum-Cryptography/documents/call-for-proposals-final-Dec. 2016. pdf, last accessed Feb. 13, 2023.

Sury, O., "DNS Flag Day 2020", Sep. 2020, https://www.isc.org/blogs/dns-flag-day-2020-2.Work in Progress, Internet-Draft, draft-ietf-dnsop-avoid-fragmentation-05, Jun. 2021, https://datatracker/ietf.org/doc/draft-ietf-dnsop-avoid-fragmentation/.

Todd, P. Merkle Mountain Ranges. 2012. https://github.com/opentimestamps/opentimestamps-server/blob/master/doc/merkle-mountain-range.md. Accessed Oct. 11, 2022.

Andy Fregly to pqc-forum@list.nist.gov , "RE: Request for feedback on possible SPHINCS+ variant", Jan. 5, 2023, https://groups.google.com/a/list.nist.gov/g/pqc-forum/c/LUczQNCw7HA/m/165HGBZ5AgAJ—comments on the ability of MTL mode in "batch" mode to reduce the number of underlying signature operations.

Burt Kaliski to pqc-forum@list.nist.gov, "RE: Request for feedback on possible SPHINCS+ variant", Jan. 13, 2023, https://groups.google.com/a/list.nist.gov/g/pqc-forum/c/LUczQNCw7HA/m/9GovatAOBQAJ—confirms Verisign's intent to address questions about intellectual property "if and as we promote MTL mode as a candidate for standardization".

Burt Kaliski to cfrg@ietf.org, "Re: [CFRG] FW: New Version Notification for draft-harvey-cfrg-mtl-mode-00.txt", Jul. 25, 2023, https://mailarchive.ietf.org/arch/msg/cfrg/OX6cbbAgbaVE8wFI8Q|Gt1_bwWQ/—responds to a question about how MTL mode would be used with DNSSEC, in connection with a question about intellectual property.

Joe Harvey to cfrg@ietf.org. "[CFRG] FW: New Version Notification for draft-harvey-cfrg-mtl-mode-00.txt", Jul. 21, 2023, https://mailarchive.ietf.org/arch/msg/cfrg/9BILaWo1CS_64Fs29JQX4GdUVRc/—forwards an announcement of the publication of the MTL mode Internet-Draft.

Joe Harvey to cfrg@ietf.org. "Re: [CFRG] FW: New Version Notification for draft-harvey-cfrg-mtl-mode-00.txt", Jul. 28, 2023, https://mailarchive.letf.org/arch/msg/cfrg/Hnkw99CUj7nk__1tQ5J3it9ft_8/—responds to a question about the benefits of MTL mode.

Burt Kaliski, "Next Steps in Preparing for Post-Quantum DNSSEC", Verisign blog, Jul. 20, 2023, https://blog.verisign.com/security/post-quantum-dnssec-preparation/—provides an overview of MTL mode and announces the MTL mode Internet-Draft and IPR disclosure.

David Benjamin, Devon O'Brien , Bas Westerbaan, "Merkle Tree Certificates for TLS", Internet-Draft, https://datatracker.ietf.org/doc/draft-davidben-tis-merkle-tree-certs/00/, Mar. 10, 2023; updated version, https://datatracker.letf.org/doc/draft-davidben-tls-merkle-tree-certs/01/, Sep. 8, 2023—proposes the use of Merkle trees "as a size optimization over more conventional mechanisms with post-quantum signatures".

A. Fregly and R. van Rijswijk-Delj, Stateful Hash-Based Signatures for DNSSEC <https://datatracker.letf.org/doc/draft-afrvrd-dnsop-stateful-hbs-for-dnssec/>, Internet-Draft, 2022.

A. Huelsing et al., XMSS: <https://www.rfc-editor.org/info/rfc8391>eXtended <https://www.rfc-editor.org/info/rfc8391> Merkle Signature Scheme <https://www.rfc-editor.org/info/rfc8391>, RFC 8391, May 2018.

B. Kaliski, Securing the DNS in a Post-Quantum World: Hash-Based Signatures and Synthesized Zone Signing Keys, Jan. 2021, https://blog.verisign.com/security/securing-the-dns-in-a-post-quantum-world-hash-based-signatures-and-synthesized-zone-signing-keys/.

D. McGrew, M. Curcio and S. Fluhrer. Leighton—<https://www.rfc-editor.org/info/rfc8554>Micali <https://www.rfc-editor.org/info/rfc8554> Hash-Based Signatures <https://www.rfc-editor.org/info/rfc8554>. RFC 8554, Apr. 2019.

F. Li et al,. Proof-Infused Streams: Enabling Authentication of Sliding Window Queries on Streams <http://hadjieleftheriou.com/papers/vldb07.pdf>, VLDB 2007, Sep. 2007.

G.J. Beernink, Taking the Quantum Leap: Preparing DNSSEC for Post Quantum Cryptography <http://essay.utwente.nl/89509/1/Beemink_MA_EEMCS.pdf>, M.Sc. Thesis, U. Twente, 2022.

J. Jansen, Use of SHA-2 Algorithms with RSA in DNSKEY and RRSIG Resource Records for DNSSEC <https://www.rfc-editor.org/info/rfc5702>, RFC 5702, Oct. 2009.

M. Müller et al., Retrofitting Post-Quantum Cryptography in Internet Protocols: A Case Study of DNSSEC <https://dl.acm.org/doi/10.1145/3431832.3431838>, ACM SIGCOMM CCR, 2020.

M. Müller, Making DNSSEC Future Proof <https://research.utwente.nl/en/publications/making-dnssec-future-proof>, Ph.D. Thesis, U. Twente, 2021.

O. Sury and R. Edmonds, Edwards-Curve Digital Security Algorithm ( <https://www.rfc-editor.org/info/rfc8080>EdDSA <https://www.rfc-editor.org/info/rfc8080>) for DNSSEC <https://www.rfc-editor.org/info/rfc8080>, RFC 8080, Feb. 2017.

P. Hoffman and W.C.A. Wijngaards, Elliptic Curve Digital Signature Algorithm (DSA) for DNSSEC <https://www.rfc-editor.org/info/rfc6605>, RFC 6605, Apr. 2012.

P. Hoffman, Quantum Computing and the DNS <https://www.icann.org/en/system/files/files/octo-031-11feb22-en.pdf>, ICANN OCTO-031, 2022.

P. Wouters and O. Sury, Algorithm Implementation Requirements and Usage Guidance for DNSSEC <https://www.rfc-editor.org/info/rfc8624>, RFC 8624, Jun. 2019.

R. C. Merkle, "A Digital Signature Based on a Conventional Encryption Function", Advances in Cryptology—CRYPTO '87. Lecture Notes in Computer Science. vol. 293, doi:10.1007/3-540-48184-2_32, ISBN 978-3-540-18796-7.

S. Jafarli, Providing DNS Security in Post-Quantum Era with Hash-Based Signatures <http://essay.utwente.nl/89552/>, M.Sc. Thesis, U. Twente, 2022.

Verisign IDF 2021-3508 <https://verisign.lecorpio.com/Runtime/EntityObject.aspx?TypeId=fce3012f-6660-489d-b174-53a05e5bb4d2&Objectid=40cef332-7da4-41c6-8706-79250ace544a&AddToNavigationHistory=true&DashboardID=9bbc9031-4583-45fe-9c88-5757f1cde6bf>, Flattened Signatures Extension to Synthesized Zone-Signing Keys Approach.

U.S. Appl. No. 18/137,966, filed Apr. 21, 2023.

U.S. Appl. No. 18/219,522, filed Jul. 7, 2023.

Bradner, S., et al., Intellectual Propery Rights In IETF Technology:, BCP 79, RFC 8179, DOI 10.17487/RFC8179, May 2017, https://www.rfc-editor.org/info/rfc8179.

Eastlake, D., et al., "Randonmess Requirements for Security," BCP 106, RFC 4086, DOI 10.17487/RFC4086, https://www.rfc-editor.org/info/rfc4086.

Leiba, B., "Ambuigity of Uppercase vs Lowercase in RFC 2119 Key Words," BCP 14, RFC 8174, DOI 10.17487/RFC8174, May 2017, https://www.rfc-editor/og/info/rfc 8174.

Post-Quantum Cryptography Standardization. NIST. https://csrc.nist.gov/projects/post-quantum-cryptography/post-quantum-cryptography-standardization. Accessed Oct. 11, 2022.

Alagic, G., D. Apon, D. Cooper et al. NIST IR 8413-upd1: Status Report on the Third Round of the NIST Post-Quantum Cryptography Standardization Process. NIST, Jul. 2022; includes updates as of Sep. 26, 2022. https://doi.org/10.6028/NIST.IR.8413-upd1.

Cooper, D.A., D. Apon, Q.H. Dang et al. NIST Special Publication 800-208: Recommendation for Stateful Hash-Based Signature Schemes. NIST, Oct. 2020. https://doi.org/10.6028/NIST.SP.800-208.

National Security Agency. Announcing the Commercial National Security Algorithm Suite 2.0. Sep. 2022. https://media.defense.gov/2022/Sep/07/2003071834/-1/-1/0/CSA_CNSA_2.0_ALGORITHMS_.PDF. Accessed Oct. 11, 2022.

(56) References Cited

OTHER PUBLICATIONS

Migration to Post-Quantum Cryptography. NIST National Cybersecurity Center of Excellence. https://www.nccoe.nist.gov/crypto-agility-considerations-migrating-post-quantum-cryptographic-algorithms. Accessed Oct. 11, 2022.

Wouters, P. and O. Sury. Algorithm Implementation Requirements and Usage Guidance for DNSSEC. IETF RFC 8624, DOI 10.17487/RFC8624, Jun. 2019. https://www.rfc-editor.org/info/rfc8624.

Cooper, D., Santesson, S., Farrell, S., Boeyen, S., Housley, R., Polk, W.: RFC 5280, Internet X.509 Public Key Infrastructure Certificate and Certificate Revocation List (CRL) Profile. IETF (2008). https://doi.org/10.17487/RFC5280.

Arends, R., Austein, R., Larson, M., Massey, D., Rose, S.: DNS Security Introduction and Requirements. IETF (2005). https://doi.org/10.17487/RFC4033.

Laurie, B., E. Messeri and R. Stradling. Certificate Transparency Version 2.0. IETF RFC 9162, DOI 10.17487/RFC9162, Dec. 2021. https://www.rfc-editor.org/info/rfc9162.

Merkle, R. Secrecy, Authentication, and Public Key Systems. Ph.D. thesis, Stanford University, 1979.

FIPS PUB 81: DES Modes of Operation. National Bureau of Standards, U.S. Department of Commerce, Dec. 2, 1980. https://doi.org/10.6028/NBS.FIPS.81.

Abe, M., M. Chase, B. David et al. Constant-size structure-preserving signatures: Generic constructions and simple assumptions. Journal of Cryptology 29(4):833-878. Springer, 2016. https://doi.org/10.1007/s00145-015-9211-7.

Yuan, Q., M. Tibouchi and M. Abe. Security notions for stateful signature schemes. IET Information Security 16 (1):1-17. Wiley Online Library, 2022. https://doi.org/10.1049/ise2.12040.

Stern, J., D. Pointcheval, J. Malone-Lee and N.P. Smart. Flaws in applying proof methodologies to signature schemes. In Advances in Cryptology—CRYPTO 2002, pp. 93-110. Springer, 2002. https://doi.org/10.1007/3-540-45708-9_7.

Decker, C., Wattenhofer, R.: Bitcoin transaction malleability and MtGox. In: Kuty?owski, M., Vaidya, J. (eds.) Computer Security—ESORICS 2014, LNCS, vol. 8173, pp. 313-326. Springer, Cham (2014). https://doi.org/10.1007/978-3-319-11212-1_18.

Bai, S., L. Ducas, E. Kiltz, et al. Crystals—Dilithium Algorithm Specifications and Supporting Documentation (Version 3.1). Feb. 8, 2021. https://pq-crystals.org/dilithium/data/dilithium-specification-round3-20210208.pdf. Accessed Oct. 11, 2022.

Fouque P.-A., J. Hoffstein, P. Kirchner, et al. Falcon: Fast-Fourier Lattice-based Compact Signatures over NTRU Specification v1.2. Jan. 10, 2020. https://falcon-sign.info/falcon.pdf. Accessed Oct. 11, 2022.

Aumasson, J.-P., D.J. Bernstein, W. Beullens, et al. SPHINCS+ Submission to the NIST post-quantum project, v.3.1. Jun. 10, 2022. https://sphincs.org/data/sphincs+-r3.1-specification.pdf. Accessed Oct. 11, 2022.

McGrew, D., M. Curcio and S. Fluhrer. Leighton-Micall Hash-Based Signatures. IETF RFC 8554, DOI 10.17487/RFC8554, Apr. 2019. https://www.rfc-editor.org/info/rfc8554.

Huelsing, A., D. Butin, S. Gazdag et al. XMSS: extended Merkle Signature Scheme. IETF RFC 8391, DOI 10.17487/RFC8391, May 2018. https://www.rfc-editor.org/info/rfc8391.

Barker, W., Polk, W., Souppaya, M.: Getting Ready for Post-Quantum Cryptography: Exploring Challenges Associated with Adopting and Using Post-Quantum Cryptographic Algorithms, NIST Cybersecurity White Paper, Apr. 28, 2021. https://doi.org/10.6028/NIST.CSWP.04282021.

Driscoll, F.: Terminology for Post-Quantum Traditional Hybrid Schemes,. https://datatracker.ietf.org/doc/draft-driscoll-pqt-hybrid-terminology, last accessed Oct. 18, 2022. Work in progress.

Champine, L.: Streaming Merkle Proofs within Binary Numeral Trees. In: Cryptology ePrint Archive, Paper 2021/038. https://eprint.iacr.org/2021/038, last accessed Oct. 18, 2022.

Crosby, S., Wallach, D.: Efficient data structures for tamper-evident logging. In Proceedings of the 18th USENIX Security Symposium, pp. 317-334. USENIX Association (2009). https://dl.acm.org/doi/abs/10.5555/1855768.1855788.

Todd, P.: Merkle Mountain Ranges, https://github.com/opentimestamps/opentimestamps-server/blob/master/doc/merkle-mountain-range.md, last accessed Oct. 18, 2022.

Bünz, B., Kiffer, L., Luu, L., Zamani, M.: FlyClient: Super-light clients for cryptocurrencies. In: 2020 IEEE Symposium on Security and Privacy (SP), pp. 928-946. IEEE (2020), https://doi.org/10.1109/SP40000.2020.00049.

Benaloh, J., de Mare, M.: One-way accumulators: A decentralized alternative to digital signatures. In: Helleseth, T. (ed.) Advances in Cryptology—Eurocrypt '93, LNCS, vol. 765, pp. 274-285. Springer, Berlin, Heidelberg (1993). https://doi.org/10.1007/3-540-48285-7_24.

Reyzin, L., Yakoubov, S.: Efficient asynchronous accumulators for distributed PKI. In: Zikas, V., De Prisco, R. (eds) Security and Cryptography for Networks, SCN 2016, LNCS, vol. 9841, pp. 292-309. Springer, Cham, 2016. https://doi.org/10.1007/978-3-319-44618-9_16.

Kuszmaul, J.: Verkle Trees, https://math.mit.edu/research/highschool/primes/materials/2018/Kuszmaul.pdf, last accessed Oct. 18, 2022.

Buterik, V.: Verkle Trees, https://vitalik.ca/general/2021/06/18/verkle.html, last accessed Oct. 18, 2022.

Catalano, D., Fiore, D.: Vector commitments and their applications. In: Kurosawa, K., Hanaoka, G. (eds.) Public-Key Cryptography—PKC 2013, LNCS, vol. 7778, pp. 55-72. Springer, Berlin, Heidelberg (2013). https://doi.org/10.1007/978-3-642-36362-7_5.

Peikert, C., Pepin, Z., Sharp, C.: Vector and functional commitments from lattices. In: Nissim, K., Waters, B. (eds.) Theory of Cryptography, TCC 2021, LNCS, vol. 13044, pp. 480-511. Springer, Cham (2021). https://doi.org/10.1007/978-3-030-90456-2_16.

Ben-Sasson, E., Bentov, I., Horesh, Y., Riabzev, M.: Scalable, Transparent, and Post-Quantum Secure Computational Integrity. In: Cryptology ePrint Archive, Paper 2018/046, https://eprint.iacr.org/2018/046, last accessed Oct. 18, 2022.

Boneh, D., Gentry, C., Lynn, B., Shacham, H.: Aggregate and verifiably encrypted signatures from bilinear maps. In: Biham, E. (ed.) Advances in Cryptology—Eurocrypt 2003, LNCS, vol. 2656, pp. 416-432. Springer, Berlin, Heidelberg (2003). https://doi.org/10.1007/3-540-39200-9_26.

Khaburzaniya, I., Konstantinos, C., Lewi, K., Malvai, H.: Aggregating and thresholdizing hash-based signatures using STARKs. In: Proceedings of the 2022 ACM on Asia Conference on Computer and Communications Security, pp. 393-407. ACM, New York (2022). https://doi.org/10.1145/3488932.3524128.

Goyal, R., Vaikuntanathan, V.: Locally Verifiable Signature and Key Aggregation, In: Cryptology ePrint Archive, Paper 2022/179, https://eprint.iacr.org/2022/179, last accessed Oct. 18, 2022. To appear, Advances in Cryptology—CRYPTO 2022.

Li, F., Yi, K., Hadjieleftheriou, M., Kollios, G.: Proof-infused streams: Enabling authentication of sliding window queries on streams. In: Proceedings of the 33rd International Conference on Very Large Data Bases, pp. 147-158. VLDB Endowment (2007). https://dl.acm.org/doi/10.5555/1325851.1325871.

Papamanthou, C., Shi, E., Tamassia, R., Yi, K.: Streaming authenticated data structures. In: Johansson, T., Nguyen, P.Q. (eds.) Advances in Cryptology—Eurocrypt 2013, LNCS, vol. 7881, pp. 353-370. Springer, Berlin, Heidelberg (2013). https://doi.org/10.1007/978-3-642-38348-9_22.

Chase, M., Kohlweiss, M., Lysyanskaya, A., Meiklejohn, S.: Malleable signatures: New definitions and delegatable anonymous credentials. In 2014 IEEE 27th Computer Security Foundations Symposium, pp. 199-213. IEEE (2014), https://doi.org/10.1109/CSF.2014.22.

Ahn, J.H., Boneh, D., Camenisch, J., Hohenberger, S., Shelat, A., Waters, B.: Computing on authenticated data. Journal of Cryptology 28(2), 351-395. https://doi.org/10.1007/s00145-014-9182-0.

Attrapadung, N., Libert, B., Peters, T.: Computing on authenticated data: New privacy definitions and constructions. In: Wang, X., Sako, K. (eds) Advances in Cryptology—Asiacrypt 2012, LNCS, vol.

(56) References Cited

OTHER PUBLICATIONS 7658, pp. 367-385. Springer, Berlin, Heidelberg (2012). https://doi.org/10.1007/978-3-642-34961-4_23.
Sikeridis, D., Kampanakis, P., Devetsikiotis, M.: Post-quantum authentication in TLS 1.3: a performance study. In: Network and Distributed Systems Security (NDSS) Symposium 2020, The Internet Society (2020). https://dx.doi.org/10.14722/ndss.2020.24203.
Kudinov, M., Hülsing, A., Ronen, E. Yogev, E., SPHINCS+C: Compressing SPHINCS+ With (Almost) No Cost, In: Cryptology ePrint Archive, Paper 2022/778, https://eprint.iacr.org/2022/778, last accessed Nov. 18, 2022.
Baldimtsi, F., Chalkias, K., Chatzigiannis, P., Kelkar, M.: Truncator: Time-space Tradeoff of Cryptographic Primitives, In: Cryptology ePrint Archive, Paper 2022/1581, https:/eprint.iacr.org/2022/1581, last accessed Nov. 18, 2022.
Draft Call for Additional Digital Signature Schemes for the Post-Quantum Cryptography Standardization Process, NIST, https://csrc.nist.gov/csrc/media/Projects/pqc-dig-sig/documents/call-for-proposals-dig-sig-sept-2022.pdf, last accessed Oct. 18, 2022.
FIPS PUB 180-4: Secure Hash Standard. NIST (2015). https://doi.org/10.6028/NIST.FIPS.180-4.
Hülsing, A., Rijneveld, J., Song, F.: Mitigating multi-target attacks in hash-based signatures. In: Cheng, CM., Chung, KM., Persiano, G., Yang, BY. (eds) Public-Key Cryptography—PKC 2016, LNCS, vol. 9614, pp. 387-416. Springer, Berlin, Heidelberg, 2016. https://doi.org/10.1007/978-3-662-49384-7_15.
Sloane, N.J.A.: The ruler function: 2^a(n) divides 2n. Or, a(n)=2-adic valuation of 2n. In: The On-Line Encyclopedia of Integer Sequences, Entry A001511, https://oeis.org/A001511, last accessed Oct. 18, 2022.
Sloane, N.J.A., Wilks, A.: a(n)=a(floor(n/2))+n; also denominators in expansion of 1/sqrt(1-x) are 2^a(n); also 2n−number of 1's in binary expansion of 2n. In: The On-Line Encyclopedia of Integer Sequences, Entry A005187, https://oeis.org/A005187, last accessed Oct. 18, 2022.
Schwabe, P., D. Stebila and T. Wiggers. Post-quantum TLS without handshake signatures. In Proceedings of the 2020 ACM SIGSAC Conference on Computer and Communications Security, pp. 1461-1480. ACM, 2020. https://dl.acm.org/doi/abs/10.1145/3372297.3423350.
David Benjamin, "Batch Signing for TLS," Internet-Draft, Jul. 29, 2019, https://datatracker.ietf.org/doc/draft-davidben-tls-batch-signing/00/.
David Benjamin, "Batch Signing for TLS," Internet-Draft, Sep. 13, 2019, https://datatracker.ietf.org/doc/draft-davidben-tls-batch-signing/01/.
David Benjamin, "Batch Signing for TLS," Internet-Draft, Nov. 1, 2019, https://datatracker.ietf.org/doc/draft-davidben-tls-batch-signing/02/.
David Benjamin, "Batch Signing for TLS," Internet-Draft, Jan. 13, 2020, https://datatracker.ietf.org/doc/draft-ietf-tls-batch-signing/00/.
Diana Berbecaru, "MBS-OCSP: An OCSP based certificate revocation system for wireless environments," IEEE, 2004, pp. 267-272.
G.J. Beernink, Taking the Quantum Leap: Preparing DNSSEC for Post Quantum Cryptography <http://essay.utwente.nl/89509/1/Beerink_MA_EEMCS.pdf>, M.Sc. Thesis, U. Twente, 2022.
A. Fregly and R. van Rijswijk-Delj, Stateful Hash-Based Signatures for DNSSEC <https://datatracker.ietf.org/doc/draft-afrvrd-dnsop-stateful-hbs-for-dnssec/>, Internet-Draft, 2022.
K. Moriarty, et al., "PKCS #1: RSA Cryptography Specifications Version 2.2," RFC 8017, Nov. 2016, 78 pp.
Orie Steele, Henk Birkholz, Maik Riechert, et al., "Concise Encoding of Signed Merkle Tree Proofs", Internet-Draft, Mar. 13, 2023, https://datatracker.ietf.org/doc/draft-steele-cose-merkle-tree-proofs/00/—describes "a format for Merkle Tree Root Signatures" and other structures related to Merkle trees.
Dennis Jackson, "Abridged Compression for WebPKI Certificates", Internet-Draft, Jul. 6, 2023 https://datatracker.ietf.org/doc/draft-jackson-tis-cert-abridge/00/—defines a method that "smooths the transition to post-quantum certificates by eliminating the root and intermediate certificates from the TLS certificate chain without impacting trust negotiation".
Foteini Baldimtsi, Konstantinos Chalkias, Panagiotis Chatzigiannis, Mahimna Kelka, "Truncator: Time-space Tradeoff of Cryptographic Primitives", IACR ePrint, Nov. 14, 2022, https://eprint.iacr.org/2022/1581—presents "mining-based techniques to reduce the size of various cryptographic outputs without loss of security"; updated version, Jan. 20, 2023, https://eprint.iacr.org/archive/2022/1581/20230120:154540—references the Fregly et al. IACR ePrint.
Panos Kampanakis, Tancrède Lepoint, "Do we need to change some things? Open questions posed by the upcoming post-quantum migration to existing standards and deployments", IACR ePrint, Feb. 2, 2023, https://eprint.iacr.org/2023/266—"motivates more research and possible standards updates related to the upcoming quantum-resistant cryptography migration" and references the Fregly et al. IACR ePrint.
Carlos Aguilar-Melchor, Martin R. Albrecht, Thomas Bailleux, et al., "Batch Signatures, Revisited", IACR ePrint, Apr. 4, 2023, https://eprint.iacr.org/2023/492—revisits "batch signatures (previously considered in a draft RFC, and used in multiple recent works), where a single, potentially expensive, "inner" digital signature authenticates a Merkle tree constructed from many messages" and discusses security and application considerations.
U.S. Appl. No. 17/827,576, filed May 27, 2022.
Office Action for U.S. Appl. No. 18/219,522, dated Jun. 3, 2025, 18 Pages.
C. Papamanthou et al., Streaming Authenticated Data Structures <https://link.springer.com/content/pdf/10.1007/978-3-642-38348-9_22.pdf>, Eurocrypt 2013, May 2013.
L. Reyzin and S. Yakoubov, Efficient Asynchronous Accumulators for Distributed PKI <https://link.springer.com/chapter/10.1007/978-3-319-44618-9_16>, SCN 2016, Aug. 2016. ('authors version <https://eprint.iacr.org/2015/718.pdf>).
Abe, M., Chase, M., David B., et al. Constant-size structure-preserving signatures: Generic constructions and simple assumptions. Journal of Cryptology 29(4):833-878. Springer, 2016. https://doi.org/10.1007/s00145-015-9211-7.
Ahn, J.H., Boneh, D., Camenisch, J., Hohenberger, S., Shelat, A., and Waters, B., Computing on authenticated data. Journal of Cryptology 28(2), 351-395. Springer, 2015. https://doi.org/10.1007/s00145-014-9182-0.
Alagic, G., Apon, D., Cooper D., et al. NIST IR 8413-upd1: Status Report on the Third Round of the NIST Post-Quantum Cryptography Standardization Process. NIST, Jul. 2022; includes updates as of Sep. 26, 2022. https://doi.org/10.6028/NIST.IR.8413-upd1.
Arends, R., Austein, R., Larson, M., Massey, D., Rose, S., "DNS Security Introduction and Requirements", RFC 4033, DOI 10.17487/RFC4033, Mar. 2005, pp. 1-21, https://www.rfc-editor.org/info/rfc4033.
Attrapadung, N., B. Libert and T. Peters. Computing on authenticated data: New privacy definitions and constructions. In Advances in Cryptology—Asiacrypt 2012, LNCS, vol. 7658, pp. 367-385. Springer, 2012. https://doi.org/10.1007/978-3-642-34961-4_23.
Barker, W., W. Polk and M. Souppaya. Getting Ready for Post-Quantum Cryptography: Exploring Challenges Associated with Adopting and Using Post-Quantum Cryptographic Algorithms. NIST Cybersecurity White Paper, Apr. 28, 2021. https://doi.org/10.6028/NIST.CSWP.04282021.
Benaloh, J. and M. de Mare. One-way accumulators: A decentralized alternative to digital signatures. In Advances in Cryptology—Eurocrypt'93, LNCS, vol. 765, pp. 274-285. Springer, 1993. https://doi.org/10.1007/3-540-48285-7_24.
Black, Paul E., "Quantum Computation," in Paul E. Black (ed.), Dictionary of Algorithms and Data Structures, Dec. 17, 2007, https://www.nist.gov/dads/HTML/quantumComputation.html, last accessed Feb. 16, 2023.
Boneh, D., C. Gentry, B. Lynn and H. Shacham. Aggregate and verifiably encrypted signatures from bilinear maps. In Advances in Cryptology—Eurocrypt 2003, pp. 416-432. Springer, 2003. https://doi.org/10.1007/3-540-39200-9_26.

(56) References Cited

OTHER PUBLICATIONS

Bos, J.W., Hülsing, A., Renes, J., van Vredendaal, C.: Rapidly Verifiable XMSS Signatures, Cryptology ePrint Archive, Paper 2020/898, https://eprint.iacr.org/2020/898, last accessed Feb. 13, 2023.
Bünz, B., L. Kiffer, L. Luu and M. Zamani. FlyClient: Super-light clients for cryptocurrencies. In 2020 IEEE Symposium on Security and Privacy (SP), pp. 928-946. IEEE, 2020. https://doi.org/10.1109/SP40000.2020.00049.
Champine, L. Streaming Merkle Proofs within Binary Numeral Trees. Cryptology ePrint Archive, Paper 2021/038. 2021. https://eprint.iacr.org/2021/038.
Chase, M., Kohlweiss, M., Lysyanskaya, A., and Meiklejohn, S., Malleable signatures: New definitions and delegatable anonymous credentials. In 2014 IEEE 27th Computer Security Foundations Symposium, pp. 199-213. IEEE, 2014. https://doi.org/10.1109/CSF.2014.22.
Cooper, D., Santesson, S., Farrell, S., Boeyen, S., Housley, R., Polk, W.: RFC 5280, "Internet X.509 Public Key Infrastructure Certificate and Certificate Revocation List (CRL) Profile", RFC 5280, DOI 10.17487/RFC5280, May 2008. https://www.rfc-editor.org/info/rfc5280.
Crosby, S. and D. Wallach. Efficient data structures for tamper-evident logging. In Proceedings of the 18th USENIX Security Symposium, pp. 317-334. USENIX Association, 2009. https://dl.acm.org/doi/abs/10.5555/1855768.1855788.
CRYSTALS: Cryptographic Suite for Algebraic Lattices. https://pq-crystals.org/.
Damas, J., Graff, M., Vixie, P., "Extension Mechanisms for DNS (EDNS(0))", STD 75, RFC 6891, DOI 10.17487/RFC6891, Apr. 2013, https://www.rfc-editor.org/info/rfc6891.
Day In The Life of the Internet Traces, DNS-OARC, https://www.dns-oarc.net/oarc/data/catalog, last accessed Feb. 13, 2023.
Decker, C. and R. Wattenhofer. Bitcoin transaction malleability and MtGox. In Computer Security—ESORICS 2014, LNCS, vol. 8713, pp. 313-326. Springer, 2014. https://doi.org/10.1007/978-3-319-11212-1_18.
Draft Call for Additional Digital Signature Schemes for the Post-Quantum Cryptography Standardization Process. NIST. https://csrc.nist.gov/csrc/media/Projects/pqc-dig-sig/documents/call-for-proposals-dig-sig-sept-2022.pdf. Accessed Sep. 12, 2022.
Driscoll, F. Terminology for Post-Quantum Traditional Hybrid Schemes. Internet-Draft draft-driscoll-pqt-hybrid-terminology-00, Jul. 8, 2022. https://datatracker.ietf.org/doc/draft-driscoll-pqt-hybrid-terminology. Work in progress.
Ducas, L., et al., CRYSTALS—Dilithium: A Lattice-Based Digital Signature Scheme, IACR Transactions on Crytographic Hardware and Embedded Systems vol. 0, No. 0, pp. 1-31, https://eprint.iacr.org/2017/633.
FIPS PUB 180-4: Secure Hash Standard. Nist, U.S. Department of Commerce, Aug. 2015. https://doi.org/10.6028/NIST.FIPS. 180-4. https://nvipubs.nist.gov/nistpubs/FIPS/NIST.FIPS.180-4.pdf, downloaded Aug. 10, 2023.
Fluhrer, S.: Further Analysis of a Proposed Hash-Based Signature Standard. In: Cryptology ePrint Archive, Paper 2017/553, https://eprint.iacr.org/2017/553, last accessed Feb. 13, 2023.
Fregly, A., "Research Agenda for a Post-Quantum DNSSEC," OARC 40, Feb. 16-17, 2023, pp. 1-10, https://indico.dns-oarc.net/event/46/.
Fregly, A., et al., "Merkle Tree Ladder Mode: Reducing the Size Impact of NIST PQC Signature Algorithms in Practice," NIST Fourth PQC Standardization Conference, Nov. 29-Dec. 1, 2022, pp. 1-32, https://csrc.nist.gov/Events/2022/fourth -pqc-standardization-conference.
Fregly, A., Harvey, J., Kaliski, B., Sheth, S., "Merkle Tree Ladder Mode: Reducing the Size Impact of NIST PQC Signature Algorithms in Practice", Conference Paper, LNCS vol. 13871, Abstract, pp. 1-2.
Fregly, A., Harvey, J., Kaliski, B., Sheth, S., "Merkle Tree Ladder Mode: Reducing the Size Impact of NIST PQC Signature Algorithms in Practice", Dec. 15, 2022, pp. 1-41.
Fregly, A., Harvey, J., Kaliski, B., Sheth, S., "Merkle Tree Ladder Mode: Reducing the Size Impact of NIST PQC Signature Algorithms in Practice", in Rosulek, M. (editor), Lecture Notes in Computer Science, vol. 13871, CT-RSA 2023—Cryptographers Track at the RSA Conference, pp. 415-441, DOI 10.1007/978-3-031-30872-7_16, Springer, 2023. Preliminary version available at https://eprint.iacr.org/2022/1730.pdf.
Fregly, A., Harvey, J., Kaliski, B., Sheth, S., "Merkle Tree Ladder Mode: Reducing the Size Impact of NIST PQC Signature Algorithms in Practice", License to Publish Proceedings Papers, SpringerNature, Feb. 13, 2023, pp. 1-5.
Fregly, A., Harvey, J., Kaliski, B., Sheth, S., "Merkle Tree Ladder Mode: Reducing the Size Impact of NIST PQC Signature Algorithms in Practice", May 1, 2023, pp. 1-42.
Fregly, A., Harvey, J., Kaliski, B., Sheth, S., Merkle Tree Ladder Mode: Reducing the Size Impact of NIST PQC Signature Algorithms in Practice, Feb. 13, 2023, pp. 1-27.
Fregly, A., Harvey, J., Kaliski, B., Sheth, S., "Merkle Tree Ladder Mode: Reducing the Size impact of NIST PQC Signature Algorithms in Practice", "Topics in Cryptology—CT-RSA" conference paper, Apr. 19, 2023, https://link.springer.com/chapter/10.1007/978-3-031-30872-7_16.
Fujiwara,K., Vixie, P., "Fragmentation Avoidance in DNS", Work in Progress, Internet-Draft, draft-letf-dnsop-avoid-fragmentation—Jun. 5, 2021, https://datatracker.ietf.org/doc/draft-ieft-dnsop-avoid-fragmentation.
Goertzen, J., Stebila, D., "Post-Quantum Signatures in DNSSEC via Request-Based Fragmentation". University of Waterloo, Nov. 2022, pp. 1-18 https://s3.amazonaws.com/files.douglas.stebila.ca/files/research/papers/EPRINT-GoeSte22.pdf.
Goyal, R. and V. Vaikuntanathan. Locally Verifiable Signature and Key Aggregation. Cryptology ePrint Archive, Paper 2022/179. To appear, Advances in Cryptology—CRYPTO 2002, pp. 1-50, https:/eprint.iacr.org/2022/179.
Goyal, R., Vaikuntanathan, V.: Locally Verifiable Signature and Key Aggregation, In: , Dodis, Y., Shrimpton, T. (eds), Advances in Cryptology—CRYPTO 2022, LNCS, vol. 13508. pp. 761-791. Springer, Cham (2022). https://doi.org/10.1007/978-3-031-15979-4_26.
Grilo, A.B., Hövelmanns, K., Hülsing, A., Majenz, C.: Tight adaptive reprogramming in the QROM. In: Tibouchi, M., Wang, H. (eds) Advances in Cryptology—Asiacrypt 2021, LNCS, vol. 13090, pp. 637-667. Springer, Cham (2021).. https://doi.org/10.1007/978-3-030-92062-3_22.
Harvey, J., draft-harvey-cfrg-mtl-mode, Merkle Tree Ladder Mode (MTL) Signatures, IETF-117, slides 1-6, Jul. 25, 2023.
Harvey, J., Kaliski, B., Fregly, A., Sheth, S., Merkle Tree Ladder Mode (MTL) Signatures, Internet-Draft: draft-harvey-cfrg-htl-mode-00, Published Jul. 10, 2023, pp. 1-68.
Hollenbeck, S., "Federated Authentication for the Registration Data Access Protocol (RDAP) using OpenID Connect", Work in Progress, Internet-Draft, draft-ietf-regext-rdap-openid-12, Mar. 2022, https://datatracker.ietf.org/doc/html/draft-ietf-regext-rdap-openid.
Hülsing, A., J. Rijneveld and F. Song. Mitigating multi-target attacks in hash-based signatures. In Public-Key Cryptography—PKC 2016, LNCS, vol. 9614, pp. 387-416. Springer, 2016. https://doi.org/10.1007/978-3-662-49384-7_15.
Huque, S., Shulman, H., Kerr, S., "Algorithm Negotiation in DNSSEC", Jul. 2018, pp. 1-17 https://datatracker.ietf.org/doc/draft-huque-dnssec-algnego/03/.
ICANN, "Registrar Data Escrow Specifications", Nov. 2007, pp. 1-8 https://www.icann.org/en/system/files/files/rde-specs-09nov07-en.pdf.
IETF, Charter "Post-Quantum Use In Protocols (pquip)", IETF, Jan. 2023, https://datatracker.jetf.org/doc/charter-ietf-pquip/.
IETF, Charter "Post-Quantum Use In Protocols (pquip)", IETF, Jan. 2023, https://datatracker.ietf.org/wg/pquip/about/.
Kaliski, B., "Preparing for Post-Quantum: Securing Internet Infrastructure for the Long Term", Cloudfest Mar. 22, 2023, pp. 1-13.

(56) References Cited

OTHER PUBLICATIONS

Kaliski, B., "Preparing for Post-Quantum: The DNSSEC Case", 6th International Symposium on Cyber Security, Cryptology and Machine Learning (CSCML 2022), Jun. 30-Jul. 1, 2022, pp. 1-43.

* cited by examiner

500

METHODS AND SYSTEMS FOR GENERATING CONDENSED SIGNATURES FOR AN EVOLVING DATA SERIES AND APPLICATIONS THEREOF

CROSS-REFERENCE TO RELATED APPLICATIONS

This application claims the benefit of U.S. Provisional Patent Application No. 63/356,973 filed Jun. 29, 2022, U.S. Provisional Patent Application No. 63/406,699 filed Sep. 14, 2022, U.S. Provisional Patent Application No. 63/416,909 filed Oct. 17, 2022, and U.S. Provisional Patent Application No. 63/429,093 filed Nov. 30, 2022, which are incorporated herein by reference. This application incorporates by reference U.S. patent application Ser. No. 18/137,966, filed Apr. 21, 2023, "METHODS AND SYSTEMS FOR GENERATING AND UPDATING MERKLE TREES FOR AN EVOLVING DATA SERIES AND APPLICATIONS THEREOF".

FIELD

The systems and methods described herein relate to a general model for data series authentication schemes (DSAS) and provide a framework for condensing signatures.

BACKGROUND

A hash, such as a cryptographic hash or fingerprint, is a function that can input any of a variety of computer-interpretable objects and derive a fixed-size output. This output may be represented as a string, e.g., a hexadecimal number. Cryptographic hashes typically have other useful properties, such as preimage resistance (or "irreversibility") and collision resistance.

Asymmetric cryptography refers to cryptography that utilizes a key pair that includes of a public key and a private key. A message or other data may be encrypted by applying an encryption algorithm under control of the public key, and an encrypted message or other data may be decrypted by applying a conjugate decryption algorithm and under control of the private key to the encrypted message. Asymmetric cryptography includes such well-known algorithms as the Rivest-Shamir-Adleman (RSA) technique, as well as the Diffie-Hellman family of techniques. Notably, the security of such asymmetric cryptography typically relies on the difficulty of solving certain algebraic problems using standard computers.

A signature, such as a digital signature, is the result of applying a private key of an asymmetric cryptographic key pair to a computer-interpretable object. The corresponding public key of the asymmetric cryptographic key pair may be published or otherwise made available by the signing entity to the verifying party. The object may first be hashed as part of the signature process. A verifying party can verify the signature by applying the public key to the signature and comparing the result to the object or the hash of the object, or otherwise by determining that the signature corresponds to the object or its hash, depending on the scheme. If the comparison results in a match or correspondence, then the signature is valid; otherwise the signature is invalid. Digital signatures typically confer authentication (e.g., binding the signed object to the signer), non-repudiation (e.g., assuring that the signed object was indeed signed by the signing entity), and/or object integrity (e.g., assuring that the signed object has not changed since being signed). The process of validating a signature may confirm that one or more or all of the aforementioned properties hold for the signed object. A public/private key pair that supports digital signatures may or may not also support encryption and decryption operations.

A certificate, such as a digital certificate, is a package that may include information identifying a public key (e.g., the key itself or a hash of the key), together with information identifying the owner of the key, and a digital signature on at least some of the package contents. The certificates may have an expiration date, which may be represented in the package contents. The digital signature may be produced (i.e., signed) by a trusted party, such as a certification authority. A digital certificate may provide any entity that trusts the party that signed the certificate with the ability to validate that the signed public key is indeed associated with the party identified in the certificate. Thus, certificates may be used to protect data, encrypt transactions, and/or enable secure communications, among other uses. An example standard for certificates is the X.509 standard, promulgated by the International Telecommunications Union's Standardization sector.

A certification authority or certificate authority is an entity that provides digital certificates. Thus, certification authorities are trusted third parties, which verify the identities of parties engaged in some communication. Certification authorities may issue many certificates per minute. Certification authorities are identified with the computer servers that provide the certificates.

A certificate status responder is an entity that provides the status of a digital certificate, e.g., as valid, expired, or revoked. The status may be provided on demand to users that are relying on the certificate. By way of explanatory example, a first user may wish to communicate securely with a second user, e.g., by using the second user's public key to encrypt a message or other data. However, the first user may wish to verify that the second user's public key is authentic and actually associated with the second user. To do this, the first user obtains a certificate for the public key of the second user. However, the certificate, which is signed by a trusted third-party certification authority, may have expired, been revoked, or otherwise be invalid. Verifying the certification authority's signature on the certificate does not necessarily verify the current validity of the certificate. The first user thus wishes to verify the current status of the second user's certificate. To do so, the first user utilizes a certificate status responder. The certificate status responder receives a status request that includes an identification of the certificate in question, e.g., in the form of a serial number or other identifier. The certificate status responder may receive the request from the first user, or may receive the request from the second user according to a so-called stapling approach. Based on the serial number or other certificate identifier, the certificate status responder may retrieve a status of the certificate from the certification authority that issued it, or from its own records (e.g., if the certificate status responder is itself also a certification authority that issued the second user's certificate). The certificate status responder generates a response that includes information indicating the status of the second user's certificate and a signature produced by the certificate status responder's private key. The certificate status responder then returns the response to the requesting party. If the requesting party is the second user per a stapling approach, then the second user includes the response in an initial communication with the first user; otherwise, the certificate status responder returns the status certificate to the first user. The first user then uses the public key of the certificate status responder to verify the signature on the response, thereby obtaining a validated status of the second user's certificate. An example certificate status responder protocol is the Online Certificate Status Protocol ("OCSP"). A certificate status responder is identified herein with the hardware computer servers that perform the responses.

An identity provider may provide a user's online identity to an online application. By way of explanatory example, a user may wish to access an online resource, such as a service. The user directs the user's computer to the online resource, e.g., by entering or clicking on a URL in a browser. The online resource redirects the user's computer to an identity provider. The user's computer, e.g., a browser executing thereon, may have an open session active with the identity provider from a previous login to the identity provider, or the user may log in to the identity provider at this point. The identity provider generates a package of information that includes an identifier of the user's identity, adds a signature, and provides it to the user's computer or to the online resource. The user's browser may then redirect back to the online resource. The online resource then validates the signature. At this point, the user can access the online resource without separately logging in to it. An example known identity provider protocol is associated with the Security Assertion Markup Language ("SAML"). An identity provider is identified herein with the server computers through which the identity provider provides its services.

A code signer may provide signatures on computer code, such as software images, executables and scripts. A user wishing to execute the code may confirm that the code has not been altered before executing by validating the signature. Typically, a developer provides the code to a code signer server computer (which is identified with the code signer entity). The code signer signs the code (or an image or representation of the code, such as a hash) and returns the signature to the developer. Later, a user wishing to validate the code can authenticate the signature using the code signer's public key. A code signer is identified herein with the server computers through which the code signer provides its services.

A payment authority entity may provide signatures on online payments. A payer may wish to have his or her payment to a payee validated. The payer interacts with a payment authority, which signs the payment to the payee. In some embodiments, the payer itself may be the payment authority. In others, a trusted third party, such as a payment service, may be the payment authority. Later, any party can validate the transaction by confirming the signature on the payment. A payment authority is identified herein with the server computers through which the payment authority provides its services.

The Domain Name System (DNS) is a hierarchical distributed naming system for resources, such as those provided by computer servers, connected to the internet. It associates domain names to addresses of resources, such as Internet Protocol (IP) addresses, and other related information. The DNS thus allows computers and humans to access networked resources using names.

The DNS is typically organized into one or more zones, a unit of organization of authoritative name data for the DNS. The DNS relies on extensive delegation of such authority. In that respect, the term "child" refers to an entity of record to which a "parent" entity delegates certain authority, such as name resolution authority, for a domain, or portion thereof. In this context, the terms "parent" and "child" are also generally identified with the respective zones (e.g., a parent zone and one or more child zones within the parent zone).

Certificate Transparency (CT) is a protocol for maintaining records of digital certificates as they are provided and/or observed. CT offers an audit check on the activities of certification authorities. A CT log provides signatures on certificate timestamps. A verifier interested in additional assurance about the provenance of a party's digital certificate may ask the party to present, or may otherwise request, a signed certificate timestamp (SCT) from one or more CT logs.

BRIEF SUMMARY

According to an embodiment, a computer-implemented method for forming a data structure is provided. The method includes generating, by a signer, a hash-based data authentication structure. The method further includes selecting a first strategy, wherein the first strategy includes a process for updating a first data structure. The method further includes forming, by the signer, the first data structure according to the first strategy, wherein the first data structure includes one or more node hash values from the hash-based data authentication structure and is configured for verifying digital signatures relative to the hash-based data structure. The method further includes publishing the first data structure for access by a verifier. The verifier is configured to determine whether the first data structure is capable of verifying a digital signature and to either: use the first data structure to verify the digital signature or access a subsequently published second data structure that has been updated according to the first strategy to verify the digital signature.

In addition to one or more of the features described herein, or as an alternative, further embodiments of the method may include that the hash-based data authentication structure is a tree structure.

In addition to one or more of the features described herein, or as an alternative, further embodiments of the method may include that the hash-based data authentication structure is a tree structure that changes over time.

In addition to one or more of the features described herein, or as an alternative, further embodiments of the method may include that the first strategy includes a full strategy, a single strategy, a basic binary strategy, an extended binary, a spaced strategy, a variable spaced strategy, a bounded strategy, a spaced and bounded strategy, a spaced extended binary strategy, or a bounded extended binary strategy.

In addition to one or more of the features described herein, or as an alternative, further embodiments of the method may include that the first data structure is formed during a batch process.

In addition to one or more of the features described herein, or as an alternative, further embodiments of the method may include that the first data structure is a set of nodes that collectively spans each of a plurality of leaf nodes.

In addition to one or more of the features described herein, or as an alternative, further embodiments of the method may include that each node of the set of nodes is represented as a tuple including a lowest index of any node descendants of the node, a highest index of any node descendants of the node, and a hash value for the node, wherein indexes for the set of nodes is used to locate a node within a memory or a storage medium.

In addition to one or more of the features described herein, or as an alternative, further embodiments of the method may include that the process for updating the first data structure includes a process for updating the first data structure as new leaf nodes are added and for choosing which individual nodes in the set of nodes to use in an authentication path.

In addition to one or more of the features described herein, or as an alternative, further embodiments of the method may include that the strategy is a binary strategy.

According to another embodiment, a computer-implemented method is provided.

The method includes verifying a first digital signature using a first data structure, wherein the first data structure was formed by a first signer according to a first strategy, wherein the first strategy defines a first process for updating the first data structure. The method further includes verifying a second digital signature using a second data structure, wherein the second data structure was formed by a second signer according to a second strategy, wherein the second strategy defines a second process for updating the second data structure. The method further includes wherein the verifier is configured to verify the first digital signature and the second digital signature without adapting logic of the verifier to the first strategy or the second strategy.

In addition to one or more of the features described herein, or as an alternative, further embodiments of the method may include that the first data structure is formed by: generating, by a first signer, a first hash-based data authentication structure; selecting the first strategy from a plurality of strategies, wherein each the plurality of strategies defines a process for updating data structures; forming, by the signer, the first data structure according to the first strategy; and publishing the first data structure for access by the verifier, wherein the verifier is configured to use the first data structure to verify the first digital signature.

In addition to one or more of the features described herein, or as an alternative, further embodiments of the method may include that the second data structure is formed by: generating, by a second signer, a second hash-based data authentication structure; selecting the second strategy from the plurality of strategies; forming, by the signer, the second data structure according to the second strategy; and publishing the second data structure for access by the verifier, wherein the verifier is configured to use the second data structure to verify the second digital signature.

In addition to one or more of the features described herein, or as an alternative, further embodiments of the method may include that the first hash-based data authentication structure is a tree structure.

In addition to one or more of the features described herein, or as an alternative, further embodiments of the method may include that the first hash-based data authentication structure is a tree structure that changes over time.

In addition to one or more of the features described herein, or as an alternative, further embodiments of the method may include that the first strategy is selected from a group consisting of a full strategy, a single strategy, a basic binary strategy, an extended binary, a spaced strategy, a variable spaced strategy, a bounded strategy, a spaced and bounded strategy, a spaced extended binary strategy, and a bounded extended binary strategy.

In addition to one or more of the features described herein, or as an alternative, further embodiments of the method may include that the second strategy differs from the first strategy, and wherein the second strategy is selected from the group consisting of a full strategy, a single strategy, a basic binary strategy, an extended binary, a spaced strategy, a variable spaced strategy, a bounded strategy, a spaced and bounded strategy, a spaced extended binary strategy, and a bounded extended binary strategy.

In addition to one or more of the features described herein, or as an alternative, further embodiments of the method may include that the data structure is a set of nodes that collectively spans each of a plurality of leaf nodes.

According to another an embodiment, a computer-implemented method for signing messages in a condensable digital signature scheme is provided. The method includes generating a first signed data structure, wherein the first signed data structure includes one or more nodes from a hash-based data authentication structure selected according to a strategy, wherein the first signed data structure is signed using an underlying signature scheme. The method further includes generating a second signed data structure, wherein the second signed data structure is a modified version of the first signed data structure. The method further includes enabling a signed data structure provider to provide to a verifier the first signed data structure and the second signed data structure. The method further includes enabling a condensed signature provider to provide to the verifier a first condensed signature formed relative to the first signed data structure or the second signed data structure.

In addition to one or more of the features described herein, or as an alternative, further embodiments of the method may include that the verifier: obtains the first signed data structure; obtains a second condensed signature formed relative to the second signed data structure; determines based on information associated with the second condensed whether the second condensed signature can be verified relative to the first signed data structure; responsive to determining that the second condensed signature cannot be verified, obtaining, from the signed data structure provider, a third signed data structure; and verifying the second condensed signature relative to the first signed data structure or the third signed data structure.

According to another embodiment, a computer-implemented method for verifying a digital signature in a condensable digital signature scheme is provided. The method includes obtaining, from a signed data structure provider, a first signed data structure, wherein the first signed data structure includes one or more node hash values from a hash-based data authentication structure selected according to a strategy, wherein the first signed data structure is signed using an underlying signature scheme. The method further includes obtaining, from an authentication path signature provider, an condensed signature relative to a second signed data structure, wherein the second signed data structure is a first modified version of the first signed data structure. The method further includes determining, based on information associated with the condensed signature, whether the condensed signature can be verified relative to the first signed data structure. The method further includes, responsive to determining that the condensed signature cannot be verified relative to the first signed data structure, obtaining, from the signed data structure provider, a third signed data structure, wherein the third signed data structure is a second modified version of the first signed ladder. The method further includes verifying the condensed signature relative to the first signed data structure or the third signed data structure.

BRIEF DESCRIPTION OF THE DRAWINGS

Various embodiments are described in detail below with reference to the accompanying drawings, in which like reference numerals represent like elements.

DETAILED DESCRIPTION

Figure 1:
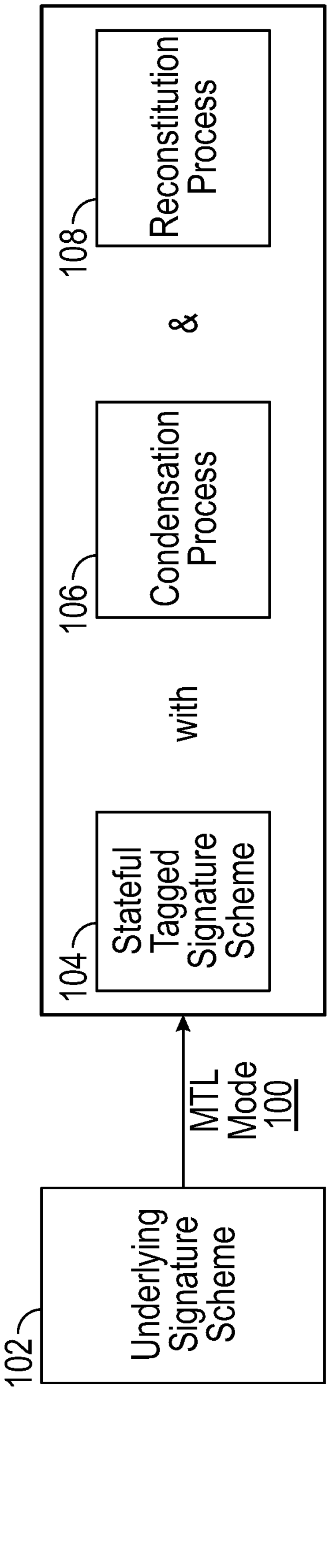
FIG. 1 illustrates a Merkle Tree Ladder (MTL) mode transforming an underlying signature scheme into a stateful tagged signature scheme according to one or more embodiments described herein.

A Merkle Tree Ladder (MTL) mode of operation for signature schemes is described herein according to various embodiments. MTL mode is configured to sign messages using an underlying signature scheme in such a way that the resulting signatures are condensable, for example, where a set of MTL mode signatures can be conveyed from a signer to a verifier in fewer bits than if the MTL mode signatures were sent individually. In MTL mode, the signer sends a condensed signature for each message and occasionally provides a reference value that helps the verifier process the condensed signatures, wherein the reference value may be longer than the condensed signature. In such an example, the reference value (in MTL mode) includes a ladder (which may have one or more rungs, i.e., one or more nodes from one or more Merkle trees) and a signature on the ladder. According to one or more embodiments described herein, a ladder may referred to herein as a ladder and/or a data structure. According to an embodiment involving random access to an initial series of 10,000 signatures that expands gradually over time, MTL mode can reduce the size impact of certain signature algorithms currently being studied for post quantum cryptography (PQC), such as PQC signature algorithms selected by the National Institute of Standards and Technology (NIST) which have signature sizes of 666-7856 bytes with example parameter sets, to a condensed signature size of 472 bytes in an embodiment for NIST level V security. In another embodiment, the condensed signature size may be other than 472 bytes, such as 248 bytes. Even adding the overhead of the reference values, MTL mode signatures still reduce the overall signature size impact under a range of operational assumptions. Because MTL mode itself is quantum-safe, the mode can support long-term cryptographic resiliency in applications where signature size impact is a concern without limiting cryptographic diversity to algorithms whose signatures are naturally short.

1. Introduction

The transition to post-quantum cryptography under NIST's leadership [1] has resulted in a remarkable variety of new, fully specified cryptographic techniques [2] that have been assessed, through a public evaluation process, to resist cryptanalysis by both classical and quantum computers. NIST has also issued recommendations for two additional post-quantum signature schemes [3], which are also endorsed (along with one of the other techniques) in the latest U.S. National Security Systems suite [4]. The next step in the transition, as the various algorithms are standardized and incorporated into cryptographic libraries, is to upgrade applications to support them [5].

Applications of cryptography in the "pre-quantum" era have often been designed based on the characteristics of the cryptographic techniques available, one of which has been relatively small signature sizes (by post-quantum standards). Classical signature sizes range from 64 to 256 bytes in typical examples [6]. The leading post-quantum signature algorithms in the NIST PQC project, in contrast, have minimum sizes that range from 666 to 7856 bytes with example parameter sets (see Tables 8 and 9 in [1])—an order of magnitude (or two) increase.

Given the increasing sizes of different kinds of data, the relatively large size of the new signature algorithms will not necessarily present an obstacle to their adoption. But size concerns could still present a challenge in some environments, and for the greatest benefit—upgrading to post-quantum everywhere—it will be helpful to have techniques that reduce the size impact. In addition, it would be desirable from the perspective of cryptographic diversity if multiple families of algorithms had a low size impact, not just a single family designed specifically for this purpose.

Embodiments described herein describe reducing the size impact of the signatures in a practical scenario involving message series signing. In this scenario, a signer may continuously sign new messages and publish the messages and their signatures. A verifier may then continuously request selected messages and their associated signatures—not necessarily all the messages, and not necessarily in order—and verify their signatures. The messages could be, for example, a series of certificates signed by a certification authority in a web public-key infrastructure, such as web Public-Key Infrastructure certificates [7], where a client requests one or more certificates at a time from different web servers. Or, they could also be a series of Domain Name System Security Extensions (DNSSEC) records signed by a DNS authority [8], where a resolver requests one or more signed records at a time from a recursive or authoritative DNS server. They could also be signed certificate timestamps for Certificate Transparency [9].

According to embodiments, the signer may convey a set of signatures of interest to the verifier, in fewer bits than if the signatures were sent individually, using a condensation and reconstitution process, which can be applied to a suitably constructed signature scheme:

- The signer may compute a condensed signature corresponding to each of the signatures of interest.
- The signer may also compute reference values that can help the verifier process the condensed signatures.
- The verifier may obtain each of the condensed signatures from the signer.
- The verifier may also occasionally request reference values from the signer.
- The verifier may compute a reconstituted signature from each condensed signature and a suitable reference value. (The reconstituted signature may be different than the signature originally input to the condensation process.)

The verifier then may verify each reconstituted signature.

According to an embodiment, the condensed signatures may be shorter than the signatures in the underlying signature scheme, which may be beneficial in operational models, for example, where the size impact of the signature transmitted is the primary concern. Second, the effective signature size—the size of the condensed signatures plus the average overhead of the occasional reference value—may be shorter than the signatures in the underlying signature scheme, which may be beneficial in operational models, for example, where the primary concern is the total size impact.

Because typical signature schemes may not be suited for a condensation and reconstitution process, embodiments herein describe how to transform an arbitrary underlying signature scheme into a stateful, tagged signature scheme that can be condensed as described herein (see 1). According to an embodiment, a Merkle Tree Ladder (MTL) mode may be used for the transform process. According to an embodiment, the MTL mode utilizes a Merkle tree [10] and operates as a transform akin to the modes of operation of cryptographic techniques pioneered by NIST for encryption algorithms [11].

According to an embodiment, a signer operating according to MTL mode may construct an evolving sequence or ladder of Merkle tree nodes from the sequence of messages being signed, then sign each ladder using the underlying signature scheme. The signer may construct and evolve a sequence or ladder of Merkle trees nodes as a process separate from ladder signing or may combine both processes into a single or opaque process. Both before condensation and after reconstitution, an MTL mode signature includes three parts: an authentication path from a message to a Merkle tree ladder node; the ladder; and the signature on the ladder. A condensed signature conveys the authentication path; a reference value conveys a ladder and its signature. The signer sends the verifier a condensed signature and a handle pointing to the reference value; the verifier computes a reconstituted signature from the condensed signature and a suitable reference value, requesting a new reference value if desired, and then verifies the reconstituted signature. In general, given the relatively large size of current post-quantum signatures, the condensed signature will be shorter than the signature of the underlying signature scheme. According to an embodiment, the condensation process evolves the authentication paths to maximize reuse of reference values and therefore minimize their size impact.

According to an embodiment, the transformation process is configured to improve upon the basic idea of forming a Merkle tree from a fixed set of messages and then signing the Merkle tree root in several ways, including, but not limited to:

- The message series can expand as the signer continuously signs new messages without explicitly constructing new trees, and the verifier can continue to obtain new signatures while occasionally requesting new reference values.
- The initial signatures produced by MTL mode are actual signatures that can be verified directly by the MTL mode verification operation. The reconstituted signatures are likewise actual MTL mode signatures. Condensation and reconstitution are therefore optional upgrades that can be deployed incrementally as another way for a verifier to obtain signatures that it can verify.

According to embodiments:

- MTL mode, like other Merkle tree techniques, may be based on hash functions. MTL mode is therefore post-quantum-ready (e.g., resistant or safe from a cryptanalytic attack by a quantum computer) under the same or similar design assumptions as hash-based signature schemes.
- Condensation and reconstitution may be public processes: They may involve the signer's public key, not the private key. The processes therefore do not impact the security of the signature scheme, and they can be performed by anyone. Another party—for instance an intermediate server between the signer and the verifier—can perform the operations independently of both parties, which adds to deployment flexibility. According to an embodiment, the reconstituted signature may be different than the initial signature on the message, as distinguishable from compression/decompression operations where the decompressed signature is generally the same as the initial signature on the message.

As described herein: (1) Embodiments describe a model for condensing and reconstituting signatures given a suitably constructed signature scheme; (2) Embodiments show uses of Merkle tree ladders to transform an arbitrary underlying signature scheme into a stateful tagged signature scheme suitable for condensation and reconstitution; and (3) Embodiments demonstrate that the transformation can reduce the size impact of NIST PQC signature algorithms in practice.

According to one or more embodiments described herein, FIG. 1 illustrates an MTL mode 100 transforming an underlying signature scheme 102 into a stateful tagged signature scheme 104 according to one or more embodiments described herein. The transformation adds an evolving Merkle tree ladder to the underlying scheme. The stateful tagged signature scheme 104 is suitable for condensation (e.g., condensation process 106) and reconstitution (e.g., reconstruction process 108).

Section 2 provides conventions for Merkle tree constructions and describes Merkle tree ladders. Section 3 describes a tagged signature scheme. Section 4 then describes a condensation scheme. Sections 5 and 6 show how to transform an arbitrary signature scheme into a tagged signature scheme using MTL mode and how to condense the resulting signatures. Section 7 discusses the practical impact of the disclosed techniques on NIST PQC signature algorithms, Section 8 reviews related work, and Section 9 concludes the main body of the description. Appendix A describes instantiations of MTL mode's hash functions, Appendix B gives pseudocode for the Merkle tree ladder operations, Appendix C shows a proof for path verification of a binary rung strategy, Appendix D discusses how condensation may be applied directly to hash-based signature schemes, Appendix E gives operations for stateful reconstitution, and Appendix F discusses caching of condensed signatures.

2. Merkle Tree Ladders

An acyclic graph format, rather than a Merkle tree, is used herein to describe an embodiment where multiple nodes may have the same descendants. The Merkle data structure is abstractly a node set having zero or more nodes, plus a node set-specific series identifier. According to an embodiment, leaf nodes are consecutively indexed starting with 1 and every node is identified by a unique pair of positive integer indexes L and R indicating the lowest and highest indexes of any leaf node descendants of the node. According to other embodiments, other ranges of indexes, such as a range starting with 0, could be implemented. If L=R, then the node is a leaf node and if L<R, then the node is an internal (non-leaf) node.

A node may be represented as a tuple $\langle L, R, V \rangle$ where V is the node's hash value. As used herein, [L:R] refers to the unique node with this pair of indexes such that that [L:R]

spans the leaf nodes with indexes L through R. As used herein, V[L:R] refers to the node's hash value.

A tree structure similar to Certificate Transparency [9] is described herein where the tree may have an arbitrary number of nodes (not just a power of two). The left child of [L:R] is [L:M] and the right child is [M+1:R], where M is the (unique) integer between L and R−1 that is divisible by the largest power of 2. The successive left descendants of the node [1:N] and their descendants for any N≥1 are thus complete binary trees.

A Merkle tree ladder may be, for example, a set of nodes that collectively spans every leaf node; the individual nodes in the set are called rungs. The ladder provides a way to "climb the tree" and authenticate leaf nodes in the node set.

The authentication path from a leaf node to a ladder may be, for example, the set of "sibling" node hash values (in the usual Merkle tree sense) in the path from the leaf node to one of the associated rungs in the ladder that spans the leaf node. An authentication path can be verified by any ladder that includes the hash value for at least one node that would be recomputed when evaluating the authentication path, i.e., the leaf node itself or a parent of any of its siblings.

A rung strategy (also referred to herein as a "strategy"), denoted $\mathcal{RS}$, may specify the process for updating a ladder as new leaf nodes are added (including computing and adding other internal nodes), and for choosing which rung in the ladder to use in an authentication path if more than one rung spans the leaf node. One such strategy is described below, but others are possible, such as the various rung strategies described in U.S. patent application Ser. No. 18/137,966, filed Apr. 21, 2023, "METHODS AND SYSTEMS FOR GENERATING AND UPDATING MERKLE TREES FOR AN EVOLVING DATA SERIES AND APPLICATIONS THEREOF", as incorporated herein by reference, including a single-rung strategy where the ladder includes the evolving root node [1:N]. Merkle tree ladder constructions and rung strategies and are also possible where the leaf nodes are not added in a consecutively indexed order. Certain embodiments described herein include the "append-only" case which is sufficient for MTL mode.

Additional conventions are as follows.

Security parameter. The integer $\ell$ may be a variable security parameter indicating the desired cryptographic bit strength, e.g., $\ell=128$. The parameter may determine the lengths of other values in the node set construction. In an embodiment, the integer may be the length in bits of a hash value, and another integer $\ell_c$ may be the length of the randomizer in a message hashing operation.

Series identifier. SID may denote the node set's series identifier. An implementation may generate a series identifier at random or derive it pseudorandomly from another value. An implementation may place constraints on the length of the series identifier; a minimum of 16 octets is recommended according to an embodiment.

Hash functions. $H_{leaf}$ and $H_{int}$ may be suitable cryptographically separated hash functions. In an embodiment, $H_{leaf}(SID, i, d)\rightarrow V$ maps a series identifier, an index, and a data value to a $2\ell$-bit hash value. In another embodiment, $H_{leaf}(SID, i, d)\rightarrow V$ maps a series identifier, an index, and a data value to an $\ell$-bit hash value. $H_{int}(SID, L, R, V_{left}, V_{right})\rightarrow V$ maps a series identifier, two indexes and two $2\ell$-bit hash values to a $2\ell$-bit hash value. In embodiments, $H_{leaf}(SID, i, d)\rightarrow V$ may map a series identifier SID, an index i, and a $\ell$-bit data value d to a $\ell$-bit hash value V, and $H_{int}(SID, L, R, V_{left}, V_{right})\rightarrow V$ may map a series identifier SID, a node index pair L and R and two $\ell$-bit hash values $V_{left}$ and $V_{right}$ to a $\ell$-bit hash value V. According to an embodiment, including SID as an input, as usual, helps ensure that different node sets are cryptographically separated from one another. Including the leaf node index i and the indexes L and R as inputs helps ensure that hash values for different leaf nodes and internal nodes are cryptographically separated as well. Appendix A describes instantiations of these functions.

Leaf node hashes. The hash value for the $i^{th}$ leaf node, i.e., the node [L:R] where L=R=i, may be computed as $$V[L{:}R] = V[i{:}i] := H_{leaf}(SID, i, d),$$

where d is the data value associated with the leaf.

Internal node hashes. The hash value of an internal node [L:R] where L<R may be computed as $$V[L{:}R] = H_{int}(SID, L, R, V[L{:}M], V[M+1, R]).$$

Node set operations. Operations for interacting with a node set may include, but are not limited to:

- Node set initialization. $\text{InitNodeSet}_{\mathcal{RS}}(SID)\rightarrow T_0$ returns a new node set $T_0$ associated with the series identifier SID.
- Leaf node count. $\text{GetLeafNodeCount}_{\mathcal{RS}}(T)\rightarrow N$ returns the number of leaf nodes in the node set T.
- Leaf node addition. $\text{AddLeafNode}_{\mathcal{RS}}(T,d)\rightarrow\langle T',\Lambda\rangle$ adds a leaf node corresponding to the data value d to the node set T, assigning the next leaf node index to it. The operation may also compute and add other nodes to evolve the next ladder per the rung strategy $\mathcal{RS}$. AddLeafNode returns the updated node set T' and the ladder Λ spanning the leaf nodes in the node set. The AddLeafNode operation may return the updated node set as an output, consistent with the tagged signature scheme operations and the condensation operations returning the updated state. According to an embodiment, operation could update the node set in place as discussed in Appendix B. In such embodiments, $\text{AddLeafNode}(T,d)\rightarrow\langle\Lambda_N\rangle$ may add a leaf node corresponding to a data value d to the node set T and return the current ladder $\Lambda_N$ where N is the current leaf node count. As also shown in Appendix B, a node set with N leaf nodes can be represented with at most 2N−1 hash values (and in the case that the node set is used for generating signatures, not for condensing them, with at most $\lfloor\log_2 N\rfloor+1$ hash values).
- Authentication path construction. $\text{GetAuthPath}_{\mathcal{RS}}(T, i)\rightarrow\Pi$ returns the authentication path Π from the $i^{th}$ leaf node in the node set T to its associated rung in the current ladder per the rung strategy $\mathcal{RS}$. The operation utilizes 1≤i≤N where N is the current leaf node count.
- Authentication path verification. $\text{CheckAuthPath}_{\mathcal{RS}}(SID, i, N, N', d, \Pi, \Lambda)\rightarrow b$ verifies that the $i^{th}$ leaf node of a node set corresponds to a data value d using an authentication path Π and a ladder Λ, with the assumptions that Π is the authentication path from the $i^{th}$ leaf node to its associated rung in the $N^{th}$ ladder and Λ is the $N'^{th}$ ladder. The operation utilizes that 1≤i≤N'≤N. CheckAuthPath returns b=True if the authentication path is valid and b=False otherwise.

Correctness. With a given rung strategy, CheckAuthPath will correctly verify the leaf node hash value when the ladders for authentication path verification and construction are the same, i.e., N'=N. (According to an embodiment, it can be assumed the same SID is input to CHECKAUTHPATH as to INITNODESET.) According to an embodiment, to make the schemes more efficient, it may be desirable that verification also be correct when N' and N are different. For this purpose, a rung strategy may be described as follows.

Binary rung strategy. In this strategy, denoted $\mathcal{BRS}$, the rungs in the $N^{th}$ ladder, denoted $\Lambda_N$, may be defined based on the binary representation of N. Write $$N=\sum_{j=1}^{B}2^{v_j},$$

where the $v_j$ are the indexes of the ones bits in the binary representation of N from highest to lowest, so that $\lfloor \log_2 N \rfloor = v_1 > v_2 > , , , v_B \geq 0$. The rungs of the $N^{th}$ ladder $\Lambda_N$ are then $$\langle [L_N(1):R_N(1)], \ldots , [L_N(B):R_N(B)] \rangle$$

where $R_N(0)=0$ and for j=1 to B, $L_N(j)=R_N(j-1)+1$ and $R_N(j)=R_N(j-1)=2^{v_j}$. It follows that the rung spans are adjacent and that $L_1(1)=1$ and $R_N(B)=N$, so the ladder rungs collectively span every leaf node. Moreover, the descendants of each rung form a complete binary tree. The rung associated with the $i^{th}$ leaf node is the unique rung $[L_N(B); R_N(B)]$ for which $L_N(B) \leq i \leq R_N(B)$. The number of rungs is O(log N). Because the rung node index pairs can be computed deterministically from N, as long as the value N is available, the index pairs may or may not be included in a representation of the ladder, just the rung node hash values.

Figure 2:
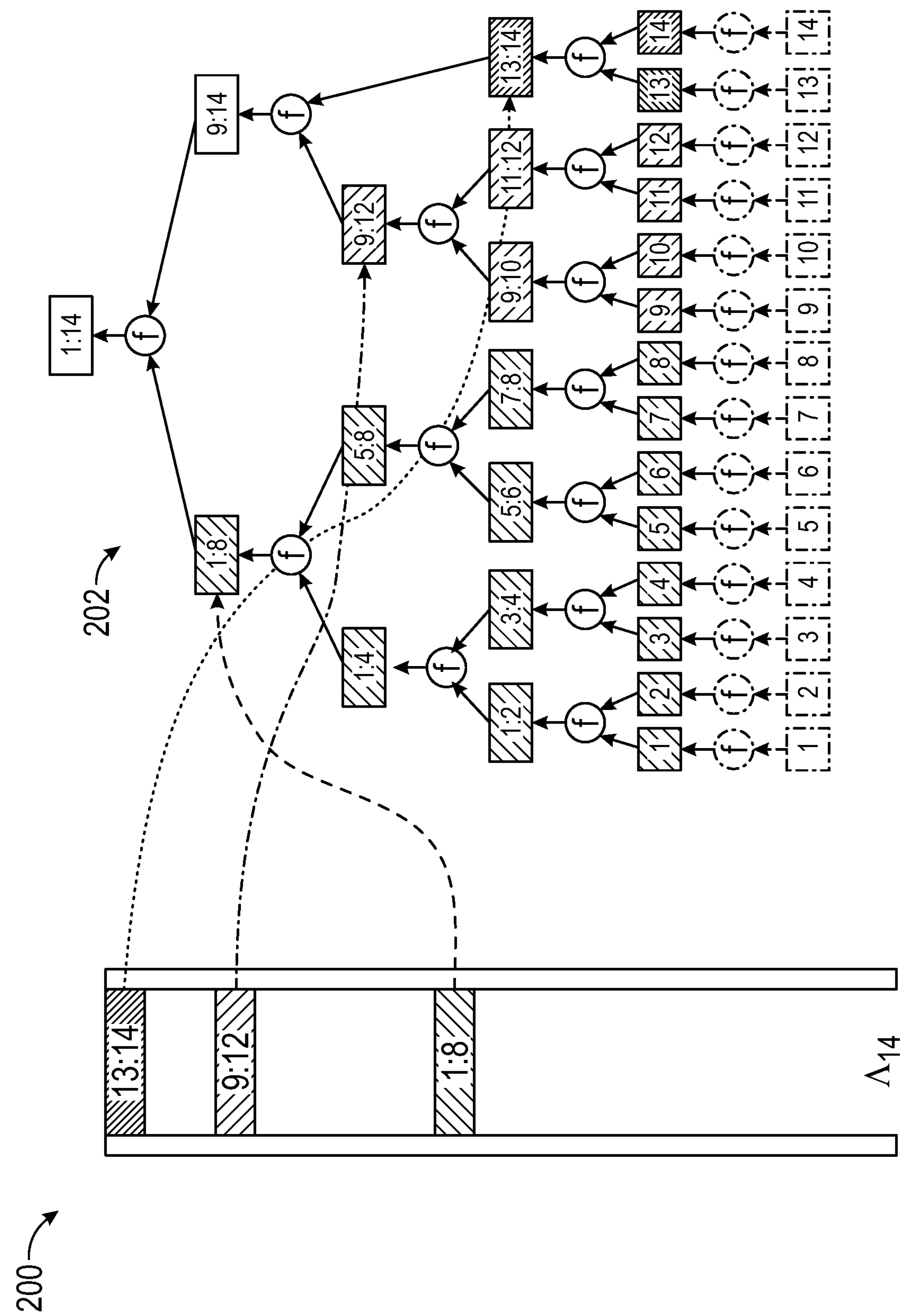
FIG. 2 illustrates an example of a Merkle Tree Ladder and node set following a binary rung strategy according to one or more embodiments described herein.

FIG. 2 shows an example of a ladder 200 and node set 202 following the binary rung strategy. In this example, rungs [1:8], [9:12] and [13:14] of the ladder 200 collectively span the 14 leaf nodes. Leaf node 13 will have been in the previous ladder and will have been merged into [13:14] when leaf node 14 is added. Nodes [9:14] and [1:14], if computed, would produce a Merkle tree whose root spans the 14 leaf nodes.

Claim: General path verification for binary rung strategy. For the positive integers i, N,N' where $i \leq N' \leq N$, if $d_i$ is the data value corresponding to the $i^{th}$ leaf node in a node set assembled using this strategy, $\Sigma_{i,N}$ is the authentication path from the $i^{th}$ leaf node to its associated rung in the $N^{th}$ ladder and $\Lambda_{N'}$ is the $N'^{th}$ ladder, then $$CHECKAUTHPATH_{\mathcal{BRS}}\left(SID, i, N, N', d_i, \prod_{i,N'}, \Lambda'_N\right) = TRUE.$$

See Appendix C for further discussion.

3. Tagged Signature Schemes

According to an embodiment, the generalization of the framework proposed by Abe et al. [12] may be adopted for one-time signatures where messages are associated with tags. Tagging may provide a convenient way to divide messages signed under the same public/private key pair into multiple series, while providing cryptographic separation between the series. For a stateful tagged signature scheme, and following Yuan et al. [13], the scheme operations may take the current state as an input and return the updated state as an output. In practice, it may be more efficient for an implementation to keep the state as part of the context of the operation, and update it in place.

An implementation may place constraints on the lengths of the tags, the number of different tags allowed, and the number of messages that may be associated with a given tag. For use of a tagged signature scheme in MTL mode, the tag may be an arbitrary string. Other constructions (such as the ones contemplated in Appendix D) may allow a null tag, which would be compatible with an ordinary (non-tagged) signature scheme.

Definition. A tagged signature scheme $\mathcal{TSS}$ may be a stateful signature scheme where signatures are associated with tags. A tagged signature scheme may include three operations: Key pair generation, signature generation, and signature verification. Aspects of these operations are described below:

- Key pair generation. KEYGEN($1^{\ell}$)→⟨pk, sk, $st_0$⟩ generates a public/private key pair with security parameter $\ell$ and returns the newly generated key pair ⟨pk, sk⟩ and an initial state $st_0$.
- Signature generation. $\text{SIGN}_{sk}$(m, τ, st)→⟨σ, st'⟩ signs a message m and a tag τ with a private key sk under the state st and returns the resulting signature σ and an updated state st'. SIGN returns an error if the scheme does not support the tag τ.
- Signature verification. $\text{VERIFY}_{pk}$(m, τ, σ)→b verifies a signature σ on a message m and a tag τ with a public key pk. VERIFY returns b=TRUE if the verification check is successful and b=FALSE otherwise. According to an embodiment, the tuple ⟨m, τ, σ⟩ is valid if VERIFY(m, τ, σ)=TRUE.

Message and signature series. The message series for a tag τ may be described, for example, as the sequence of messages $$M_N^{\tau} = \langle m_1, \ldots , m_N \rangle$$

input to successive calls SIGN in association with τ, and the signature series for τ as the corresponding sequence of signatures $$\sum\nolimits_N^{\tau} = \langle \sigma_1, \ldots , \sigma_N \rangle$$

returned by SIGN.

Security objectives. The security objectives for a tagged signature scheme may be similar to those for an ordinary signature scheme. The objectives may be maintained for a randomly generated key pair, every supported tag τ and every polynomially bounded (in $\ell$) message series $$M_N^{\tau}$$

(and corresponding signature series $$\left.\sum\nolimits_N^{\tau}\right):$$

(a) Correctness. For $$M_N^\tau,$$

is the corresponding signature, then $\langle m_i, \tau, \sigma \rangle$ is valid.

(b) Unforgeability: For messages $$m \notin M_N^\tau,$$

it is computationally infeasible (in $\ell$) for an adversary to produce a valid $\langle m, \tau, \sigma \rangle$ with more than a negligible probability of success, even if the adversary otherwise has full control of the messages and the tags input to the scheme operations. According to an embodiment, the adversary is assumed to respect the scheme's state, i.e., when calling an operation, and the adversary inputs the state output by the previous operation. State management may be a consideration in embodiments. For example, MTL mode is stateful: the signer keeps track of an evolving Merkle tree or node set and updates it as new messages are signed. The underlying signature scheme may or may not be stateful. As is known in the art, it is important to understand the impact of "double-signing," the impact of any adversary causing a signer to reuse the same state as previously used. If the underlying signature scheme is stateful, then a double-signing attack on MTL mode may lead to a double-signing attack on a stateful underlying signature scheme such as HSS/LMS or XMSS^MT, which may compromise security in that components of an HSS/LMS or XMSS^MT one-time private key may be disclosed. If the underlying signature scheme is stateless, however, then a double-signing attack on MTL mode may weaken the security bounds in proportion to the number of additional signatures obtains. An implementation may therefore include different protections against reuse of the state for the underlying signature scheme than for MTL mode itself (e.g., for the evolving Merkle tree), for instance by implementing the underlying signature scheme in a hardware security module.

Signature malleability. According to an embodiment, a tagged signature scheme may be malleable in the sense that given a valid tuple $\langle m, \tau, \sigma \rangle$, an adversary (and anyone else) may be able to produce another valid tuple $\langle m, \tau, \sigma' \rangle$ where $\sigma' \neq \sigma$. This property may not produce a signature on a new message, but just a new signature on an old one. While the condensation/reconstitution process (as well as MTL mode) demonstrates a beneficial use of signature malleability, the property also introduces potential vulnerabilities in applications that rely on a signature as a unique transaction identifier [15]. In particular, a signer should not assume that a transaction has not been recorded simply because the original signature on the transaction does not appear in a transaction ledger. The signer should check for the presence of malleated versions of the signature as well, e.g., reconstituted signatures of the described embodiments.

4. Signature Series Condensation Schemes

Given one or more signature series generated by a tagged signature scheme, the signer may convey a set of signatures to the verifier in fewer bits than if the signatures were sent individually.

Figure 3:
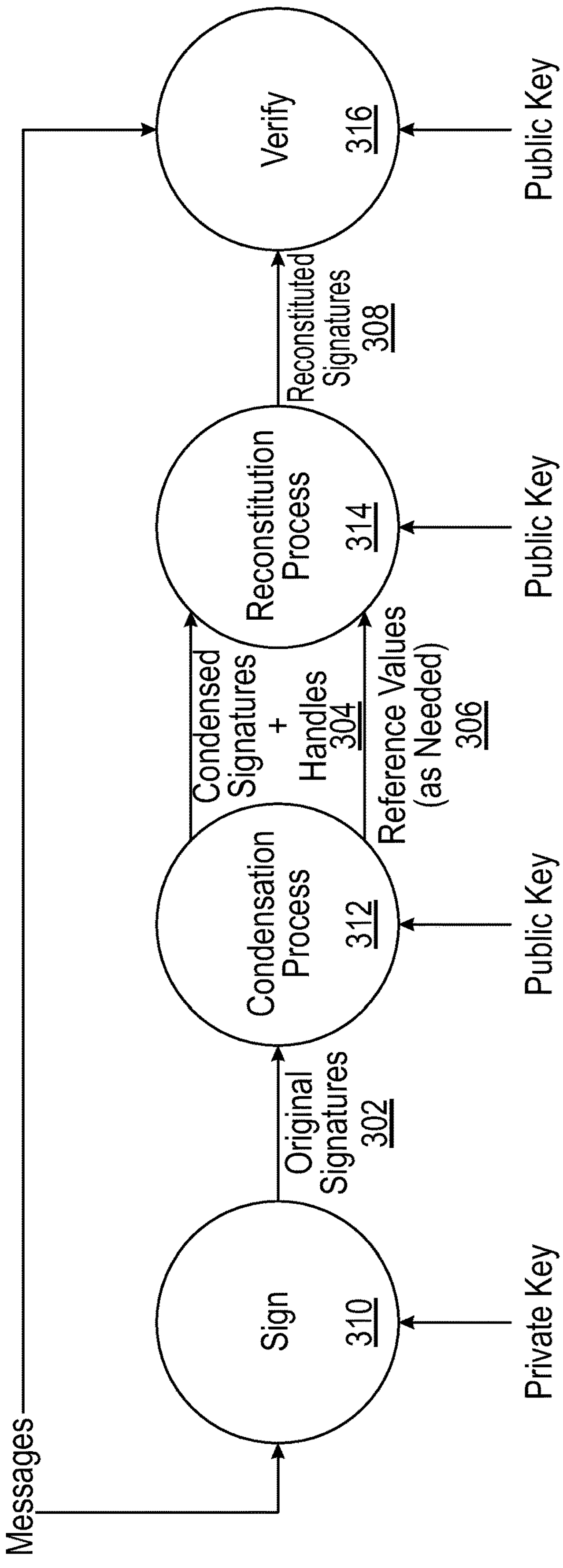
FIG. 3 illustrates condensation and reconstitution for a signature scheme according to one or more embodiments described herein.

FIG. 3 illustrates condensation and reconstitution for a signature scheme according to one or more embodiments described herein. At block 310, a signer signs a series of messages. At block 312, in the condensation process, the signer or an intermediary produces a condensed signature 304 and reference value handle 306 for each of one or more original signatures 302. According to one or more embodiments described herein, the signer or intermediary can produce condensed signatures that are of interest to verifiers, not necessarily all of the original signatures. At block 314, in the reconstitution process, a verifier or an intermediary produces a reconstituted signature 308 from the condensed signature 304, requesting a new reference value based on the handle. The verifier then verifies, at block 316, the reconstituted signature. According to embodiments:

- The signer or intermediary, at block 310, may initialize a condensation scheme state and incorporate the signatures from one or more signature series, each signature an original (or "initial" or "uncondensed") signature 302, signed by the tagged signature scheme into the state. For example, the original signature may be the signature first produced by a signature scheme, prior to condensation. The original signatures may indicate that they were produced by the tagged signature scheme, prior to the condensation and reconstitution processes. In other embodiments, the signer may incorporate signatures that are the output of a reconstitution process.
- When requested, at block 312, the signer or intermediary may produce a condensed signature 304 and an associated reference value handle 306 corresponding to a signature of interest to a verifier. The condensed signature may be computed relative to the state, and the condensed signature returned may change over time as additional signatures are incorporated into the state. The reference value handle 306 may be configured to identify a reference value that can be combined with the condensed signature 304 to obtain a reconstituted signature 308 at block 314. The reference value, too, may change over time.
- The signer or intermediary may resolve a reference value handle into a reference value when requested.
- The verifier, at block 316, or an intermediary may request and obtain a condensed signature and a reference value handle from the signer. The verifier or intermediary may also request a reference value corresponding to the reference value handle. (For example, the verifier may already have a previous reference value that it can use and may or may not request a new one. Indeed, according to embodiments, this reduces the number of times that the verifier has to request a new reference value.)
- The verifier or an intermediary may compute a reconstituted signature from the condensed signature and the relevant reference value, and then verify, at block 316, the reconstituted signature. A verifier may identify that the relevant reference value is already held by the verifier and has been previously verified by the verifier, so the verifier may elect not to verify the reference value again and may instead verify the condensed signature.

The operations described above may involve access to the public key, not the private key, so they can be performed by anyone, not just the signer and the verifier. For instance, a server that publishes messages and signatures on behalf of the signer could incorporate signatures into the condensation state, produce condensed signatures and reference value handles, and resolve reference value handles into reference values. Similarly, an agent that requests messages and signatures on behalf of the verifier could request condensed signatures and reference values. The mapping from handles to reference values could also be implemented by a database.

According to an embodiment, while the condensed signatures and reference values of interest to one verifier may be different than those of interest to another verifier, the operations that produce these values may not necessarily involve any verifier-dependent state. As a result, the arrangement naturally supports multiple verifiers as well as multiple intermediaries between the signer and verifier. According to an embodiment, the operations may be optimized further based on a specific verifier's knowledge.

In addition, while the verifier (or other intermediary) may use the reference value handle and the tag (because the signature scheme is tagged), the verifier may or may not use the index associated with the signature (from an application perspective). The management of the index may remain on the signer's side. The signer (or its intermediary) can simply distribute messages and condensed signatures/reference value handles in the same or similar way as it would distribute messages and ordinary signatures, and manage any indexes internally.

Finally, although condensation and reconstitution are described relative to a tagged signature scheme, the tagging is a convenience, making it possible for the signature scheme to support multiple signature series that can be condensed and reconstituted independently of one another under the same key pair. The processes could also be applied to a non-tagged signature scheme that has suitable properties.

A condensation scheme is described below.

Definition. A condensation scheme $\mathcal{CS}$ may include five operations defined relative to an underlying tagged signature scheme $\mathcal{TSS}$: Initialization, Signature incorporation, Condensed signature production, Reference value production, and Signature reconstitution. (As in Section 3, the operations below could also be described so that the state is updated in place.) Aspects of these operations are described below:

- Initialization. $\textsc{CondenseInit}_{pk}(\ )\rightarrow st_0$ returns a new scheme state $st_0$.
- Signature incorporation. $\textsc{AddOrigSig}_{pk}(\tau, \sigma, st)\rightarrow\langle i, st'\rangle$ incorporates an original signature $\sigma$ associated with a tag $\tau$ into the state st and returns the signature index i for this signature (relative to $\tau$) and the updated state st'. In some embodiments, this operation may incorporate non-original signatures.
- Condensed signature production. $\textsc{GetCondensedSig}_{pk}(\tau, i, st)\rightarrow\langle \varsigma, \chi, st'\rangle$ produces a condensed version $\varsigma$ of the $i^{th}$ signature associated with the tag $\tau$ under the state st and returns the condensed signature $\varsigma$, the associated reference value handle $\chi$, and the updated state st'.
- Reference value production. $\textsc{GetRefVal}_{pk}(\tau, \chi, st)\rightarrow\langle \upsilon, st'\rangle$ produces the reference value $\upsilon$ associated with the tag $\tau$ and the handle $\chi$ under the state st and returns $\upsilon$ and the updated state st'.
- Signature reconstitution. $\textsc{ReconstSig}_{pk}(\tau, \varsigma, \upsilon)\rightarrow\sigma'$ reconstitutes a signature $\sigma'$ from a condensed signature $\varsigma$ and a reference value $\upsilon$ associated with a tag $\tau$ and returns $\sigma'$.

Condensation transcript. Let $\langle pk, sk\rangle$ be a public/private key pair for a tagged signature scheme $\mathcal{TSS}$, let $$M_N^\tau$$

be the message series for a tag $\tau$ and let $$\sum_N^\tau$$

be the corresponding signature series. Suppose that the condensation scheme state is initialized with $\textsc{CondenseInit}$ and that signatures in $$\sum_N^\tau$$

are incorporated into the condensation scheme state with $\textsc{AddOrigSig}$ in the order in which they were generated. (In other words, the input state of the call to $\textsc{AddOrigSig}$ that incorporates $\sigma_j$ is either the output state, or a successor (e.g., the intervening state(s) may reflect calls to $\textsc{AddOrigSig}$ for other tags, as well as to $\textsc{GetCondensedSig}$ and $\textsc{GetRefVal}$) of the output state, of the call that incorporated $\sigma_{j-1}$.) A condensation transcript for the $i^{th}$ message $$m_i \in M_N^\tau$$

may be defined as the tuple $\langle \tau, i, \varsigma, \chi', \upsilon, \sigma'\rangle$ where the values in the tuple are computed as $$\langle \varsigma, \chi, st_1'\rangle := GETCONDENSEDSIG_{pk}(\tau, i, st_1);$$

$$\langle \upsilon, st_2'\rangle := GETREFVAL_{pk}(\tau, \chi', st_2);\text{ and}$$

$$\sigma' := RECONSTSIG_{pk}(\tau, \sigma, \upsilon),$$

and where $st_1$ and $st_2$ are each either the output state of the call that incorporated $\sigma_i$ or a successor of that state (and are distinct states). According to an embodiment, a transcript for $m_i$ is valid under $\mathcal{CS}$ if $\langle m_i, \tau, \sigma'\rangle$ is valid under $\mathcal{TSS}$. Because $\mathcal{TSS}$ is allowed to be malleable, $\sigma'$ may be different than the original signature $\sigma_i$.

Security objective. A condensation scheme may have one security objective. As above, the security objective may be maintained for a randomly generated key pair, every supported tag $\tau$ and every polynomially bounded (in $\ell$) message series $$M_N^\tau:$$

Correctness. For $$M_N^\tau$$

every condensation transcript for $m_i$ where $\chi'=\chi$ is valid.

According to an embodiment, unforgeability is not included as a security objective because a condensation scheme does not introduce any new access to the signer's private key. Its operations can be considered among the capabilities already available to an adversary of the associated signature scheme, provided they are computable within the adversary's polynomial-time bound, hence the bound on the number of signatures in the series.

Reference value compatibility. To reduce the number of times that the verifier has to request a new reference value, it is desirable that the verifier may be able to reconstitute a signature from a condensed signature and a previously obtained or produced reference value, such as a reference value whose handle was returned along with a different condensed signature. A scheme with this property is reference value compatible.

Stateful reconstitution. Just as the condensation operations are stateful, ReconstSig may be restructured so that it maintains state between operations, e.g., with operations, such as the following, which are described with aspects:

ReconstInit$_{pk}$( )→st$_0$ returns a new scheme state st$_0$.

AddCondensedSig$_{pk}$(τ, ς, χ, st)→⟨i, b, st'⟩ incorporates a condensed signature associated with the tag τ and the handle χ into the state st and returns the signature index i for this signature (relative to τ), a flag b indicating whether a new reference value is to be used and the updated state st'.

AddRefVal$_{pk}$(τ, χ, υ, st)→st' incorporates a reference value υ associated with the tag τ and a handle χ into the state st and returns the updated state st'.

GetCondensedSig$_{pk}$(τ, i, st)→⟨σ', st'⟩ produces a reconstituted version σ' of the i$^{th}$ signature associated with the tag τ under the state st and returns σ' and the updated state st'.

By returning the flag, AddCondensedSig automates the reference value compatibility checks mentioned above. If the flag is True, then the verifier may request a new reference value and incorporate it with AddRefVal. Otherwise, the verifier may proceed directly to GetReconstSig. With the stateless version of ReconstSig, the application would perform the reference value compatibility check itself. While this is straightforward in a mode based on the binary rung strategy (just compare i≤N'≤N), the check may be more complex in general (e.g., when directly condensing and reconstituting hash-based signatures as proposed in Appendix D).

5. Merkle Tree Ladder Mode

According to an embodiment, a general technique may be applied to any signature scheme $\mathcal{S}$ to transform it into a tagged signature scheme that can then be condensed, asymptotically, to the size of a Merkle tree authentication path. An approach is to construct an evolving sequence of Merkle tree ladders from the message series and sign each ladder using the underlying signature scheme. Ladders and their signatures may serve as reference values; authentication paths from leaf nodes to the ladders may serve as condensed signatures. As described above, the Merkle Tree Ladder (MTL) mode may be used for the transform process.

According to an embodiment, an original MTL mode signature may be defined, for example, as a tuple $$\sigma = \langle SID, c_i, i, i, i, \Pi_{i,i}, \Lambda_i, \sigma_i^S, d_i \rangle$$

where SID is a series identifier for the node set involved in constructing the Merkle tree ladder, $c_i$ is a randomizer, i is a message index (repeated for compatibility with later uses of the signature format), $\Pi_{i,i}$ is an authentication path from the i$^{th}$ leaf node to the i$^{th}$ ladder, $\Lambda_i$ is the i$^{th}$ ladder, $\sigma^S$ is an underlying signature on the i$^{th}$ ladder, and $d_i$ is a data value computed from the randomizer and the message, from which the i$^{th}$ leaf node is computed. (The verifier may not use $d_i$ to verify the signature, but the signer or an intermediary may use $d_i$ to reconstruct the node set during the condensation process.) The original MTL mode signature can be transformed (by public operations, based on information in other MTL mode signatures) into a reconstituted MTL mode signature $$\sigma' = \langle SID, c_i, i, N, N', \Pi_{i,N}, \Lambda_{N'}, \sigma_{N'}^S, \emptyset \rangle$$

where N and N' are integers such that i≤N'≤N, $\Pi_{i,N}$ is an authentication path from the i$^{th}$ leaf node to the N$^{th}$ ladder, $\Lambda_{N'}$ is the N'$^{th}$ ladder, $$\sigma_N^S$$

is an underlying signature on the N'$^{th}$ ladder, Ø is the empty string, and the other components are as above. Among these components, $c_i$, i and $\Pi_{i,N}$ are specific to a given message. If a verifier already has the other components of the signature, the verifier can combine them with the message-specific components to construct a message-specific reconstituted signature. According to an embodiment, such as described in Section 6, a condensed MTL mode signature may be defined as the tuple $$\varsigma = \langle SID, c_i, i, N, \prod_{i,N} \rangle$$

and a MTL mode reference value as the tuple $$\upsilon = \langle N', \Lambda_{N'}, \sigma_{N'}^S \rangle.$$

Merkle tree ladder mode operations may follow the binary rung strategy $\mathcal{BRS}$ described in Section 2. Because of the general path verification property of this rung strategy, the verification operation will accept both original MTL mode signatures and reconstituted MTL mode signatures. The reference value υ is identified by the MTL mode reference value handle χ=N'.

According to an embodiment, the underlying signature scheme is transformed into a tagged (and stateful) signature scheme so that an application can sign multiple message series with the same public/private key pair and have cryptographic separation between the series. According to an alternative embodiment, $\mathcal{S}$ may be transformed into a non-tagged, stateful signature scheme, where the mode may directly support a single message series for example.

Hash functions. In the following, $H_{msg}$ and $H_{SID}$ may be additional cryptographically separated hash functions. $H_{SID}$ (S, τ)→SID may map a 2ℓ-bit seed and a tag to a series identifier. $H_{msg}$(SID, i, m, c)→d may map a series identifier, an index, a message and a randomizer to a 2ℓ-bit data value. In embodiments, $H_{msg}$(SID, i, m, c)→d may map a series identifier SID, an index i, a variable-length message m and a $\ell_c$ $_c$-bit randomizer c to a ℓ-bit data value d. A message-specific randomizer is included so that the security of MTL mode depends on second-preimage-resistance of an underlying hash function rather than collision-resistance, similar to the example signature schemes except CRYSTALS-Dilithium. According to one or more embodiments described herein, while it might be possible to redesign the combination of MTL mode and the underlying scheme to revert to a single layer of randomization without affecting the combined security properties, a motivation for maintaining the two layers is that the MTL mode operations might be performed in one part of a cryptographic system, and the underlying scheme operations in another part, e.g., in a hardware security module. Having randomization in both parts may then protect against adversarial access either to MTL mode or to the underlying scheme. A similar point about protecting access to the underlying scheme is made in the context of the RSA-PSS specification in Section 9.1 of PKCS #1 v2.2, though the underlying scheme includes randomization in this case. Appendix A describes instantiations of these functions as well as lengths for the tag, series identifier and randomizer.

Tagged signature scheme specification. MTL mode may transform the underlying signature scheme $\mathcal{S}$ into a tagged signature scheme $\mathcal{TSS}$ =MTL[$\mathcal{S}$ ] with the following specification:

- Tag constraints. The tag τ input to MTL mode operations may be a bit string of any length. The mode does not specify any constraints on the number of different tags allowed or the number of messages that may be associated with a given tag. (Implementations may have practical limits.)
- Scheme state. The scheme state includes a security parameter $\ell$, a seed S and a set of series tuples ⟨SID, T⟩ where SID is a series identifier and T is the node set for the series. (The convention in Section 3 is maintained of taking the current state as input to the scheme operation and returning the updated state as output, with the caveat that the large size of the state for MTL motivates the implementation alternative suggested in Section 3 of updating the state in place. The state may also alternatively be included in the private key in embodiments.)
- Key pair generation. KEYGEN($1^\ell$ )→⟨pk, sk, $st_0$⟩ generates a key pair ⟨pk, sk⟩ with security parameter $\ell$ using $\mathcal{S}$, generates a random $2\ell$-bit seed S, creates a new state $st_0$ including $\ell$, S, and an empty set of series tuples, formats the public key pk as $$pk \Leftarrow \langle pk^{\mathcal{S}}, S\rangle,$$

sets the private key sk= $sk^{\mathcal{S}}$ , and returns pk, sk and $st_0$. According to one or more embodiments, the scheme may have additional security parameters, and the sizes of various values may be computed differently (e.g., the seed may not be twice the length of the security parameter and instead may be the same length as the security parameter, or the length of a different parameter). Other sizes may be varied based on security and operational objectives, for example. In embodiments, the state may be included in the private key: KeyGen( $1^\ell$ )→⟨pk, sk⟩.

- Tagged signature generation. $\text{SIGN}_{sk}$(m, τ, st)→⟨σ, st'⟩ computes a series identifier SID as $$SID := H_{SID}(S, \tau),$$

where S is the seed in the state st. Let ⟨ SID, T⟩ be the series tuple for SID in st. If st does not have a series tuple for SID, then SIGN adds a new tuple ⟨ SID, T⟩ to st where the node set T is initialized as $$T := INITNODESET_{\mathcal{BRS}}(SID).$$

SIGN then obtains the leaf node count as $$N := GETLEAFNODECOUNT_{\mathcal{BRS}}(T)$$

and sets i=N+1. SIGN next generates a randomizer $c_i$, and computes a data value $d_i$ via randomized hashing and incorporates it into the node set, obtaining an updated node set T' and a ladder $\Lambda_i$:

$$d_i := H_{msg}(SID, i, m, c_i);$$

$$\langle T', \Lambda_i\rangle = ADDLEAFNODE_{\mathcal{BRS}}(T, i, d_i).$$

SIGN then obtains an authentication path $\Pi_{i,i}$ from the leaf node to the ladder as $$\prod_{i,i} = GETAUTHPATH_{\mathcal{BRS}}(T', i).$$

SIGN then computes an underlying signature $$\sigma_i^{\mathcal{S}}$$

on $\Lambda_i$ as $$\sigma_i^{\mathcal{S}} := \mathcal{S}.SIGN_{sk}(\langle SID, 1, i, \Lambda_i\rangle)$$

and formats the signature σ as $$\sigma \Leftarrow \langle SID, c_i, i, i, i, \Pi_{i,i}, \Lambda_i, \sigma_i^{\mathcal{S}}, d_i\rangle.$$

SIGN finally updates the state with the updated series tuple ⟨ SID, T'⟩ and returns σ and the updated state st'. (Note that SID could be omitted from the signature because it can be computed from the seed and the tag. Including SID makes it possible to start the node set operations before the public key is obtained, provided that other scheme parameters are already known.) In embodiments, $\text{Sign}_{sk}$(m, τ, st)→σ may update the state st in place. In other embodiments, the state may be included in the private key sk, which may be updated in place: $\text{Sign}_{sk}$(m, τ)→σ.

Tagged signature verification. $\text{VERIFY}_{pk}(m, \tau, \sigma) \rightarrow b$ parses the public key pk and the signature σ as $$pk \Rightarrow \langle pk^{S}, S\rangle;$$

$$\sigma \Rightarrow \left\langle SID, c_i, i, N, N', \prod\nolimits_{i,N'}, \Lambda_{N'}, \sigma^{S}_{N'}, d_i^* \right\rangle,$$

then checks that $SID = H_{SID}(S, \tau)$ and verifies the underlying signature $SID = H_{SID}(S, \tau)$ and verifies the underlying signature $\sigma^{S}_{N'}$ on $\Lambda_{N'}$ as $$b^{S} := \mathcal{S} \cdot \text{VERIFY}_{pk^{S}}(\langle SID, 1, N', \Lambda_{N'}\rangle, \sigma^{S}_{N'}).$$

If the parsing or the check fails, or if $b^{S}$ =FALSE, then VERIFY returns FALSE. VERIFY then computes a data value $d_i$ via randomized hashing:

$$d_i = H_{msg}(SID, i, m, c_i),$$

verifies the presumed authentication path $\Pi_{i,N}$ from the leaf node corresponding to $d_i$ to the ladder $\Lambda_{N'}$ as $$b := CHECKAUTHPATH_{\mathfrak{BRS}}\left(SID, i, N, N', d_i, \prod\nolimits_{i,N'}, \Lambda_{N'}\right)$$

and returns b. According to one or more embodiments described herein, for completeness, VERIFY may also check that the final signature component component $d_i^*$, if present, matches $d_i$.

Correctness follows from the general path verification property of the binary rung strategy (where N=N'=i) and from the correctness of $\mathcal{S}$.

Unforgeability can be shown with the usual arguments for a Merkle tree signature scheme. In particular, for an adversary to produce a valid tuple ⟨m, τ, σ⟩ where the message m has not been input to SIGN with tag τ, the adversary must do at least one of the following: (i) forge an underlying signature on a ladder under $\mathcal{S}$; (ii) produce a second authentication path to a previously signed ladder; (iii) produce a second data value that maps to a leaf hash value in a previous node set; (iv) produce a second randomizer/message pair that maps to the data value in a previous signature; or (v) produce a second tag that maps to the same series identifier as a previously signed tag. If $\mathcal{S}$ is unforgeable then the first is infeasible, and if $H_{int}$, $H_{leaf}$, $H_{msg}$ and $H_{SID}$ are second-preimage-resistant (as appropriately defined) then the rest are infeasible.

Because SID and the node indexes are included in the inputs to $\mathcal{S}$. SIGN, $H_{int}$ and $H_{leaf}$, and because a node set is "append only" (node hash values do not change), an adversary can target one node in one node set per hash function invocation, making MTL mode secure in a multi-user (and multi-tag) setting.

A full security proof may consider both the security properties of the MTL mode hash function instantiations and their interaction with the hash functions of the underlying signature scheme. In Appendix A, instantiations are described that are cryptographically separate from the example underlying signature scheme's hash functions where possible. The appendix follows a "concatenate-then-hash" style similar to HSS/LMS. An implementation may prefer a different style that aligns better with a specific scheme's security proof.

Hash function usage outside signature schemes. Two of the five example post-quantum signature schemes considered in Appendix A do not provide a direct way to separate their uses of an underlying hash function from other uses outside the signature scheme. Given that a signature scheme may often be combined with other uses of the same hash function in an application, a common convention for using a hash function within a signature scheme may provide for such separation. The convention supports multi-user/multi-target security [48], where a design goal is to limit each of the adversary's hash function queries to a specific context.

Stateful underlying signature schemes. Although MTL mode is described in terms of a stateless underlying signature scheme, the mode may also readily be applied to a stateful underlying signature scheme by maintaining the state of the underlying scheme in the mode's scheme state.

Alternative signature representation. The signature representation given above, $$\langle SID, c_i, i, N, N', \Pi_{i,N}, \Lambda_{N'}, \sigma^{S}_{N'}, d_i^*\rangle,$$

identifies the ladder associated with the authentication path by the number of leaf nodes N covered by the ladder. For certain rung strategies, e.g., binary rung strategy, the index pair ⟨L, R⟩ of the rung that covers the leaf node can be determined from the leaf node index i and N without knowledge of the ladder itself. The indexes of the sibling hash values in the authentication path can then be determined from i and ⟨L, R⟩, hence the use of i and N to identify the authentication path. In other embodiments, it may be preferable to include ⟨L, R⟩ in the signature explicitly. If this is done, then the indexes of the sibling hash values in the authentication path depend on how the left and right child nodes of an internal node are selected, not necessarily on the rung strategy. This results in the alternative representation $$\langle SID, c_i, i, \langle L, R\rangle, N', \Pi_{i,\langle L,R\rangle}, \Lambda_{N'}, \sigma^{S}_{N'}, d_i^*\rangle.$$

N' still specifies which ladder is in the signature. A condensed signature would have the representation ⟨SID, $c_i$, i, ⟨L, R⟩,, $\Pi_{i,\langle L,R\rangle}$⟩. To verify a signature, a verifier obtains a verified copy of the rung at index pair ⟨L, R⟩ (e.g., as part of a signed ladder that includes the rung), the verifies the authentication path to it as usual. Alternatively, as usual, the verifier may obtain a verified copy of one of the sibling hash values in the authentication path, and then check the rest of the authentication path to it.

6. Condensing and Reconstituting MTL Mode Signatures

This section describes a process to condense and reconstitute signatures, such as signatures produced as described above.

Observe that the signature series for a given tag has enough information to reconstruct the full node set for the series without access to the messages. In particular, each signature includes the relevant leaf node, either as part of a ladder or as an explicit component. The leaf nodes can then be incorporated into the node set in the order in which they were computed to reconstruct the node set. In some embodiments, the leaf nodes may be incorporated in a different order. In some embodiments, a full node set may be reconstructed from the leaf nodes of the original full node set.

The condensation scheme may produce condensed signatures relative to the current node set and thus to the current ladder. The condensed signature includes the authentication path; the reference values include the ladder. Multiple condensed signatures can therefore reference the same ladder, making the reference values reusable.

Condensation scheme specification. The condensation scheme for MTL mode may be specified, for example, as follows. According to one or more embodiments described herein, one or more error checks may be included, but are not included in the operations because they may or may not be used for a formal definition of correctness, which assumes that inputs are provided correctly (the question may be whether the outputs are computed correctly). In practice, to reduce software vulnerabilities and to diagnose operational errors, an implementation may check that the inputs are in valid ranges, that the series identifiers may be consistent with the tags, that the authentication paths and ladders provided may be consistent with the data values, and possibly even that the signatures provided may verify (which may also require the messages to be input to some of the operations). Optimizations may be included, such as recomputing the ladders and authentication paths from the node set rather than storing them separately and removing older signatures and ladders from the state when they are no longer likely to be requested because the condensation process has moved on to newer reference values, but are not included in the operations. An implementation may take these optimizations into account as well.

Scheme state. The scheme state may include a seed S and a set of signed series tuples $\langle$ SID, T, $\bar{c}$, $\bar{\Lambda}$, $\Sigma^{\mathcal{S}}$ $\rangle$ where SID is a series identifier, T is the node set for the series, $\bar{c}$ is the sequence of randomizers for the series, $\bar{\Lambda}$ is the sequence of ladders, and $\Sigma^{\mathcal{S}}$ is the sequence of underlying signatures. (Similar to Section 5, the operations below could also be defined so that the state is updated in place.)

Initialization. CondenseInit$_{pk}$( )→st$_0$ parses the public key pk as $$pk \Rightarrow \langle pk^{\mathcal{S}}, S\rangle,$$

then creates a new state st$_0$ including the seed S and an empty set of signed series tuples.

Signature incorporation. AddOrigSig$_{pk}$(τ, σ, st)→$\langle$ i, st'$\rangle$ parses the signature σ as $$\sigma \Rightarrow \left\langle SID, c_i, i, i, i, \prod\nolimits_{i,i}, \Lambda_i, \sigma_i^{\mathcal{S}}, d_i\right\rangle.$$

Let $\langle$ SID, T, $\bar{c}$, $\bar{\Lambda}$, $\Sigma^{\mathcal{S}}$ $\rangle$ be the current signed series tuple for SID. If the state st does not include a signed series tuple for SID, then AddOrigSig adds a new tuple $\langle$ SID, T, $\bar{c}$, $\bar{\Lambda}$, $\Sigma^{\mathcal{S}}$ $\rangle$ to st where the node set T is initialized as $$T := INITNODESET_{\mathcal{BRS}}(SID)$$

and where $\bar{c}=\bar{\Lambda}=\Sigma^{\mathcal{S}}=\emptyset$, where ∅ denotes an empty sequence AddOrigSig then obtains the leaf node count as $$N := GETLEAFNODECOUNT_{\mathcal{BRS}}(T)$$

and sets i=N+1 (which should be the same as the i in the signature). AddOrigSig next incorporates the data value $d_i$ into the node set, obtaining an updated node set T' and a ladder $$\Lambda_i^*$$

(which should be the same as the $\Lambda_i$ in the signature) as $$\langle T', \Lambda_i^*\rangle := ADDLEAFNODE_{BRS}(T, i, d_i).$$

AddOrigSig then appends the randomizer $c_i$ to $\bar{c}$, producing $\bar{c}$'; appends the ladder $\Lambda_i$ to $\bar{\Lambda}$, producing $\bar{\Lambda}$'; and appends the underlying signature $$\sigma_i^{\mathcal{S}}$$

to $\Sigma^{\mathcal{S}}$, producing $\Sigma^{\mathcal{S}'}$. AddOrigSig finally updates the state with the updated signed series tuple $\langle$ SID, T', $\bar{c}$', $\bar{\Lambda}$', $\Sigma^{\mathcal{S}'}$ $\rangle$ and returns the index i and the updated state st'. In embodiments, AddInitSig(st, σ) may update the state st in place.

Condensed signature production. GetCondensedSig$_{pk}$(τ, i, st)→$\langle$ ς, χ, st'$\rangle$ computes a series identifier SID as $$SID := H_{SID}(S, \tau),$$

where S is the seed in the state st. Let $\langle$ SID, T, $\bar{c}$, $\bar{\Lambda}$, $\Sigma^{\mathcal{S}}$ $\rangle$ be the current signed series tuple for SID. If st does not include a signed series tuple for SID, then GetCondensedSig returns an error. GetCondensedSig then obtains the current leaf node count N and computes an authentication path $\Pi_{i,N}$ from the $i^{th}$ leaf node to the current ladder as $$N := GETLEAFNODECOUNT_{\mathcal{BRS}}(T);$$

$$\prod_{i,N} := GETAUTHPATH_{\mathcal{BRS}}(T, i).$$

GetCondensedSig next formats the condensed signature ç as $$ç \Leftarrow \left\langle SID, c_i, i, N, \prod_{i,N} \right\rangle$$

where $c_i$ is the $i^{th}$ randomizer in the randomizer sequence $\overline{c}$. GetCondensedSig finally sets the reference value handle χ=N and returns ç, χ and the (unchanged) state st'. According to one or more embodiments described herein, although in the description of this operation, the state has not changed, an implementation may cache the input/output values ⟨τ,i,ç,χ⟩ in the state to optimize further requests for the same information. Similar comments may apply to GetRefVal. In embodiments, GetCondensedSig(st, i)→⟨ç, χ⟩ may update the state st in place.

Reference value production. $\text{GetRefVal}_{pk}$(τ, χ, st)→⟨υ, st'⟩ computes a series identifier SID as $$SID := H_{SID}(S, \tau),$$

where S is the seed in the state st. Let ⟨SID, T, $\overline{\Lambda}$, $\Sigma^{\mathcal{S}}$⟩ be the current signed series tuple for SID. If st does not include a signed series tuple for SID, then GetRefVal returns an error. GetRefVal then sets N'=χ and formats the reference value υ as $$\upsilon \Leftarrow \langle N', \Lambda_{N'}, \sigma^{\mathcal{S}}_{N'} \rangle$$

where $\Lambda_{N'}$ is the $N'^{th}$ ladder in the ladder sequence $\overline{\Lambda}$ and $$\sigma^{\mathcal{S}}_{N'}$$

is the $N'^{th}$ underlying signature in the underlying signature sequence $\Sigma^{\mathcal{S}}$. The operation returns υ and the (unchanged) state st'. In embodiments, GetRefVal(st, χ)→υ may update the state st in place.

Signature reconstitution. $\text{ReconstSig}_{pk}$(τ, ç, υ)→σ' parses the condensed signature ç and the reference value υ as $$ç \Rightarrow \langle SID, c_i, i, N, \Pi_{i,N} \rangle;$$

$$ç \Rightarrow \left\langle SID, c_i, i, N, \prod_{i,N} \right\rangle;$$

-continued $$\upsilon \Rightarrow \langle N', \Lambda_{N'}, \sigma^{\mathcal{S}}_{N'} \rangle.$$

ReconstSig then formats the reconstituted signature σ' as $$\sigma' \Leftarrow \left\langle SID, c_i, i, N, N', \prod_{i,N}, \Lambda_{N'}, \sigma^{\mathcal{S}}_{N'}, \phi \right\rangle$$

and returns σ'. According to one or more embodiments described herein, the leaf node hash may be empty regardless of whether i is even or odd, as it may not be used for signature verification.

Correctness and reference value compatibility may follow from the general path verification property of the binary ladder strategy in Section 2 and from the correctness of $\mathcal{S}$. For example, if a reconstituted signature $$\sigma' = \langle SID, c_i, i, N, N', \Pi_{i,N}, \Lambda_{N'}, \sigma^{\mathcal{S}}_{N'}, \phi \rangle$$

for a message $m_i$ and a tag τ is obtained from ReconstSig following the condensation/reconstitution process, and i≤N'≤N, then ⟨$m_i$, τ, σ'⟩ is valid. In particular, CheckAuthPath can verify the authentication path $\Pi_{i,N}$ using any ladder $\Lambda_{N'}$ where i≤N'≤N. Any handle returned by GetCondensedSig after the $i^{th}$ signature may be incorporated into the state may lead to a ladder $\Lambda_{N'}$ that is compatible with the authentication path $\Pi_{i,N}$.

7. Practical Impact of MTL Mode on NIST PQC Signature Algorithms

According to an embodiment, MTL mode can reduce the size impact of the NIST PQC signature algorithms and other signature algorithms with large signature sizes in practice.

For simplicity, embodiment described herein focus on the following single-tag/expanding-series/random-access model. The embodiment divides the operations into iterations and assumes that prior to the first iteration, the signer has signed an initial message series with $N_0$ messages in association with the same tag τ and the verifier has received the reference value $\upsilon_{N_0}$. According to one or more embodiments described herein, the setup may be in some sense a "historical" view: The verifier may have been processing signatures, and at this point has at last used a new reference value, and thus has received υ_(N_0). The embodiment assumes that during each iteration, the signer signs α additional messages and the verifier requests condensed signatures on ρ messages, where the signatures of interest are randomly and independently chosen among the signatures generated up to and including that iteration.

If the verifier is interested in a signature on message $m_{i'}$ and $i' \leq N_0$, then because of MTL mode's reference value compatibility, the verifier can produce a valid reconstituted signature from a newly received condensed signature corresponding to $m_{i'}$ and the reference value $\upsilon_{N_0}$. (In this scenario, the condensed signature is assumed to be produced relative to the current message series, which has $N \geq N_0$ messages.) If $i' > N_0$, however, then the verifier may request a new reference value.

Under the operational assumptions of the embodiment, the probability that a verifier does not request a new reference value during any of the first k iterations is equal to the product $$\prod_{t=1}^{\kappa}\left(\frac{N_0}{N_0+t\alpha}\right)^{\rho}=\prod_{t=1}^{\kappa}\left(\frac{1}{1+t\alpha/N_0}\right)^{\rho}.$$

Assuming $N_0$ is much larger than ρ and α, this probability can be approximated as:

$$\prod_{t=1}^{\kappa}\exp(-t\alpha\rho/N_0)\approx\exp(-\kappa^2\alpha\rho/2N_0).$$

(The analysis is similar to the Birthday Paradox.) Accordingly, the number of iterations can be estimated until the probability reaches ½ as $$\kappa\approx\sqrt{2\ \ln\ 2}\ \sqrt{N_0/\alpha\rho}.$$

It follows that the number of condensed signatures can be estimated until the verifier will request a new reference value as $$K=\kappa\rho\approx\sqrt{2\ln 2}\sqrt{N_0\rho/\alpha}.$$

(Intuitively, when α increases, K decreases because the signature series changes faster per request, whereas when ρ increases, K increases because the signature series changes more slowly.)

The reduction in signature overhead for five NIST PQC signature algorithms is considered with example parameters given in Table 1. The variants of CRYSTALS-Dilithium, FALCON and SPHINCS$^+$ with the shortest signatures (see Tables 8 and 9 in [1]) were selected. The recommended parameterization of XMSS^MT with the shortest signatures (see Table 5 in [20]) were selected with a comparable parameterization of HSS-LMS.

TABLE 1

NIST PQC signature algorithms with example parameters selected for analysis.

| Signature Algorithm (Parameters) | Claimed Security | Signature Size (bytes) | Reference |
|---|---|---|---|
| CRYSTALS-Dilithium | Level 2 | 2420 | [16] |
| FALCON-512 | Level 1 | 666 | [17] |
| SPHINCS$^+$-128 s | Level 1 | 7856 | [18] |
| HSS-LMS (L = 2, LMS_SHA256_M32_H10, LMOTS_SHA256_N32_W8) | n/a | 2964 | [19] |
| XMSS^MT (XMSSMT-SHA2_20/2_256) | n/a | 4963 | [20] |

For the analysis, set $N_0$=10,000, so the ladders include up to 14 hash values and the authentication paths include up to 13. According to an embodiment, a security parameter of 128 and hash size of 256 bits can be selected to match the underlying signature algorithms, and used the hash instantiations in Appendix A. The sizes of the various MTL mode components can be computed as follows:

Original signature $$\sigma=\left\langle SID, c_i, i, i, i, \prod_{i,i}\Lambda_i, \sigma_i^S, d_i\right\rangle \text{ is}$$
$$16+32+4+4+4+4+13\times 32+14\times 32+32=956 \text{ bytes}$$

plus the size of the underlying signature $$\sigma_i^S.$$

Condensed signature $$\varsigma=\left\langle SID, c_i, i, N, \prod_{i,N}\right\rangle \text{ is } 16+32+4+4+13\times 32=472 \text{ bytes.}$$

Reference value $$\upsilon=\left\langle N', \Lambda_{N'}, \sigma_{N'}^S\right\rangle \text{ is } 4+14\times 32=452 \text{ bytes}$$

bytes plus the size of the underlying signature $$\sigma_{N'}^S.$$

In other embodiments, MTL mode may be parameterized with further reduction in condensed signature size. With parameters $\ell=\ell=128$ in such embodiments, wherein $\ell$ is the size of the hash value and $\ell_c$ is the size of the randomizer, and maintaining $N_0$=10,000, MTL mode could then have a condensed signature size of 248 bytes. Such parameters could meet NIST security level I. The parameters and sizes may be adjusted to meet other security levels, including NIST security level V, with $\ell=\ell_c$=256, resulting a 472-byte condensed signature size as above.

Here, the relatively small overhead of specifying the tag τ is ignored, as well as protocol overheads, such as identifying public keys that would be used in the underlying signature scheme as well.

The effective signature size may be defined as $$\phi(K, K')=|\varsigma|+\frac{K'}{K}|\upsilon|;$$

where K is the number of condensed signatures received, K' is the number of reference values received, |ς| is the size in the bits of a condensed signature and |υ| is the size in bits of a reference value. The effective signature size thus reflects the average number of bits that the signer sends per signature of interest. (This assumes that |ς| and |υ| are constant for a given instantiation of the scheme and have ignored the presumably short handle χ and other protocol overheads for simplicity.)

Figure 4:
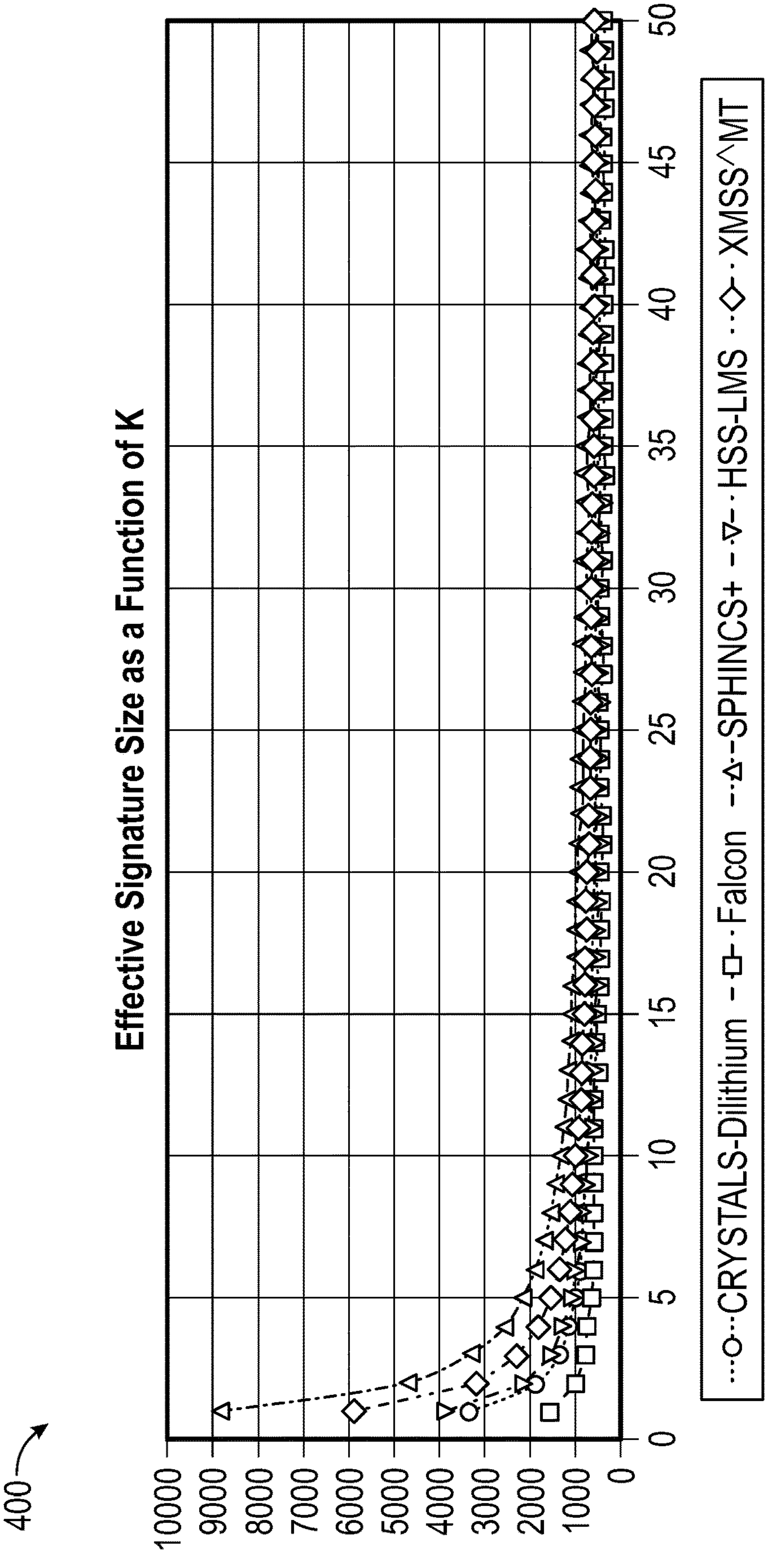
FIG. 4 shows a graph of the effective signature size $\phi(\varsigma, \tau, K)$ as a function of K for five examples according to one or more embodiments described herein.

FIG. 4 shows a graph 400 of the effective signature size φ(K, 1) in bytes as a function of K for the five examples. In this example, the five examples are five post-quantum algorithms with example parameters as a function of a number of condensed signatures per reference value. The number of reference values received is set to K'=1, given that the initial reference value has been received up until this point. The effective signature size becomes smaller than the underlying signature size when K=6 for Falcon and K=2 for the other examples.

Figure 5:
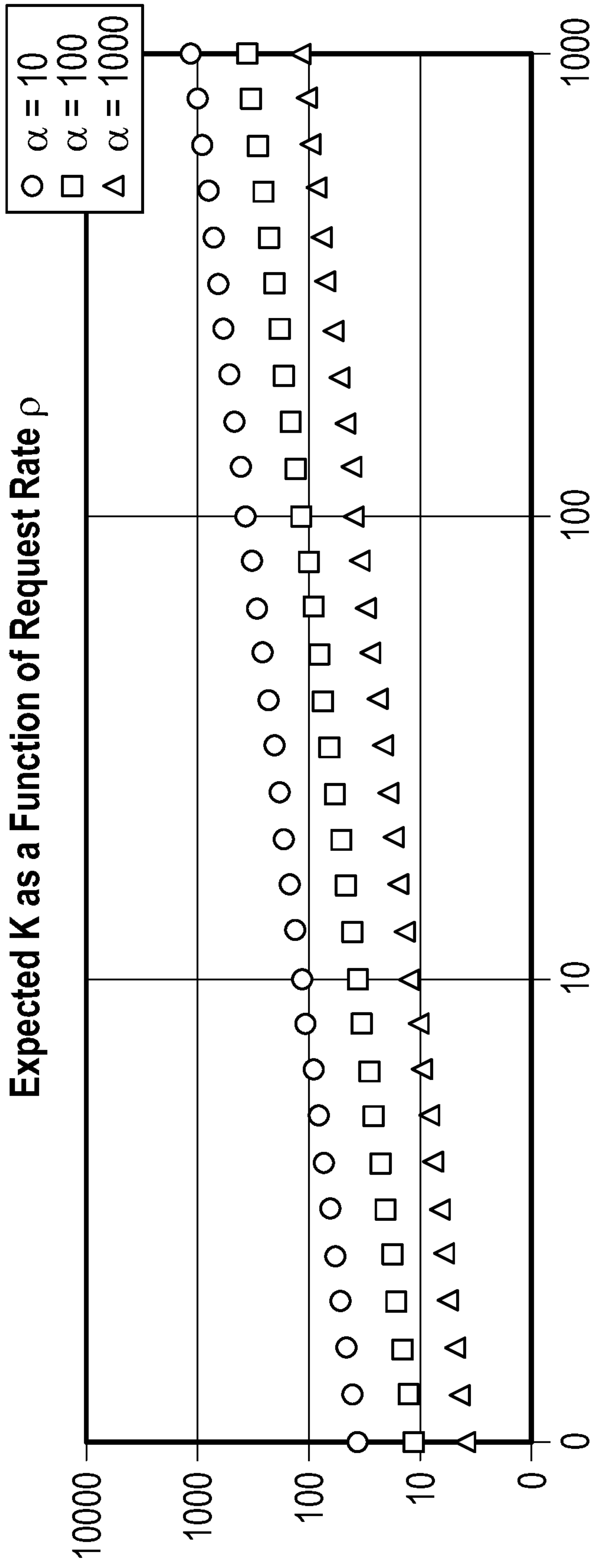
FIG. 5 shows a graph of the expected value of K as a function of $\rho$ for three values of a (10, 100, 1000) according to one or more embodiments described herein.

FIG. 5 shows a graph 500 of the expected value of K as a function of request rate ρ for three values of α (10, 100, 1000). In this example, the expected number of condensed signatures per reference value as a function of a number of additional messages signed per iteration (α) and number of signatures requested per iteration (ρ). The initial number of signatures is $N_0$=10,000. Under at least a portion of this range of operational assumptions, except when ρ is near its low end and α is at its high end, it is reasonable to expect that K will be large enough that the effective signature size will be less than the underlying signature size for these examples. The ongoing effective signature size may be even less than the estimate because the signature series is expanding. The expected number of signatures until the next reference value is used will therefore become smaller than for the initial signature series.

The embodiments may be applied to other modes of operation, as described below:

Multiple message series: According to an embodiment, the condensed signature size may be made even smaller by arranging the messages into multiple series, each with a different tag; the smaller series would result in a shorter maximum authentication path size than a combined series. For example, the analysis may account for the larger number of reference values that would have to be maintained.

Condensing underlying signatures: The embodiments may further consider constructions where part of the authentication path is included in the reference value or where the underlying signature within the reference value is itself conveyed via a condensable signature scheme. (As discussed in Appendix D, the three underlying hash-based signature schemes support a modest amount of condensation with certain parameter sets.)

Storage optimizations: With MTL mode, a server that performs condensation operations potentially stores for each message series, the current ladder, its underlying signature, the Merkle tree nodes and the per-message randomizers—an average of less than two nodes and one randomizer per message, plus the overhead of the ladder and the underlying signature. This can be a significant savings compared to storing an underlying signature for each message.

Batch signing and verification: When multiple messages are signed during an iteration, it is possible to "batch" the signing and reduce the number of underlying signatures by signing just a single updated ladder that spans the newly signed messages. The initial signatures produced for these messages would then be relative to this single ladder rather than per-message ladders. The verifier may also effectively batch verification if the underlying signatures are verified as reference values are received. MTL mode may therefore improve effective signing and verification performance compared to the underlying signature algorithm.

Hybrid signature schemes: MTL mode can also help make hybrid signature schemes more practical. In these schemes (also known as dual or composite schemes), the signer employs two or more signature schemes in parallel (e.g., a pre-quantum and a post-quantum scheme, or multiple post-quantum schemes). If the underlying signature scheme itself is a hybrid scheme, then MTL mode can be applied to it directly. Alternatively, a variant MTL mode of operation could be defined in terms of multiple underlying signature schemes, where the evolving Merkle tree ladder is signed using each of the schemes. Either way, the additional signatures involved would impact the size of the reference values but not the condensed signatures and would thus have a reduced impact on the effective signature size.

Caching condensed signatures: Caching condensed signatures may use special processing because the reference values held in a cache may be older than the one held by the verifier and the reference value compatibility property may not necessarily apply. Appendix F provides guidance on how to handle caching of condensed signatures in practice.

8. Related Work

A binary rung strategy may appear under different names in other cryptographic constructions based on Merkle trees. Champine defines a binary numeral tree [23], with similar structure (the successive complete binary subtrees are called eigentrees), and also specifies additional operations on the tree, such as a proof that leaf nodes are consecutively ordered. Champine also references of related constructions including Certificate Transparency [9]. The earlier constructions also include Crosby and Wallach's history trees [24] and Todd's Merkle mountain ranges [25]. Bünz et al. [26] provide a formal definition and analysis of the latter variant.

Cryptographic accumulators [27] may have a similar structure to condensation and reconstitution in that a common accumulator value (viz, reference value) helps a verifier authenticate multiple elements, each of which has a witness relative to the accumulator value (viz, condensed signature). Reyzin and Yakoubov's accumulator [28], applying a binary numeral tree construction, also achieves an "old-accumulator compatibility" property comparable to general path verification for Merkle tree ladders.

While cryptographic accumulators may authenticate messages, the operations do not involve a public/private key pair and the accumulator/witness combination is not a signature per se.

Verkle trees, proposed by Kuszmaul [29] and further elaborated by Buterin [30] replace the hash function that authenticate pairs of subtrees in a conventional Merkle tree construction with a vector commitment scheme [31] that authenticates a large number of subtrees. With the proposed construction, the size of the authentication path can be significantly reduced. However, the construction is based on pre-quantum techniques. Peikert, Pepin and Sharp [32] propose a post-quantum vector commitment scheme, but the size of its authentication path is on the same order of a conventional Merkle tree. Buterin [30] suggests Scalable Transparent ARguments of Knowledge (STARKs) [33] as another post-quantum alternative for Verkle trees.

Aggregate signatures convert multiple signatures into a shorter common value. In Boneh et al.'s original construction [34], a verifier can then authenticate each signed message based on the aggregate signature, provided that the verifier also has access to the other messages that were signed. Aggregate signatures can thus reduce the size impact of the signature scheme to which they're applied when the verifier has a large number of messages to verify. Khaburzaniya et al. show how to aggregate hash-based signatures using hash-based constructions [35]. Goyal and Vaikuntanathan [36] introduced a scheme where the signatures can be made "locally verifiable" such that the verifier accesses specific messages of interest. However, their constructions are limited to pre-quantum techniques (e.g., bilinear maps, RSA).

Merkle tree constructions may be applied to the problem in of authenticating an evolving or "streaming" data series by Li et al. [37]. Papamanthou et al. propose an authenticated data structure for a streaming data series [38] that uses lattice-based cryptography rather than traditional hash functions. The construction provides additional flexibility and efficiency, as well as a potential path toward post-quantum cryptography for such constructions.

Stern et al. [14] describe signature malleability in the limited sense adopted here. Chase et al. [39], building on work by Ahn et al. [40] and Attrapadung, Libert and Peters [41] broaden the definition to include the ability to produce a new signature on a message related in a specified way to a message that has already been signed. MTL mode use the narrower property, among others. Decker and Wattehofer [15] analyze claims that the bankruptcy of the MtGox exchange was a result of an attack involving signature malleability. They concluded that while signature malleability is a concern for the Bitcoin network, there is little evidence of such attacks prior to the organization's bankruptcy. Nevertheless, when MTL mode or other similar techniques employing malleability are employed, applications should take care not to assume that a given signature is the valid signature on a message.

Focusing on the Transport Layer Security protocol, Sikeridis, Kampanakis and Devetsikiotis anticipate that the TLS certificate chain and the server's signature in the TLS handshake would become the "bottleneck of [post-quantum] authentication" from a size and processing perspective [42]. Their observations further motivate TLS protocol extensions where the server omits any certificates that the client already has. Sikeridis et al. [43] propose an efficient signaling technique for determining which intermediate certificates to omit or "suppress." Suppression may be complementary to condensation in that it reduces communication cost when the client already has a given certificate, whereas condensation helps when the client has a different certificate signed by the same certification authority.

Kudinov et al. [44] propose several techniques for reducing the size of SPHINCS$^+$ signatures, including an example with 20% savings. Baldimtsi et al. [45] describe a general framework for reducing the size of cryptographic outputs using brute-force "mining" techniques, estimating 5-12% savings. Such techniques are complementary to condensation as they reduce the size of the underlying signature whereas condensation reduces sending full underlying signatures.

9. Conclusion

MTL mode can help reduce signature size impact in practical application scenarios. This mode, or another mode with similar properties based on the disclosure herein, can be used in a standard way for PQC signature algorithms in message series-signing applications where signature size impact is a concern.

The condensed signature size of 472 bytes, for example, is smaller than the signature size of any of the five NIST PQC examples considered. According to one or more embodiments described herein, other condensed signature sizes are supported, such as 248 bytes as described herein. In addition, for SPHINCS$^+$, the most conservative of the examples, the original MTL mode signature size is less than 12% larger than the underlying signature size. As a result, an application could gradually deploy MTL mode for SPHINCS$^+$ with an initial increase in signature size of 12% for signers and verifiers that do not support condensation and reconstitution, and an eventual decrease of 94% for those that do (plus the reference value overhead). (As noted, the condensed signature size can be made even smaller by arranging the messages into multiple series.)

One or more embodiments described herein provide constituted/reconstituted and condensed signatures for specific usages, such as DNSSEC, X.509 certificates, Certificate Revocation List, and/or the like including combinations and/or multiples thereof). It should be appreciated that these embodiments are merely some of the possible use cases, that actual formulations for these usages may vary, and that other formulations may be used to meet usage-specific specification. For example, the condensation and reconstitution processes may be beneficial in certain use cases, such as for minimizing the amount of data high-volume validating DNS resolvers pull to support DNSSEC validation. According to an embodiment, resolvers can perform condensation and reconstitution with this supported by resolvers pulling sufficient side information from an authoritative name server or some other intermediary to support constructing needed Merkle trees and pulling signed MTLs that can verify messages that are covered by those Merkle trees.

One or more benefits are possible resulting from applying a binary rung strategy to a service that performs condensation, reconstitution, and verification, such as in the case of optimizing resolver DNSSEC validation. For example, substantially identical and/or backward compatible Merkle trees can be built based on a consecutive series of messages or leaf values where the sequence starts at the first message or leaf value. As another example, in embodiments where messages are to be kept private unless specifically requested and received by a verifier and a service, in some embodiments an element of the verifier, provides condensed and reconstituted signatures to the verifier, a consecutive sequence of leaf values may be provided to the service to preserve the privacy of other messages in the message series. As another example, in some embodiments, Merkle trees may be provided to a service rather than a message series or leaf series. As yet another example, to verify a message covered by a consecutive series of messages or leaf values, a verifier that has built the corresponding Merkle trees can then just identify a rung from a signed ladder where the rung covers the message index and the rung includes a node from the corresponding Merkle trees. If such a rung exists, an authentication path can be assembled from one of the Merkle trees to the rung and then the message may be verified against the rung. This process provides for a service providing messages that are to be verified to just identify the index of the message in lieu of a signature on the message. This provides enough information for the verifier to generate the condensed signature and verify it against the identified rung. According to yet another example, in cases where the verifier is not holding a rung that can verify the message, the message includes an index that is beyond the highest message index for the messages or leaves that the verifier has previously received. In this case, the verifier can pull the latest signed MTL then pull messages or leaves up to the highest R value for a rung in the MTL, then update their Merkle trees to cover the message, then perform verification as described herein. It should be appreciated that using the binary rung strategy provides for updating the Merkle trees uses at most 2*delta−1 hash calculations where delta is calculated as N'−N, where N' is the highest message/leaf index held by the verifier prior to pulling messages/leaves, and N is the highest message/leaf index held by the verifier after pulling messages/leaves.

Based on the disclosure herein, detailed, interoperable specifications for MTL mode and their implementation choices (parameter values, functions $H_{msg}$, $H_{leaf}$, $H_{int}$, $H_{SID}$, signature and reference value formats, algorithm identifiers, etc.) may be developed. Operational characteristics of MTL mode for various underlying signature schemes and operational assumptions may also be modeled.

In addition, MTL mode may integrated into applications, such as those involving web PKI, DNSSEC, and certificate transparency. According to an embodiment, a "semi-indirect" format may be used where a signer conveys a condensed signature ç together with information on how the verifier may resolve the associated handle $\chi$ into a reference value. For instance, in web PKI or certificate transparency application, the information could be a uniform resource identifier (URI) that the verifier may contact to resolve the handle; in DNSSEC, the information could be a domain name where the reference value is stored and/or from which the information may be obtained. The information could also be a content address. (Some information about how to resolve a handle or access condensation scheme operations may also be conveyed in the representation of the public key and/or in the format for an uncondensed signature.)

According to an embodiment, for incremental deployment, a signaling mechanism where a verifier or intermediary may indicate whether it supports condensed signatures. If it does, and the signer (or its intermediary interacting with the verifier) also supports condensed signatures, the signer/intermediary can return a condensed signature and handle (perhaps in the semi-indirect format). If not, then the signer/intermediary can return an uncondensed signature, which could be, for instance, an original (initial) MTL mode signature, or a reconstituted MTL mode signature. According to one or more embodiments described herein, a verifier or its intermediary may also indicate to a signer/intermediary whether the verifier or intermediary wants a condensed signature or an uncondensed signature. In this way, a verifier or intermediary may obtain an uncondensed signature when the verifier or intermediary does not have a suitable reference value to reconstitute a condensed signature.

Signature candidates with shorter signature sizes and more cryptographic diversity than the current NIST PQC signature algorithms are desirable and complement the MTL modes described herein. MTL mode may be further employed for new algorithms with a much shorter signature size, because MTL mode can be applied to any of the current algorithms, thereby maintaining diversity.

The techniques disclosed herein and/or incorporated herein (U.S. Provisional Patent Application No. 63/356,973, U.S. Provisional Patent Application No. 63/406,699, and U.S. Provisional Patent Application No. 63/416,909) can generally be applied to other "tree-based" structures (Merkle tree, Verkle tree, etc.) wherein a node authenticates its subtree (via a hash function, vector commitment, STARK, etc.) and wherein the authenticity of a leaf node can be verified via an authentication path (siblings at each level—one in the case of a binary Merkle tree, potentially many in a non-binary Merkle tree or Verkle tree) from the leaf node to another node (root, rung, etc.). More generally, the techniques may be applied to non-tree-based or partially tree-based mechanisms e.g., non-tree-based cryptographic accumulators, and wherein each ladder rung authenticates a subset of data values via such mechanisms. The rung strategy may have a built-in backward compatibility property (as is the case for the binary rung strategy). The rung strategy may also be designed so that ladders have a sufficiently large "endurance" (as described by Applicant in U.S. Provisional App. No. 63/356,973), without relying on the backward compatibility property; the extended binary rung strategy (described in U.S. Provisional App. No. 63/356,973) has such a property (with the previously noted factor of $\sqrt{3}$ reduction in the expected number of condensed signatures per reference value). Other rung strategies previously disclosed may also be employed, e.g., spaced extended-binary-rung optionally combined with variable-spaced-rung. Endurance, such as for a Merkle tree ladder, may be described as an expected or estimated number of successive responses or signatures that can be verified with at least a 50% overall probability of success, e.g., without having to obtain a new reference value. Endurance may depend on a number of factors including ladder construction strategy, a number of data items in the Merkle tree, Merkle tree update pattern, verifier query pattern, and response indexes.

Modes of operation have historically provided a way to realize additional capabilities from an underlying cryptographic technique, such as a block cipher in the case of NIST's classic modes. In the case of public-key cryptography, some of the ways that a key encapsulation mechanism may be used (see for a recent example) could also be considered like modes of operation. MTL mode can offer a way to achieve additional capabilities from signature schemes as well.

10. Example System for Digital Signatures with an Evolving Merkle Tree

Figure 6:
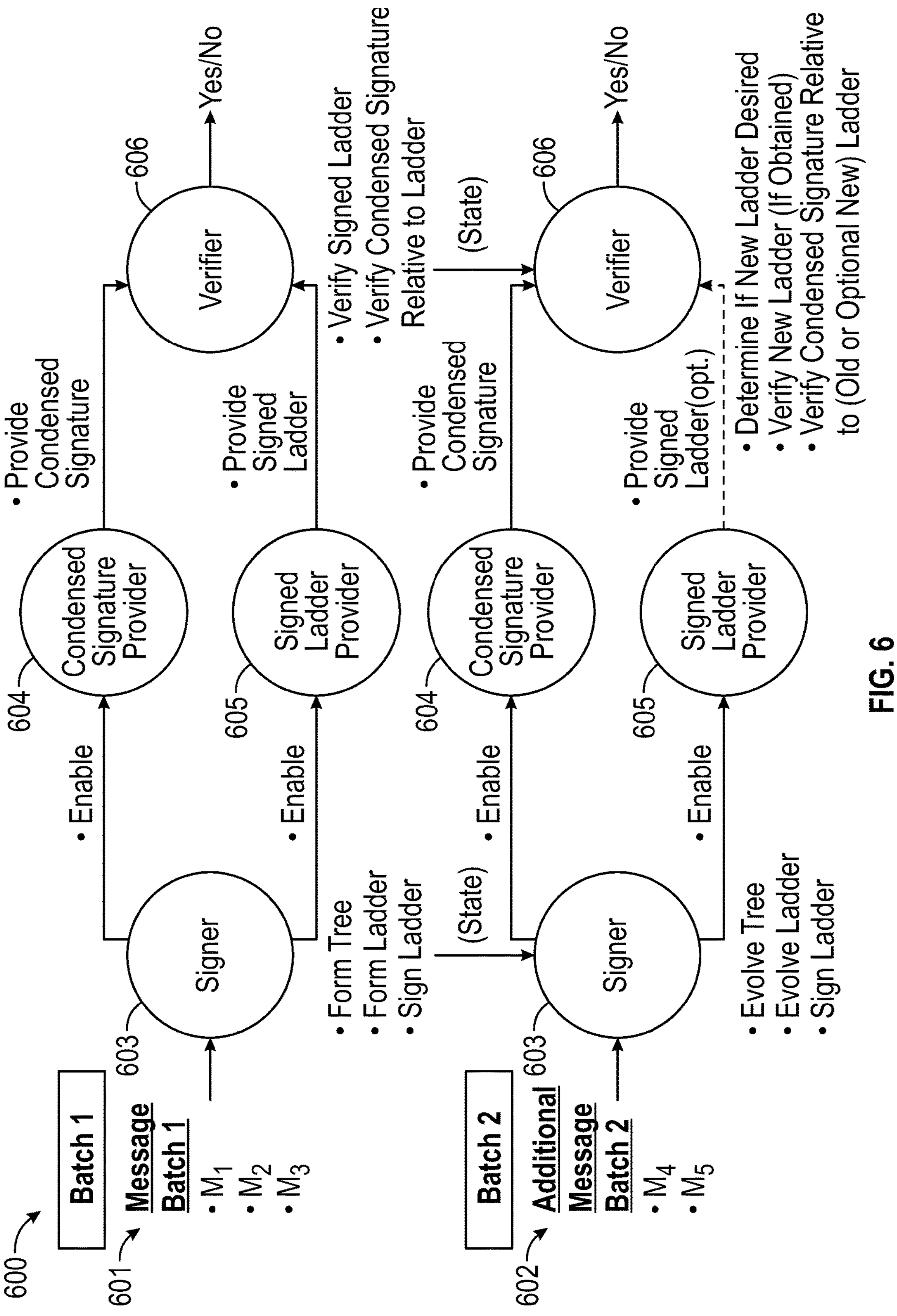
FIG. 6 shows a block diagram of a system for authentication with an evolving Merkle tree according to one or more embodiments described herein.

FIG. 6 shows a block diagram of a system 600 for digital signatures with an evolving Merkle tree according to one or more embodiments described herein. In the example of FIG. 6, two batch signing and verification processes are performed for a first message batch 601 and a second message batch 602. In this example, the first message batch 601 includes messages $M_1$, $M_2$, and $M_3$, and the second message batch 602 includes messages $M_4$ and $M_5$. According to one or more embodiments described herein, the first message batch 601 and the second message batch 602 may be signed at consecutive times.

The signer 603 signs one or more sequential batches of messages (e.g., the messages $M_1$, $M_2$, and $M_3$ of the first message batch 601) using an evolving Merkle tree that accumulates messages from each batch. For the messages of the first message batch 601, the signer 603 signs the messages $M_1$, $M_2$, and $M_3$ in a three-step process according to an embodiment. First, the signer 603 forms a Merkle tree from the messages. It should be appreciated that the Merkle tree can include multiple trees in some examples and may be referred to as a node set. Second, the signer 603 forms a ladder having one or more tree nodes selected according to a rung strategy. Third, the signer 603 signs the ladder with an underlying signature scheme. In some embodiments, the processes of forming Merkle trees, forming ladders, and signing ladders may be performed by independent providers. The signer 603 then enables a condensed signature provider 604 to provide a condensed signature (alternatively, an authentication path) for one or more messages of interest to a verifier 606. The signer 603 also enables a signed ladder provider 605 to provide a signed ladder for the first batch 601 to the verifier 606. According to an embodiment, the three steps may be performed by a single party operating as or on behalf of the signer 603. According to another embodiment, the three steps may be performed by two or more different parties each operating as or on behalf of the signer.

One or more of the parties may operate a hardware security module. According to an embodiment, the signer 603 may serve as one or both of the condensed signature provider and/or the signed ladder provider, and each provider may also be served by a party separate from the signer (e.g., the same separate party for both). The signer 603 may enable the providers 604, 605 to perform the operations described by providing the providers with one or more of the messages of the first message batch 601, their hash values, nodes of the tree, authentication paths, condensed signatures, and/or signed ladders. According to an embodiment, the condensed signature provider 604 and the signed ladder provider 605 can be combined to form a combined provider. In such cases, the combined provider may also provide a combination of a signed ladder and a condensed signature (e.g., an "uncondensed signature") in a combined operation. The verifier 606 may then obtain a condensed signature for a message of interest, and upon determining that a new signed ladder is desired, obtain a combination of a new signed ladder and the condensed signature.

The verifier 606 uses a two-step process for the first message batch 601 according to an embodiment, upon obtaining a condensed signature relative to a signed ladder from the condensed signature provider 604 and a signed ladder from the signed ladder provider 605. First, the verifier 606 verifies the signed ladder from the signed ladder provider 605. Second, the verifier verifies the condensed signature from the condensed signature provider 604 relative to the signed ladder. According to an embodiment, if the rung indexes are included in the ladder along with the rung hash values, and the condensed signature indicates the rung that the condensed signature is computed relative thereto, then the verifier 606 can operate without knowing which rung strategy the signer 603 used to verify the condensed signature relative to the ladder. In this way, the verifier 606 is configured to verify signatures without adapting logic of the verifier 606 to accommodate the rung strategy used by the signer 603.

For the second message batch 602, the signer 603 signs the messages $M_4$ and $M_5$ of the second message batch 602. The signer 603 uses an incremental process with a three-step process according to an embodiment. First, the signer 603 evolves a previous Merkle tree to include the additional messages (e.g., the messages $M_4$ and $M_5$). Second, the signer 603 forms a new ladder using the evolved Merkle tree. As above, it is appreciated that the evolved Merkle tree can include multiple trees in some examples and may be referred to as a node set. Third, the signer 603 signs the new ladder.

In the system 600, the knowledge of the verifier 606 of the ladder for the first message batch 601 may help the 606 verifier verify signatures on messages in the second batch. In particular, the verifier 606 may or may not obtain a new ladder for the second message batch 602 (or other future batches). For example, because the batches accumulate messages, the verifier 606 can request condensed signatures for messages from prior batches (e.g., the first message batch 601) during the current batch (e.g., the second message batch 602). If the verifier 606 already has a signed ladder for a prior batch (e.g., the first message batch 601), the verifier 606 can potentially verify the condensed signature provided during the current batch (e.g., the second message batch 602) for such a message, relative to the ladder for the prior batch. A verifier may also use previously verified Merkle tree nodes in addition to and/or instead of ladders to verify the new condensed signature according to embodiments.

The verifier 606 uses a three-step process in the second and future batches according to one or more embodiments described herein, upon obtaining a condensed signature relative to a signed ladder from the condensed signature provider 604: First, the verifier 606 determines (e.g., based on information associated with the condensed signature) whether a new signed ladder is desired. The determination may also consider Merkle tree nodes held by the verifier, in addition to previously verified ladders. The verifier 606 may also request additional Merkle tree nodes from the signer or other parties, in addition to signed ladders. According to one or more embodiments described herein, if the rung indexes are included in the ladder along with the rung hash values, and the condensed signature indicates the rung that the condensed signature is computed relative to, then the verifier 606 may operate without knowing the choice, by the signer 603, of rung strategy to determine whether a new signed ladder is desired. If a new signed ladder is desired, the verifier 606 obtains the new signed latter. Second, the verifies the new signed ladder (if obtained). Third, the verifier 606 verifies the condensed signature relative to the signed ladder (e.g., the old signed ladder or the new signed ladder as appropriate).

11. Example Apparatus

Figure 7:
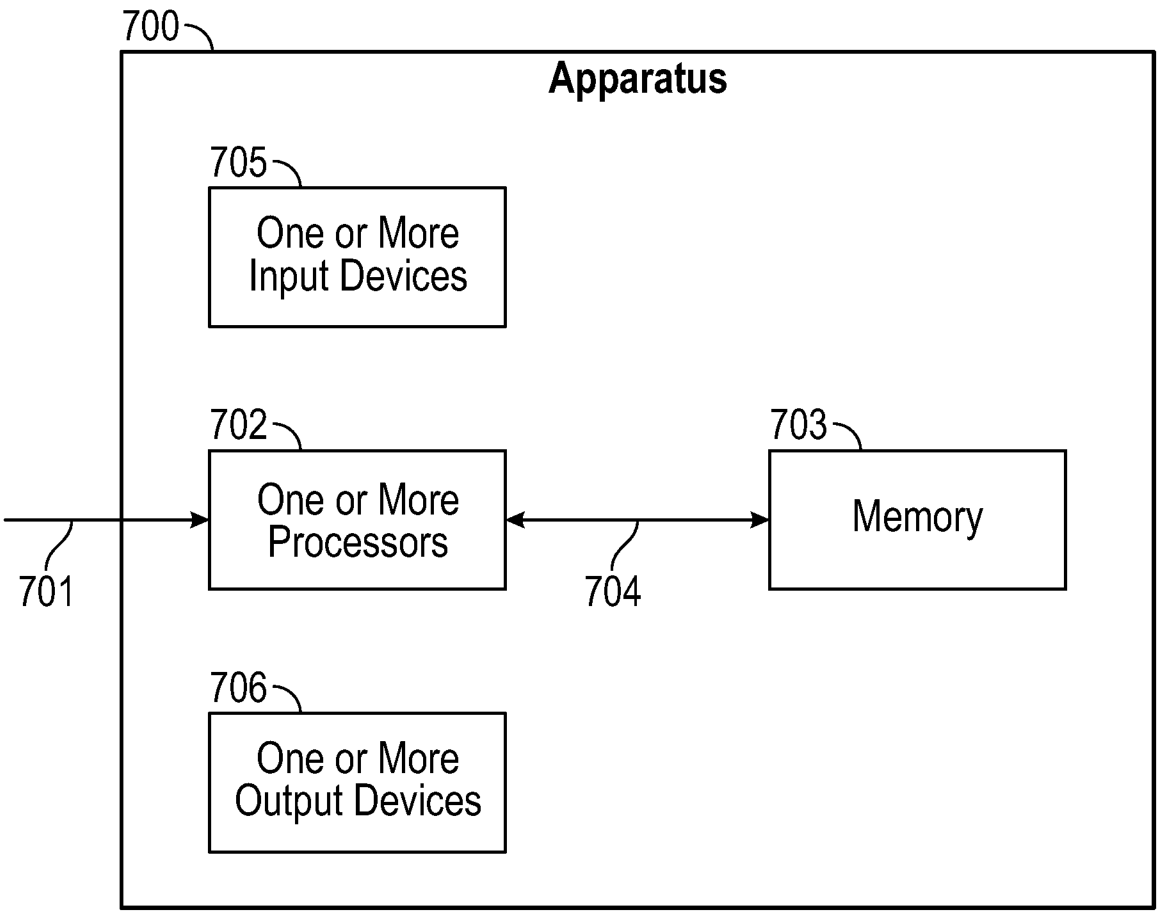
FIG. 7 depicts an apparatus to implement various embodiments and aspects thereof disclosed herein according to one or more embodiments described herein.

FIG. 7 depicts an apparatus 700 to implement various embodiments and aspects thereof disclosed herein. In this example, the apparatus 700 includes one or more processors 702, one or more output devices 706, a memory 703, and one or more user input devices 705. The apparatus 700 may be used to implement any of the methods described throughout this disclosure and/or the various components of the systems described herein, such as the components of the DNS system.

The one or more processors 702 may include a general-purpose processor, an integrated circuit, a server, other programmable logic device, or any combination thereof. The processor may be a conventional processor, microprocessor, controller, microcontroller, or state machine. The one or more processors may be one, two, or more processors of the same or different types. Furthermore, the one or more processors may be a computer, computing device and user device, and the like.

The memory 703 is accessible by the one or more processors 702 via the link 704 so that the one or more processors 702 can read information from and write information to the memory 703. In one example, one or more user input 701 collected by one or more user input devices 705 is processed by the one or more processors 702 and stored in the memory 703. Memory may be integral with or separate from the processors. Examples of the memory 703 include RAM, flash, ROM, EPROM, EEPROM, registers, disk storage, or any other form of storage medium. The memory 703 may store instructions that when executed by the one or more processors 702 implement one or more embodiments of the invention. The memory 703 may store instructions that when executed by the one or more processors 702 cause the one or more processors 702 to implement one or more embodiments of the invention. Memory 703 may be a non-transitory computer-readable medium that stores instructions, which when executed by a computer, cause the computer to perform one or more of the methods discussed herein.

According to certain embodiments, a computer-implemented method may include one or more of the methods described herein. Further, an apparatus may include one or more processors and one or more non-transitory computer-readable media storing instructions that, when executed by the one or more processors, cause the apparatus to perform one or more of the methods described herein. Further, a system may include one or more processors and one or more non-transitory computer-readable media storing instructions that, when executed by the one or more processors, cause the one or more processors to perform one or more of the methods described herein. Further, one or more non-transitory computer-readable media may store instructions that, when executed by one or more processors, cause the performance of one or more of the methods described herein.

Appendix A: Hash Function Instantiations

MTL mode may use four hash functions as noted in Sections 2 and 5:

- $H_{msg}$(SID, i, m, c)→d maps a series identifier SID, an index i, a message m, and a randomizer c to a data value d;
- $H_{leaf}$(SID, i, d)→V maps a series identifier SID, an index i, and a data value d to a $2\ell$-bit leaf hash value V (It should be appreciated that series identifier SID, the index i, and the data value d can be other than a $2\ell$-bit size. For example, sizes are not limited two times the security parameter (e.g., $2\ell$-bit leaf hash value V), thus resulting in a shorter condensed signature size. According to embodiments, an additional security parameter for the size of the randomizer can be used.);
- $H_{int}$(SID, L, R, $V_{left}$, $V_{right}$)→V maps a series identifier SID, two indexes L and R, and two $2\ell$-bit hash values $V_{left}$ and $V_{right}$ to a $2\ell$-bit hash value V; and
- $H_{SID}$(S, τ)→SID maps a $2\ell$-bit seed and a tag to a series identifier SID.

According to an embodiment, the functions are cryptographically separate from one another and also from any hash functions involved in the underlying signature scheme $\mathcal{S}$. Because the example underlying signature schemes instantiate their own hash functions in different ways, it may be more practical to propose custom instantiations of the four hash functions for each scheme than to construct a generic set for use across the schemes. While a concatenate-then-hash style has been adopted for the instantiations, the flexibility gives the option to move to a different style, e.g., mask-then-hash, to align better with the security proofs for the underlying schemes. An implementation of MTL can use the same underlying hash function as the underlying signature scheme or a different hash function.

In the following, let H be a second-preimage-resistant hash function with a $2\ell$-bit output (e.g., SHA-256 [47] for the case $\ell$=128). According to an embodiment, it can be assumed the $2\ell$-bit hash function output is represented as an octet string as per the hash function's specification, e.g., Section 3 of [47]; hLen=$\ell$/4 denotes the length of the octet string. The following notation can also be adopted: $[x]_w$ converts a non-negative integer x to its w-octet unsigned representation, most significant octet first; x<1:w> returns the first w octets of an octet string x (numbering can start with octet 1); and 0x denotes a hexadecimal representation.

The next sections propose instantiations for the five underlying post-quantum signature schemes described herein. While Section 7 focuses on specific parameter sets for analysis, the instantiations are more general and could be applied to other parameter sets as well.

A.1 HSS/LMS Instantiations

HSS/LMS defines its hash functions by formatting their inputs into input strings to the underlying hash function H; the values of the $21^{st}$ and $22^{nd}$ octets provide separation between the different uses (see Section 9.1 of [19]). A similar approach for the MTL mode's uses can be taken, where $$H_{msg}(SID, i, m, c) := H(SID\|[i]_4\|D_{MLTM}\|c\|m);$$

$$H_{leaf}(SID, i, d) := H(SID\|[i]_4\|D_{MTLL}\|d);$$

$$H_{int}(SID, L, R, V_{left}, V_{right}) := H(SID\|[L]_4\|D_{MTLI}\|[R]_4\|V_{left}\|V_{right}); \text{ and}$$

$$H_{SID}(S, \tau) := H([0]_{16}\|\tau\|D_{MTLS}\|S)\langle 1:16\rangle.$$

According to an embodiment, to align with HSS/LMS's formats, three constraints can be placed on an embodiment of the MTL mode implementation: SID is a 16-octet string; i, L and R is at most $2^{32}-1$; and τ is a four-octet string. According to an embodiment, $D_{MTLM}$=0x9090, $D_{MTLL}$=0x9191, $D_{MTLI}$=0x9292 and $D_{MTLS}$=0x9393, contrasting with HSS/LMS's identifiers which either start with 0x8 or have most significant bit 0. In addition, so that the boundary between c and m is unambiguous, the randomizer has a fixed length according to an embodiment. According to an embodiment, $2\ell$ bits are used, the same length as HSS/LMS's own message randomizer (see Section 7.1 of [19]). The seed S can be put at the end of the input format for $H_{SID}$ so that an implementation can choose a length larger than 16 octets, which would be the limit if put at the beginning. If S is 32 octets or shorter, then the input to the hash function in $H_{SID}$ is at most 54 octets, which, after padding, fits within a single SHA-256 compression function call. $H_{leaf}$ similarly takes a single call and $H_{int}$ takes two, matching their counterparts in HSS/LMS.

With these instantiations, up to $2^{32}-1$ messages can be associated with a given tag and up to $2^{64}-2^{32}$ messages can be signed in MTL mode with a given HSS/LMS key pair. The latter limit is greater than the total number of messages supported by any of the recommended HSS/LMS parameter sets (i.e., $2^{40}$; see Section 6.4 of [19]).

A.2 Instantiations for Other Underlying Signature Schemes

Some options are now provided on how one might instantiate the four proposed hash functions when MTL mode is applied to the other underlying schemes.

XMSS^MT. Like HSS/LMS, XMSS^MT separates its hash functions by distinguishing certain octets in the inputs to H; here, the first hLen octets vary (see Section 5.1 of [20]). Following this approach, $$H_{msg}(SID, i, m, c) := H(D_{MTLM}\|SID[i]_4\|c\|m);$$

$$H_{leaf}(SID, i, d) := H(D_{MTLL}\|SID\|[i]_4\|d);$$

$$H_{int}(SID, L, R, V_{left}, V_{right}) := H(D_{MTLI}\|SID\|[L]_4\|[R]_4\|V_{left}\|V_{right}); \text{ and}$$

$$H_{SID}(S, \tau) := H(D_{MTLS}\|S\|\tau\|)\langle 1:16\rangle.$$

According to an embodiment, $D_{MTLM}=[256]_{hLen}$, $D_{MTLL}=[257]_{hLen}$, $D_{MTLI}=[258]_{hLen}$ and $D_{MTLS}=[259]_{hLen}$, contrasting with XMSS^MT's identifiers which involve integers in the range 0-3. For consistency with the HSS/LMS instantiations and make to the formats unambiguous, SID can be constrained to be a 16-octet string; i, L and R to be at most $2^{32}-1$; and τ to be a four-octet string. However, the instantiations could be redefined with different lengths. As above, with these constraints up to $2^{64}-2^{32}$ messages can be signed in MTL mode with a given XMSS^MT key pair, a limit that again is greater than the total number of messages supported by any of the recommended parameter sets (i.e., $2^{60}$; see Section 5.4.1 of [20]).

Note that we've maintained the concatenate-then-hash style of the HSS/LMS instantiations. According to an embodiment, XMSS^MT's mask-then-hash style can be followed where bitmasks are derived from "address" components, such as SID, L and R and exclusive-ored with other inputs. According to an embodiment, the formatting can be adjusted to align with the boundaries of the hash function's internal compression function, as XMSS^MT does.

(Notational comment: the $H_{msg}$ defined here is the MTL mode function, not XMSS^MT's H_msg; and the H used here is the underlying hash function, e.g., SHA-256, not XMSS^MT's H.)

SPHINCS+. A 32-octet address field separates different uses of the underlying hash function for this scheme (see Sections 7.2 and 2.7.3 of [18]). The first four octets are the layer address. SPHINCS+'s own layer addresses are in the range 0-6, so the range 256-259 for the MTL mode functions. The other inputs would be formatted to align with SPHINCS+'s formats (e.g., padding the first field to the length of the compression function). A mask-then-hash style can be adopted in addition to the concatenate-then-hash style as SPHINCS+ does in its "robust" variant. The instantiations could impose the same constraints as the other instantiations above, or they could move to larger sizes (e.g., eight-octet indexes and tag), given that SPHINCS+ is stateless and therefore does not have a built-in limit on the number of messages that can be signed. In "robust" and/or mask-then-hash embodiments herein and elsewhere, $H_{leaf}$ and $H_{int}$ may be defined as $$H_{leaf}(SID, i, d_i) = H'_{leaf}(k_{leaf}, d_i \oplus r_{leaf});$$

and $$H_{int}(SID, L, R, V_{left}, V_{right}) = H'_{int}(k_{int}, (V_{left} \| V_{right}) \oplus r_{int}),$$

where $$\langle k_{leaf}, r_{leaf}\rangle = F'_{leaf}(SID, i) \text{ and } \langle k_{int}, r_{int}\rangle = F'_{int}(SID, \langle L, R\rangle) \text{ and where } H'_{leaf}, H'_{int}, F'_{leaf} \text{ and } F'_{int}$$

may be hash functions such that:

$$H'_{leaf}(k_{leaf}, m_{leaf}) \to V$$

maps a $\ell$ -bit key $k_{leaf}$ and a $\ell$ -bit message $m_{leaf}$ to a $\ell$ -bit hash value;

$$H'_{int}(k_{int}, m_{int}) \to V$$

maps a $\ell$ -bit key $k_{int}$ and a $2\ell$ -bit message $m_{int}$ to a $\ell$ -bit hash value;

$$F'_{leaf}(SID, i) \to \langle k_{leaf}, r_{leaf}\rangle$$

maps a $\ell$ -bit series identifier SID and a leaf index i to a $\ell$ -bit key $k_{leaf}$ and a $\ell$ -bit mask $r_{leaf}$; and $$F'_{int}(SID, \langle L, R\rangle) \to \langle k_{int}, r_{int}\rangle$$

maps a $\ell$ -bit series identifier SID and a node index pair ⟨ L, R⟩ to a $\ell$ -bit key $k_{int}$ and a $2\ell$ -bit mask $r_{int}$.

FALCON's internal use of a hash function is for mapping a 320-bit salt and a message to a polynomial; the scheme uses SHAKE-256, where the input is the concatenation of the salt and the message (see Section 3.9.1 of [17]). FALCON's own instantiation thus does not directly provide a way to separate other uses of the underlying hash function, and it does not support SHA-256 (it uses an extendable-output function (XOF)). Any of the instantiations for the other schemes seems an equally reasonable choice.

CRYSTALS—Dilithium uses a hash function (SHAKE-256 or SHAKE-128) for several purposes (see Section 5.3 of [16]). Like FALCON, it does not directly provide a way to separation other uses from its own, nor does it support SHA-256. Again, any of the previous instantiations would seem to be equally reasonable.

A.3 Hash Function Usage Outside Signature Schemes

As evidenced above, two of the five example post-quantum signature schemes considered do not provide a direct way to separate their uses of an underlying hash function from other uses outside the signature scheme.

Given that a signature scheme will often be combined with other uses of the same hash function in an application, it would be worthwhile to have a common convention for using a hash function within a signature scheme that does provide for such separation. The convention would be another aspect of the ongoing improvements in multi-user/multi-target security [48], where a design goal is to limit each of the adversary's hash function queries to a specific context.

Appendix B: Binary Rung Strategy Operations

According to one or more embodiments described herein, example pseudocode for the Merkle tree ladder operations is provided in the binary rung strategy $\mathcal{BRS}$ described in Section 2, which is the basis for the MTL mode operations in Section 5. The pseudocode takes an iterative approach where the authentication paths and ladders are constructed with "for" loops, following the tree structure from leaf to ladder. An alternative would be a recursive approach where the components are constructed with recursive calls that proceed from ladder to leaf. Arrays are indexed starting with 1.

Signature generation optimizations. MTL mode's signature generation operation (Section 5) calls ADDLEAFNODE to add a leaf node corresponding to a message being signed and to obtain a ladder spanning the leaf nodes added so far. The operation then calls GETAUTHPATH to obtain an authentication path from the newly added leaf node to the newly produced ladder. The mode's condensation operations (Section 6) likewise call ADDLEAFNODE to add a leaf node corresponding to the original signature being incorporated, but in contrast, call GETAUTHPATH to obtain an authentication path from an arbitrary leaf node to the current ladder. An implementation, such as a hardware security module that is intended to support signature generation, not condensation, therefore maintains enough hash values to produce the next ladder and the authentication path to it from the newly added leaf node. The pseudocode below covers the general case and uses storage for O(N) hash values, where N is the number of leaf nodes in the node set. The notes suggest optimizations for the signature-generation case and use storage for O(log N) hash values.

Updating in place. The ladder operations are defined here so that the updated node set is returned as an output, consistent with the tagged signature scheme operations and the condensation operations returning the updated state. The operations can be changed to update the node set in place simply by removing the T':=T step from the pseudocode and operating on the input T directly thereafter.

B.1 Node Set Representation

A node set T includes three parts: the series identifier, denoted T.SID; the number of leaf nodes, denoted T.N; and zero or more node hash values, each denoted T.V[L:R] where L and R is the pair of indexes that uniquely identifies the node.

A suitable data structure for mapping the index pair to the hash value can be assumed. For instance, an implementation could maintain a lookup table (L, R)→V, which would effectively serve as a sparse representation for an expanding T.N×T.N array. Alternatively, an implementation could map the index pair to a single index Z corresponding to the order in which the value T.V[L:R] is computed by AddLeafNode, and keep the value at this index in a one-dimensional array.

For the binary rung strategy, the (L, R)→Z mapping could take the form $$Z := 2R - B(R) - \nu_B(R) + k(L, R).$$

where B(R) is the number of ones bits in the binary representation of R, $\nu_B(R)$ is the index of the lowest ones bit in the representation (where bits are indexed starting at 0), and k(L, R) is the unique integer such that $L=R-2^k+1$ (if such an integer exists; otherwise (L, R) is not a valid index pair for the binary rung strategy).

To see this, consider that the hash values added during the $R^{th}$ call to AddLeafNode, i.e., when i=R are those with right index R and left index $L=R-2^k+1$ for each value of k between 0 and $\nu_B(R)$; they are added in increasing order of k. The one-dimensional index Z then can be determined based on knowing how many hash values are added up to and including the $R^{th}$ call.

The index of the lowest ones bit in an the binary representation of an integer x, plus one, i.e., $\nu_B(x)+1$, is the ruler function of the integer x [49]. The total number of hash values added up to and including the $R^{th}$ call, i.e., $$\sum_{x=1}^{R} (\nu_B(x) + 1),$$

thus equals the sequential sum of the ruler function up to R, which is 2R−B(R) [50]. According to one or more embodiments described herein, another way to see the result is to consider that the ladder after the $R^{th}$ call will include B(R) complete, adjacent binary trees spanning the R leaf nodes. A complete binary tree has one fewer internal nodes than leaf nodes, so collectively, the B(R) trees have R−B(R) internal nodes and 2R−B(R) total nodes. These are the nodes whose hash values will have been added up to and including this call. A node set with N leaf nodes can therefore be represented with 2N−B(N)≤2N−1 hash values. It follows that the overall order in which the hash value T.V[L:R] is added is $2R-B(R)-\nu_B(R)+k(L, R)$. This order can then be used as an index to a one-dimensional array for storing and retrieving T.V[L:R].

Signature-generation case: If GetAuthPath and AddLeafNode will be used for signature generation, then the node set representation maintains enough to produce the next ladder and authentication path. In this case, the node set has four parts: T.SID; T.N; the current ladder, denoted T.Λ; and the current authentication path, denoted T.Π. In this case, the node set representation would include $B(N)+\nu_B(N)$ hash values (corresponding to the number of hash values in the ladder and in the authentication path); the sum is at most the number of bits in the binary representation of N. It follows that the storage in the signature case is at most $\lfloor \log_2 N \rfloor + 1$ hash values.

B.2 Node Set Initialization $\text{InitNodeSet}_{\mathcal{BRS}}(\text{SID}) \rightarrow T_0$ returns a new node set $T_0$ associated with the series identifier SID.

1. Create a new, empty node set $T_0$.
2. Set $T_0$.SID:=SID and $T_0$.N:=0. The initial node set will include no node hash values.
3. Return $T_0$.

Signature-generation case: Step 2 also sets T.Λ and T.Π to empty arrays.

B.3 Leaf Node Count $\text{GetLeafNodeCount}_{\mathcal{BRS}}(T) \rightarrow N$ returns the number of leaf nodes in the node set T.

1. Set N:=T.N.
2. Return N.

B.4 Leaf Node Addition $\text{AddLeafNode}_{\mathcal{BRS}}(T, d) \rightarrow \langle T', \Lambda \rangle$ adds a leaf node corresponding to the data value d to the node set T, assigning the next leaf node index to it, and returns the updated node set T' and the next ladder Λ spanning the leaf nodes in the node set, following the binary rung strategy.

1. Set SID:=T.SID.
2. Seti:=T.N+1.
3. Set T':=T.
4. Set T'.N:=i.
5. Compute $V:=H_{leaf}(\text{SID}, i, d)$.
6. Set T'.V[i:i]:=V, adding the new leaf node to the node set.
7. Write $i = \sum_{j=1}^{B} 2^{\nu_j}$ where the $\nu_j$ are the indexes of the ones bits in the binary representation of i from highest to lowest.
8. For k from 1 to $\nu_B$ do:
   a. Compute $V:=H_{int}(\text{SID}, i-2^k+1, i, T'.V[i-2^k+1:i-2^{k-1}], V)$.
   b. Set $T'.V[i-2^k+1:i]:=V$, adding the new internal node to the node set.
9. Create a new empty array Λ.
10. Set R:=0.
11. For j from 1 to B do:
    a. Set L:=R+1 and $R:=R+2^{\nu_j}$.
    b. Set Λ[j]:=T'.V[L:R], adding this rung hash value to the ladder.
12. Return T' and Λ, which will be an array of B hash values.

Step 8 computes the new ladder rung $[i-2^{\nu_B}+1:i]$ from leaf to ladder. As discussed in Section 2, this rung is the same as or an ancestor of rungs in $\Lambda_{N-1}$, which have already been computed. Step 11 then assembles the rungs into the ladder.

Signature-generation case: Instead of retrieving T'.V[$i-2^k+1:i-2^k-1$] from the set of node hash values during the call to $H_{int}$, Step 8a selects the rung T.Λ[$B+\nu_B-k$] from the input node set. Instead of storing the new hash value, Step 8b copies the selected rung to the authentication path in the new node set by setting T'.Π[k]:=T.Λ[$B+\nu_B-k$]. Similarly, instead of retrieving T'.V[L:R] from the set of node hash values, Step 11b sets T.Λ[j] (if j<B) or V (if j=B). The step copies the selected rung to the ladder in the new node set by setting T'.Λ[j]:=Λ[j]. Step 11a is omitted.

B.5 Authentication Path Construction

GetAuthPath$_{\mathcal{BRS}}$(T, i)→Π returns the authentication path Π from the $i^{th}$ leaf node in the node set T to its associated rung in the current ladder following the binary rung strategy.

1. Set SID:=T.SID.
2. Set N:=T.N.
3. If i<1 or i>N then return "index out of range."
4. Write $$N=\sum_{j=1}^{B}2^{\nu_j}$$

where the $\nu_j$ are the indexes of the ones bits in the binary representation of N from highest to lowest.
5. Set R:=0.
6. For j from 1 to B do:
   a. Set L:=R+1 and R:=$R+2^{\nu_j}$
   b. If i≤R then break.
7. Set Δ:=i−L.
8. Write $$\Delta=\sum_{k=1}^{\nu_j}\delta_k 2^{k-1}$$

where the $\delta_k$ are the bits of the binary representation of Δ from lowest to highest.
9. Create a new empty array II.
10. For k from 1 to $\nu_j$ do:
   a. If $\delta_k$=0 then set Π[k]:=T.V[$L+\Delta+2^{k-1}:L+\Delta+2^k-1$].
   b. Else ($\delta_k$=1) set Π[k]:=T.V[$L+\Delta-2^{k-1}:L+\Delta-1$] and $\Delta:=\Delta-2^{k-1}$.
11. Return Π, which will be an array of $\nu_j$ hash values.

Step 6 determines which rung of the ladder spans the leaf node, and Step 10 then constructs the authentication path from leaf to ladder, based on the binary representation of Δ, the relative position of the leaf node within the ladder rung span. (Recall that each rung spans a complete binary tree.)

Signature-generation case: Step 3 instead checks if i≠N, given that this case assumes that the authentication path is from the newly added leaf node to the newly produced ladder. Steps 5-10 are replaced by a loop that copies T.Π[k] to Π[k] for k from 1 to $\nu_B$. (In Step 11, $\nu_j=\nu_B$.)

B.6 Authentication Path Verification

CheckAuthPath$_{\mathcal{BRS}}$ (SID, i, N,N', d, Π, Λ)→b verifies that the $i^{th}$ leaf node of a node set corresponds to the data value d using an authentication path Π and a ladder Λ following the binary rung strategy.

1. If i<1 or i>N' or N'>N then return "index out of range."
2. Write $$N'=\sum_{j=1}^{B}2^{\nu_j}$$

where the $\nu_j$ are the indexes of the ones bits in the binary representation of N' from highest to lowest.
3. If Λ is an array of fewer than B hash values then return "ladder too short."
4. Set R:=0.
5. For j from 1 to B do:
   a. Set L:=R+1 and R:=$R+2^{\nu_j}$
   b. If i≤R then break.
6. If Π is an array of fewer than $\nu_j$ hash values then return "authentication path too short."
7. Set Δ:=i−L.
8. Write $$\Delta=\sum_{k=1}^{\nu_j}\delta_k 2^{k-1}$$

where the $\delta_k$ are the bits of the binary representation of Δ from lowest to highest.
9. Compute V:=$H_{leaf}$(SID, i, d).
10. For k from 1 to $\nu_j$ do:
   a. If $\delta_k$=0 then compute V:=$H_{int}$(SID,$L+\Delta$,$L+\Delta+2^k-1$, V,Π[k]).
   b. Else ($\delta_k$=1) compute V:=$H_{int}$(SID,$L+\Delta-2^{k-1}$,$L+\Delta-2^{k-1}1-1$,Π[k],V) and set $\Delta:=\Delta-2^{k-1}$.
11. If V:=Λ[j] then return True else return False.

Step 5, similar to the previous operation, selects the rung of the ladder to match. The rung may be reached by just a portion of the authentication path, given that the operation allows N' and N to be different. Step 10 then evaluates the authentication path from leaf to ladder based on the binary representation of Δ, similar to the previous operation.

Appendix C: Proof of General Path Verification for Binary Rung Strategy

Claim. For positive integers i, N,N' where i≤N'≤N, if $d_i$ is the data value corresponding to the $i^{th}$ leaf node in a node set assembled using the binary rung strategy, $\Pi_{i,N}$ is the authentication path from the $i^{th}$ leaf node to its associated rung in the $N^{th}$ ladder and $\Lambda_{N'}$ is the $N'^{th}$ ladder, then $$CHECKAUTHPATH_{BRS}\left(SID,\,i,\,N,\,N',\,d_i,\,\prod\nolimits_{i,N},\,\Lambda_{N'}\right)=TRUE.$$

Proof. If N=1 then the result is trivial. Suppose N>1 and consider the binary representation of N−1. For example:

$$N-1=\sum_{j=1}^{B}2^{\nu_j}-1=\sum_{j=1}^{B-1}2^{\nu_j}+(2^{\nu_B}-1)=\sum_{j=1}^{B-1}2^{\nu_j}+\sum_{k=1}^{\nu_B}2^{k-1}.$$

The first B−1 ones bits of N are the same as the first B−1 ones bits of N−1, while the last ones bit of N is replaced by $\nu_B$ consecutive lower-order ones bits of N−1. The first B−1 rungs in $\Lambda_N$ are thus the same as the corresponding rungs in $\Lambda_{N-1}$ and the last rung in $\Lambda_N$ is an ancestor of each of the last $\nu_B$ rungs in $\Lambda_{N-1}$ (compare Step 10 in Appendix B.5 where $\nu_j=\nu_B$). Each of the rungs in $\Lambda_{N-1}$ is therefore either the same as, or a descendant of, one of the rungs in $\Lambda_N$. By induction, the same holds for each of the rungs in $\Lambda_{N'}$ where $1 \le N' \le N$.

The evaluation of the authentication path from the $i^{th}$ leaf node to its associated rung in ladder $\Lambda_N$ recomputes the rung as well as every descendant of the rung whose span includes i. Because the rungs in each ladder have non-overlapping sets of descendants, it follows that the rung in $\Lambda_{N'}$ that spans the $i^{th}$ leaf node is either the same as or a descendant of the rung in $\Lambda_N$ that spans the $i^{th}$ leaf node. CheckAuthPath$_{\mathcal{BRS}}$ can therefore verify $\Pi_{i,N}$ using $\Lambda_{N'}$.

Appendix D: Condensing and Reconstituting Hash-Based Signatures

The three hash-based signature schemes among the NIST PQC signature algorithms, with certain parameter sets, support a modest amount of condensation. According to one or more embodiments described herein, to fit this framework, each scheme may be re-cast as a tagged signature scheme that allows a null tag. The three example parameterizations given in Table 1 can then be considered again, for example:

- SPHINCS$^+$-128s
- HSS/LMS with parameters L=2, LMS_SHA256_M32_H10 and LMOTS_SHA256_N32_W8
- XMSS^MT with parameter XMSSMT-SHA2_20/2_256

All three schemes involve multiple layers of Merkle trees; their signatures include multiple sets of one-time signatures and authentication paths. Condensation can be achieved by treating the one-time signature and authentication path for the top-layer tree as a reference value and the rest of each signature as a condensed signature. The SPHINCS$^+$ example has seven layers of trees, so its condensed signature size will be roughly 86% of its original signature size. The HSS/LMS and XMSS^MT examples have two layers; their condensation ratio will be roughly 50%.

The handle returned by GetCondensedSig resolves to the top part of the signature, which is common to signatures involving a particular leaf of the top-layer tree. A verifier obtains a new reference value when a new top-level leaf is encountered.

In the HSS/LMS and XMSS^MT examples, the top-layer tree has $2^{10}$=1024 leaf nodes. As a result, the number of reference values is at most 1024 regardless of K, leading to an upper bound on the effective signature size of $$\phi(K, K') \le |\varsigma| + \frac{1024}{K}|\upsilon|.$$

If K is more than about 1024×2=2048 for two-layer HSS/LMS or XMSS^MT, the effective signature size will be lower than the original signature size and thereafter will continue to decrease, converging to the 50% ratio above. In the SPHINCS$^+$ example, the top-layer tree has 29=512 leaf nodes and the transition point is around 512×7=3584. The actual transition points for these three examples will be lower in practice because not every top-level leaf will necessarily be involved in the first K signatures, especially for HSS/LMS and XMSS^MT which exhaust each top-level leaf node before moving to the next one. To reduce further, faster, and for non-hash-based signatures schemes, however, a different approach, such as MTL mode, may be used.

Appendix E: Stateful Reconstitution Operations

Just as the condensation operations are stateful, ReconstSig can be restructured so that it maintains state between operations, e.g., with operations, such as the following:

- ReconstInit$_{pk}$( )→$st_0$ returns a new scheme state $st_0$.
- AddCondensedSig$_{pk}$(τ, ς, χ, st)→⟨i, b, st'⟩ incorporates a condensed signature ς associated with the tag τ and the handle χ into the state st and returns the signature index i for this signature (relative to τ), a flag b indicating whether a new reference value is to be used and the updated state st'.
- AddRefVal$_{pk}$(τ, χ, υ, st)→st' incorporates a reference value υ associated with the tag τ and a handle χ into the state st and returns the updated state st'.
- GetCondensedSig$_{pk}$(τ, i, st)→⟨σ', st'⟩ produces a reconstituted version σ' of the $i^{th}$ signature associated with the tag τ under the state st and returns σ' and the updated state st'.

By returning the flag, AddCondensedSig automates the reference value compatibility checks mentioned above. If the flag is True, then the verifier requests a new reference value and incorporates it with AddRefVal. Otherwise, the verifier proceeds directly to GetReconstSig. With the stateless version of ReconstSig, the application can perform the reference value compatibility check itself. While this is straightforward in a mode based on the binary rung strategy (just compare $i \le N' \le N$), the check may be more complex in general (e.g., when directly condensing and reconstituting hash-based signatures as proposed in Appendix D).

Appendix F: Caching Condensed Signatures

In Section 7, it was assumed that each condensed signature ς received by the verifier was produced relative to a reference value $\upsilon_N$ that was newer than the reference value $\upsilon_{N_0}$ held by the verifier, i.e., $N_0 \le N$. The assumption was the basis for the use of the reference value compatibility property of the binary rung strategy (Section 4.3). It enabled the verifier to reconstitute a signature provided that the message index i satisfied $i \le N_0$. As a result, the verifier requests a new reference value when $i > N_0$.

According to one or more embodiments described herein, one or more assumptions may be realistic when the verifier interacts directly with a signer or intermediary that performs condensation operations. However, such assumption may not be realistic when the verifier interacts with a responder that merely holds condensed signatures obtained from other parties. Indeed, a condensed signature held by such a responder will be associated with a reference value $\upsilon_N$ that was available when the responder itself obtained the condensed signature. That reference value may be older than the one held by the verifier, i.e., $N < N_0$. If so, the reference value compatibility property does not necessarily apply and special processing may be implemented, potentially increasing the effective signature size and diminishing the benefit of MTL mode.

A responder, such as a condensed signature caching server, may hold but not produce condensed signatures. Two examples of such a responder include:

- A recursive DNS server configured to request and hold signed resource record sets (RRsets) on behalf of its clients. The condensed signatures on the resource record sets would previously have been produced by an authoritative DNS server or its provisioning system (or by an intermediary that performs condensation operations). According to one or more embodiments described herein, a provisioning system may provide leaf nodes corresponding to leaves for data elements that have an index greater than the highest index the verifier has previously seen. The verifier can then construct the Merkle trees used for producing authentication paths up to new maximum index value. A DNS RRset has a time to live (TTL) value indicating how long the RRset should be held before requesting a new version from the authoritative name server. The reference value associated with a condensed signature returned by the recursive DNS server will thus generally be at most as old as the authoritative name server's maximum TTL, e.g., on the order of a day. The validity period for the signature can be much longer, on the order of weeks or months. The new signed version of the RRset can thus include a new condensed version of the same initial signature of the RRset (if the RRset has not changed). The DNS case is representative of a caching server that may be the primary interface between the verifier and one or more sources of signatures without necessarily having full or immediate access to the signatures.

A web server configured to hold certificates for the websites it serves and provide these certificates to its clients. Here, the condensed signatures on the certificates would previously have been produced by a certification authority (or, again, by an intermediary). A web PKI certificate does not have an independent TTL, however; the certificate is simply held until the end of its validity period. Thus, the reference value associated with a condensed signature returned by a web server could be as old as the certificate itself, e.g., on the order of a year. The web case is representative of a caching server that may be one of many interfaces between a verifier and one or more sources of signatures.

Other embodiments may involve other caching servers and sources of signatures, such as signatures on Certification Revocation Lists, Online Certificate Status Protocol responses, signed certificate timestamps, DNS Authentication of Named Entities (DANE) records, database records, and blockchain transactions received through a DNS service, web service, a blockchain service, a PKI service, or an application platform.

Given the importance of caching for application performance, the embodiments consider how to mitigate the effect of caching on effective signature size for clients of these servers, e.g., for a browser or other application that validates a condensed signature on a resource record set or certificate, such as by assessing how a verifier processes condensed signatures.

F.1 Processing Condensed Signatures with Caching

As a starting point, let's review a typical approach by which a verifier may process a condensed signature in MTL mode, taking caching into account.

Expanding on Section 7, it can be assumed that the verifier already holds a set of reference values $$\upsilon_{N_0^{(1)}}, \upsilon_{N_0^{(2)}}, \ldots ,$$

where the reference value $$\upsilon_{N_0^{(b)}}$$

includes the $$N_0^{(b)}th$$

Merkle tree ladder and an underlying signature on the ladder. The processing may involve the following steps. (The public key pk and the tag $\tau$ are omitted for simplicity.)

1. The verifier obtains a condensed signature ç on a message $m_i$ with index i, and a reference value handle $\chi$. The condensed signature ç includes an authentication path $\hbar_{i,N}$ relative to the $N^{th}$ ladder where 1≤i≤N; the reference value handle $\chi$=N.
2. If there exists a b such that $$i \le N_0^{(b)} \le N,$$

then the verifier reconstitutes a signature from ç and $$\upsilon_{N_0^{(b)}}.$$

Note that there can be more than one b for which this condition holds.
3. If there does not exist a b such that $$i \le N_0^{(b)},$$

then the verifier requests the reference value $\upsilon_N$ and reconstitutes a signature from ç and $\upsilon_N$. The verifier then adds the reference value $\upsilon_N$ to its set of reference values.
4. If there exists a b such that (a)

$$N < N_0^{(b)} \text{ and } (b)\ i, N \text{ and } N_0^{(b)}$$

and (b) i, N and $$N_0^{(b)}$$

are compatible (in the sense defined below), then the verifier reconstitutes a signature from ç and $$\upsilon_{N_0^{(b)}}.$$

5. If there does not exist a b such that (a) and (b) in Step 4 hold (the remaining possibility), then the verifier performs special processing as discussed below.

Note that if $$N_0^{(b)} \le N$$

for all b (as assumed in Section 7), then Steps 1-3 are performed. Steps 4 and 5 occur as a result of the $N<N_0$ case associated with caching condensed signatures.

For example, i, N and N' are compatible in a rung strategy if the authentication path from the $i^{th}$ leaf node to its associated rung in the $N^{th}$ ladder can be verified using the $N'^{th}$ ladder. Appendix C shows that i, N and N' are compatible if i≤N'≤N; this is the basis for reconstitution in Step 2 above. Further, i, N and N' are compatible if i≤N<N' and N'<R+$2^v$ where R=$2^v$ is the (unique) integer between i and N that is divisible by the largest power of 2; this is the basis for Step 4. (To see, this consider that R is then also the unique integer with this property between i and N' and that [R−$2^v$+1:R] is then the rung associated with both $\Pi_{i,N}$ and $\Pi_{i,N'}$—so the authentication paths are the same.) Special processing is therefore used when N'≥ R+2°.

The effective signature size for conveying a signature following Steps 1-5 includes the condensed signature size from Step 1, the overhead of the occasional reference value in Step 3, and the overhead of the occasional special processing in Step 5. Embodiments can mitigate the effect of caching on effective signature size by reducing the impact of special processing and/or the likelihood that special processing is performed. Embodiments may also be able to mitigate the effect of caching by changing to a different rung strategy. The next three subsections go into further detail on each of these mitigations.

F.2 Reducing Impact of Special Processing

According to an embodiment, to implement the special processing in Step 5, the verifier may request the reference value $\upsilon_N$ and then reconstitute a signature from ç and $\upsilon_N$. However, this approach would involve the overhead of sending a full underlying signature (and a ladder) every time special processing is performed.

According to another embodiment, a more efficient approach is for the verifier instead to request the current version ç' of the condensed signature on $m_i$, and then reconstitute a signature from ç' and $$\upsilon_{N_0^{(b)}},$$

where $$\upsilon_{N_0^{(b)}}$$

is any one of its reference values. The signer or another intermediary could fulfill requests for the current version of the condensed signature by providing an externally accessible interface to GetCondensedSig in the same way that it fulfills requests for reference values via an interface to GetRefVal. This approach would involve the overhead of sending a condensed signature.

According to another embodiment, an even more efficient approach is for the verifier to request the difference between ç and the current version of the condensed signature. Additional condensation scheme operations for this purpose are provided below:

- GetExtVal$_{pk}$(τ, i, χ, st)→⟨β, st'⟩ produces an extension value β that can be used to transform a condensed signature associated with the tag τ and the handle χ to a condensed signature relative to the current reference value. It returns β and the updated state st'.
- ExtendCondensedSig$_{pk}$(τ, χ, ç, β)→ç' transforms a condensed signature ç associated with the tag τ and the handle χ into a condensed signature ç' relative to τ and the reference value associated with the extension value β, and returns ç'.

In this approach, the verifier would request the extension value β for τ, i and χ, then call ExtendCondensedSig to obtain a condensed signature ç' relative to the current reference value. The verifier could then reconstitute a signature from ç' and any of its reference values. As above, the signer or another intermediary would provide an external interface to GetExtVal. This approach would involve the overhead of the extension value, which in MTL mode would include the missing sibling nodes in the authentication path. The combined overhead of ç and β would thus be comparable to the current condensed signature ç'.

Other variants of the extension-value approach are also possible. GetExtVal could also take the handle of a specific reference value as input and return an extension value that can be used to transform ç into a condensed signature relative to that reference value. (ExtendCondensedSig may be updated to take the additional handle as input too.) The resulting extension value may be shorter than one relative to the current reference value. ReconstSig could take the extension value as an additional, optional input, and use the extension value directly in the reconstitution process, bypassing ExtendCondensedSig. (ReconstSig may also be updated to take the handles as inputs.)

Given an external interface to GetCondensedSig, one may ask if it is desirable for the responder to return a condensed signature; could not the responder just provide information about the public key, the tag and the message index i? The signature format would then be "fully indirect." The verifier would request the current condensed signature, then, if desired, request the reference value associated with the condensed signature. This approach would avoid special processing entirely in MTL mode with a binary rung strategy. But it would also use at least one external call for every signature of interest to the verifier, and the response to the call would not necessarily be cached, thus increasing the overall operational burden. While this approach may be practical in some circumstances, it may be preferable in others to rely on the responder's own condensed signatures as much as possible and take other actions to reduce the likelihood that they use special processing.

F.3 Reducing Likelihood of Special Processing

According to an embodiment, the reason that special processing may be implemented is that a condensed signature received from a caching server is "too short" relative to the verifier's reference values—that is, the condensed signature is missing one or more sibling nodes. Therefore, a natural way to reduce special processing is to refresh each condensed signature periodically to add the missing sibling hash nodes. Following the discussion above, assume that a condensed signature for index i is first added to the cache when N is the current number of leaf nodes, and that the condensed signature's authentication path is associated with the rung [R−20+1:R] in the current reference value's ladder. A new sibling node will then be added whenever the number of leaf nodes reaches a multiple of a larger power of 2, i.e., at R+$\gamma_1$, R+$\gamma_2$, R+$\gamma_3$, etc., where $$\gamma_j = \begin{cases} \gamma_0 + 2^{\nu_{B-j+1}} & \text{if } 1 \le j \le B; \\ 2^{\lfloor log_2 R \rfloor + j - B} & \text{if } j > B, \end{cases}$$

with $\gamma_0$=0 and where $\nu_1, \ldots, \nu_B$ are the indexes of the ones bits in the binary representation of $2^{\lfloor log_2 R \rfloor+1}$−R from highest to lowest:

$$2^{\lfloor log_2 R \rfloor + 1} - R = \sum_{j=1}^{B} 2^{\nu_j}.$$

Because $2^v$ is the largest power of 2 dividing R, $\gamma_1 = 2^{\nu_B} = 2^v$.

The TTL on a cache entry may automatically lead to a refresh. However, it may be desirable to add a sibling node before a typical TTL is reached. Consequently, it may be helpful to set the TTL on the condensed signature in proportion to the time expected until the next sibling node would be added. The rate at which leaf nodes are added may be hard to predict, however, and a time-based approach for refreshing condensed signatures may therefore provide inconsistent results as a mitigation for the likelihood of special processing. An approach based on the number of leaf nodes may be more effective.

According to an embodiment, when a responder receives a condensed signature relative to reference value newer than any others it has encountered, say the $N'^{th}$ reference value, or otherwise learns that there are N' (or more) leaf nodes, the responder invalidates any condensed signature in the cache that is based on an authentication path $\Pi_{i,N}$ where i, N and N' are incompatible. The responder then either proactively refreshes the condensed signature or waits until the associated record is requested by a client, and then refreshes. By updating condensed signatures based on newly encountered reference values, the responder then stays ahead of any verifier that relies on the same source of reference values. It may not be necessary to stay this far ahead, e.g., the verifier may be able to verify $\Pi_{i,N}$ with the reference values it holds, but it is sufficient. (A full treatment would perform modeling of the evolution of the set of reference values held by a verifier.)

The foregoing concepts are more directly applicable to a recursive DNS server, which has a natural refresh mechanism. In the web server example, to support MTL mode and condensation schemes, a certification authority or its intermediary should also provide a way for a web server to refresh the condensed signatures on its certificates periodically (e.g., via an external interface for looking up a certificate based on its serial number, where the certificate returned has an updated condensed signature), and to learn when the condensed signatures on its certificates may be refreshed. One way to achieve the latter would be for the client to signal to the web server that a condensed signature received by the client uses special processing.

F.4 Changing Rung Strategy

While advantageous because of its O(log N) authentication path and ladder sizes (in terms of the number of hash values they contain), and its general path verification property (i.e., compatibility in the i≤N'≤N case), the binary rung strategy is disadvantageous, as shown, for its likelihood of incompatibility in the i≤N<N' case. An alternative rung strategy may therefore be preferable in some circumstances.

Full rung strategy. As a starting point, the full rung strategy can be considered where the $N^{th}$ ladder $\Lambda_N$ has N rungs, each spanning a single leaf node:

$$\Lambda_N := \langle [1{:}1], [2{:}2], \ldots, [N{:}N] \rangle.$$

While disadvantageous because of its O(N) ladder size, it is advantageous both for its O(1) authentication path size, its general path verification property, and for the fact that i, N and N' are also compatible if i≤N≤N'; in other words, special processing is not performed. Indeed, because rungs are added to the ladder, not removed, any authentication path to a rung in a previous ladder can be verified using a subsequent ladder.

The full rung strategy is impractical in most circumstances, however, because of the O(N) ladder size, which for typical N will result in a ladder that is even longer than the underlying signature.

First, make the strategy cumulative, so that each rung spans previous leaf nodes as well as the current one:

$$\Lambda_N = \langle [1{:}1], [1{:}2], \ldots, [1{:}N] \rangle.$$

Given that the rung spans overlap, a leaf node can potentially be associated with more than one rung. For example, the newest rung, i.e., the authentication path $\Pi_{i,N}$, is associated with the rung [1:N]. Older rungs can therefore be removed while still providing collective coverage for the leaf nodes and while also maintaining the ability to verify previous authentication paths for some number of iterations. Authentication path size is increased to O(log N).

Second, make the strategy windowed, so that that the last min(N, ω) rungs are kept for some parameter ω≥1:

$$\Lambda_N := \langle [1{:}N-\min(N,\omega)+1], [1{:}N-\min(N,\omega)+2] \ldots, [N] \rangle.$$

This enhancement brings a O(ω) ladder size and windowed compatibility: any authentication path to the previous min(N, ω)−1 ladders can be verified using the current ladder. The parameter ω can be adjusted so that every condensed signature potentially stored in a cache at a given time has its associated rung in the current ladder. For example, if α additional messages are signed each iteration, as in Section 7, then one can set ω=(maximum TTL)×α, where the maximum TTL is measured in units of iterations.

Third, make the strategy batched, so that each rung, rather than adding one more leaf node, adds at leaf nodes where at is the number of additional messages signed during the $t^{th}$ iteration. (For generality, we've assumed that a variable number of messages are signed per iteration, and for efficiency, that the additional messages signed in each iteration are condensed relative to the single reference value, resulting in just one new reference value per iteration.) Write $$A_T = \sum_{t=1}^{T} \alpha_t$$

and define $$\Lambda_N := \langle [1{:}A_{T-min(T,\omega)+1}], [1{:}A_{T-min(T,\omega)+2}] \ldots, [1{:}N] \rangle$$

when $N=A_T$ for some T; $\Lambda_N$ is undefined otherwise. With this enhancement, one can simply set ω=maximum TTL, again measured in units of iterations. The practicality of the combination of the three enhancements will then depend on the ratio of maximum TTL to the iteration unit and the size overhead available for conveying the ω rungs in addition to the underlying signature.

Extended binary rung strategy. This batched/windowed/cumulative rung strategy is helpful if the goal is to avoid special processing entirely. If special processing cannot be avoided, however, another rung strategy worth considering: the extended binary rung strategy. This strategy makes the following enhancement to the binary rung strategy in Section 2.6: In addition to the B rungs in the ladder corresponding to the ones bits of the binary representation of N, the ladder also includes $\lfloor \log_2 N \rfloor + 1 - B$ rungs corresponding to the zero bits. The span of each such rung is the same as it was the previous time the binary representation had a one bit in the corresponding position (say, the $2^v$ position). The rung is thus "extended" for an additional $2^v$ leaf nodes compared to the binary rung strategy (the number of leaf nodes until the position next has a one bit). According to an embodiment, rungs corresponding to ones bits are used for constructing authentication paths, which are the same as in the binary rung strategy.

The extended binary rung strategy shares the binary rung strategy's O(log N) authentication path and ladder sizes as well as its general path verification property. Due to the extension of the rungs, the extended binary rung strategy also has a lower likelihood of incompatibility in the $i \le N < N'$ case. In particular, a new sibling node will may not be added until the number of leaf nodes reaches $R+2\gamma_1$, $R+2\gamma_2$, $R+2\gamma_3$, etc.—a doubling of the distance from R.

While the extension may provide a reduction in the special processing, it can offer a significant advantage in refresh timing over the binary rung strategy for the following reason. In the binary rung strategy, rungs are removed from the ladder immediately after they've been in use as selected rungs for producing new authentication paths. Moreover, multiple rungs may be removed at the same time. Consider the example in FIG. 2: When the number of leaf nodes in the tree reaches 16, thee three rungs shown, [1:8], [9:12] and [13:14] will no longer be used for producing new authentication paths and thee three will be removed from the ladder. The addition of a leaf node may therefore trigger many condensed signature refreshes at the same time. Indeed, although the average number of condensed signatures to be refreshed for each leaf node added is O(log N), some leaf node additions may trigger as many as N−1 refreshes. For instance, the 14 authentication paths leading to the three rungs shown in the example (as well as the one leading to [15:15]) will be refreshed when the number of leaf nodes in the tree reaches 16. (A similar point applies to Reyzin and Yakoubov's "low update frequency" property [28].)

In the extended binary rung strategy, in contrast, rungs remain in the ladder for an extended period during which they are still available for verifying previous authentication paths. Condensed signature refreshes for authentication paths relative to a rung can therefore be staggered. Returning to FIG. 2, [1:8] will no longer be used for producing new authentication paths when the number of leaf nodes reaches 16, but it is not removed until the number reaches 24. For the eight authentication paths associated with [1:8], then, the verifier would have eight leaf node additions in which to make the refresh. Put another way, although a sibling node may not be added until $R+2\gamma_j$, it can be added as early as $R+\gamma_j$. As a result, the verifier can schedule the refreshes so that there are O(log N) refreshes for each and every new leaf node added, not just on average, thus distributing the workload more evenly than in the binary rung strategy.

An Implementation Note. Section 2.6 stated that in the binary rung strategy, because the rung node index pairs can be computed deterministically from N, the index pairs for the rungs may or may not be included in the representation of the ladder. While the same holds for the extended binary rung strategy, it does not necessarily hold for the batched/windowed/cumulative rung strategy, because at varies. According to an embodiment, a standard representation of a ladder should include the index pairs for each rung. (A standard representation of an authentication path should similarly indicate the index pair of its associated rung.) These representations may then also be strategy-independent. MTL mode could be generalized to support different strategies where the signer's side may use strategy-dependent logic. The verifier's side could then be strategy-independent: just identify the associated rung in the ladder and verify the authentication path to it. The signer's side would be strategy-dependent, and intermediaries could either be strategy-dependent or -independent, depending on the extent to which they adapt their processing based on the rung strategy.

F.5 Caching Servers as Condensation Enablers

Although the foregoing discussion has focused on the effect of caching on effective signature size and how to mitigate it, it is also useful to consider that caching servers can play an important role in enabling the efficient use of condensation schemes. Indeed, a caching server that handles condensed signatures effectively can significantly reduce the signature size overhead for the verifiers it interacts with. A caching server can be considered condensation-friendly, in contrast to a server that is condensation-unaware and merely holds condensed signatures. (A server could also be condensation-aware but not "friendly" in the sense that its handling of condensed signatures does not benefit the verifier.)

A caching server's handling of condensed signatures can be one of the factors a signer or a verifier takes into account when choosing whether to interact with a service provider. This point is illustrated returning to the DNS and web use cases, but it is applicable to other cases as well.

In the DNS use case, a client may have multiple choices of recursive DNS service providers. A provider that offers a condensation-friendly recursive DNS service may be more attractive to a client.

In the web use case, a content publisher may have multiple choices of web hosting providers and content distribution networks. A provider that offers a condensation-friendly web hosting service or CDN may similarly be more attractive to the publisher. A CDN may be particularly attractive because it naturally serves as an intermediary between the content publisher's original content and its clients. The original content including certificates can therefore be condensation-unaware, with the CDN handling condensed signature refreshes by interacting with the certification authority or other intermediaries. Indeed, the original certificates may or may not have condensed signatures, so long as the CDN can interact with the CA/intermediary to obtain them.

Along similar lines to the web use case, a DNS zone administrator may have multiple choices of managed DNS service providers. A provider that offers a condensation-friendly managed DNS (i.e., authoritative DNS) service may again be beneficial. The original DNSSEC signatures provided in this case can again be condensation-unaware, so long as the managed DNS service provider can interact with the DNSSEC signing service or an intermediary to condense them. (In practice, the DNSSEC signing service may be operated by the managed DNS service provider or by another party.)

Illustrative Embodiments

One or more embodiments provides a computer-implemented method for providing a condensed signature in a condensation scheme, the method comprising: maintaining a message series; receiving, from a computing device associated with a verifier, a request for a condensed signature associated with an i-th message among the messages in the message series; creating an empty node set associated with the series identifier; adding, for each signature in the signature series associated with the series identifier, at least a leaf node with a determined hash value to the node set associated with the series identifier; computing an authentication path for a node corresponding the i-th message within the node set of a tree-based ladder; and sending, to the computing device associated with the verifier, the computed authentication path as the condensed signature corresponding to the i-th message.

In addition to one or more of the features described herein, or as an alternative, further embodiments of the method may include: accessing a j-th message that is to be signed and added to the message series associated with the series identifier; computing a leaf node hash value corresponding to the j-th message; adding a leaf node corresponding to the j-th message to a node set associated with the series identifier; updating a Merkle tree ladder associated with the series identifier according to a rung strategy; computing an authentication path for the leaf node corresponding to the j-th message within the node set to the Merkle tree ladder associated with the series identifier; computing a sub-signature on the Merkle tree ladder using a signature scheme; and generating a signature associated with the j-th message based on the computed authentication path, the updated Merkle tree ladder, and the computed sub-signature associated with the j-th message.

In addition to one or more of the features described herein, or as an alternative, further embodiments of the method may include that the rung strategy is a binary rung strategy.

In addition to one or more of the features described herein, or as an alternative, further embodiments of the method may include that the message series is associated with a tag, wherein a signature series corresponding to the message series is further associated with the tag, and wherein a Merkle tree ladder is further associated with the series identifier derived from the tag.

In addition to one or more of the features described herein, or as an alternative, further embodiments of the method may include that the tree-based ladder includes a ladder based on a Merkle tree, Verkle tree, or other tree-based structure where a sub-tree is authenticatable by a node.

In addition to one or more of the features described herein, or as an alternative, further embodiments of the method may include: receiving, from the computing device associated with the verifier, a request for a reference value associated with an index k for the message series identified by the series identifier; obtaining a Merkle tree ladder and a sub-signature corresponding to a k-th signature in the signature series associated with the series identifier by parsing the k-th signature; and sending, to the computing device associated with the verifier, a tuple of the obtained Merkle tree ladder and the sub-signature as the reference value.

One or more embodiments provides a computer-implemented method for verifying a message with a condensed signature, method comprising: determining that an index i associated with the message within a message series identified by a series identifier is compatible with a reference value associated with the series identifier; sending, to a computing device, a request for a condensed signature associated with the message, wherein the request comprises the index i; receiving, from the computing device, a condensed signature associated with the message; constructing a signature associated with the message based on the received condensed signature and the reference value; and verifying the message based on the constructed signature and the series identifier.

One or more embodiments provides a computer-implemented method for verifying a message with a condensed signature, the method comprising: determining that an index i associated with the message within a message series identified by a series identifier is not compatible with a reference value associated with the series identifier; sending, in response to the determination, to a computing device, a request for a reference value associated with the series identifier, wherein the request comprises an index k; receiving, from the computing device associated, the reference value associated with the series identifier; constructing a signature associated with the message based on the received reference value and the received condensed signature; and verifying the message based on the constructed signature and the series identifier.

Use of language, such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

Embodiments illustrated under any heading or in any portion of the disclosure may be combined with embodiments illustrated under the same or any other heading or other portion of the disclosure unless otherwise indicated herein or otherwise clearly contradicted by context.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

REFERENCES

[1] *Post-Quantum Cryptography Standardization*. NIST. https://csrc.nist.gov/projects/post-quantum-cryptography/post-quantum-cryptography-standardization. Accessed Oct. 11, 2022.

[2] Alagic, G., D. Apon, D. Cooper et al. *NIST IR* 8413-*upd*1*: Status Report on the Third Round of the NIST Post-Quantum Cryptography Standardization Process*. NIST, July 2022; includes updates as of Sep. 26, 2022. https://doi.org/10.6028/NIST.IR.8413-upd1.

[3] Cooper, D. A., D. Apon, Q. H. Dang et al. *NIST Special Publication* 800-208*: Recommendation for Stateful Hash-Based Signature Schemes*. NIST, October 2020. https://doi.org/10.6028/NIST.SP.800-208.

[4] National Security Agency. *Announcing the Commercial National Security Algorithm Suite* 2.0. September 2022. https://media.defense.gov/2022/Sep/07/2003071834/-1/-1/0/CSA_CNSA_2.0_ALGORITHMS_.PDF. Accessed Oct. 11, 2022.

[5] *Migration to Post-Quantum Cryptography*. NIST National Cybersecurity Center of Excellence. https:// www.nccoe.nist.gov/crypto-agility-considerations-migrating-post-quantum-cryptographic-algorithms. Accessed Oct. 11, 2022.

[6] Wouters, P. and O. Sury. *Algorithm Implementation Requirements and Usage Guidance for DNSSEC*. IETF RFC 8624, DOI 10.17487/RFC8624, June 2019. https://www.rfc-editor.org/info/rfc8624.

[7] Cooper, D., Santesson, S., Farrell, S., Boeyen, S., Housley, R., Polk, W.: RFC 5280, Internet X.509 Public Key Infrastructure Certificate and Certificate Revocation List (CRL) Profile. IETF (2008). https://doi.org/10.17487/RFC5280.

[8] Arends, R., Austein, R., Larson, M., Massey, D., Rose, S.: DNS Security Introduction and Requirements. IETF (2005). https://doi.org/10.17487/RFC4033.

[9] Laurie, B., E. Messeri and R. Stradling. *Certificate Transparency Version* 2.0. IETF RFC 9162, DOI 10.17487/RFC9162, December 2021. https://www.rfc-editor.org/info/rfc9162.

[10] Merkle, R. *Secrecy, Authentication, and Public Key Systems*. Ph.D. thesis, Stanford University, 1979.

[11] FIPS PUB 81*: DES Modes of Operation*. National Bureau of Standards, U.S. Department of Commerce, Dec. 2, 1980. https://doi.org/10.6028/NBS.FIPS.81.

[12] Abe, M., M. Chase, B. David et al. Constant-size structure-preserving signatures: Generic constructions and simple assumptions. *Journal of Cryptology* 29(4): 833-878. Springer, 2016. https://doi.org/10.1007/s00145-015-9211-7.

[13] Yuan, Q., M. Tibouchi and M. Abe. Security notions for stateful signature schemes. *IET Information Security* 16(1): 1-17. Wiley Online Library, 2022. https://doi.org/10.1049/ise2.12040.

[14] Stern, J., D. Pointcheval, J. Malone-Lee and N.P. Smart. Flaws in applying proof methodologies to signature schemes. In *Advances in Cryptology—CRYPTO* 2002, pages 93-110. Springer, 2002. https://doi.org/10.1007/3-540-45708-9_7.

[15] Decker, C., Wattenhofer, R.: Bitcoin transaction malleability and MtGox. In: Kutyłowski, M., Vaidya, J. (eds.) Computer Security—ESORICS 2014, LNCS, vol. 8173, pp. 313-326. Springer, Cham (2014). https://doi.org/10.1007/978-3-319-11212-1_18.

[16] Bai, S., L. Ducas, E. Kiltz, et al. *CRYSTALS-Dilithium Algorithm Specifications and Supporting Documentation* (*Version* 3.1). Feb. 8, 2021. https://pq-crystals.org/dilithium/data/dilithium-specification-round3-20210208.pdf. Accessed Oct. 11, 2022.

[17] Fouque P.-A., J. Hoffstein, P. Kirchner, et al. *Falcon: Fast-Fourier Lattice-based Compact Signatures over NTRU Specification v*1.2. Jan. 10, 2020. https://falcon-sign.info/falcon.pdf. Accessed Oct. 11, 2022.

[18] Aumasson, J.-P., D. J. Bernstein, W. Beullens, et al. *SPHINCS$^+$ Submission to the NIST post-quantum project, v*.3.1. Jun. 10, 2022. https://sphincs.org/data/sphincs+-r3.1-specification.pdf. Accessed Oct. 11, 2022.

[19] McGrew, D., M. Curcio and S. Fluhrer. *Leighton-Micali Hash-Based Signatures*. IETF RFC 8554, DOI 10.17487/RFC8554, April 2019. https://www.rfc-editor.org/info/rfc8554.

[20] Huelsing, A., D. Butin, S. Gazdag et al. *XMSS: extended Merkle Signature Scheme*. IETF RFC 8391, DOI 10.17487/RFC8391, May 2018. https://www.rfc-editor.org/info/rfc8391. Barker, W., Polk, W., Souppaya, M.: Getting Ready for Post-Quantum Cryptography:

[21] Exploring Challenges Associated with Adopting and Using Post-Quantum Cryptographic Algorithms, NIST Cybersecurity White Paper, 2021 Apr. 28. https://doi.org/10.6028/NIST.CSWP.04282021.

[22] Driscoll, F.: Terminology for Post-Quantum Hybrid Schemes, Traditional https://datatracker.ietf.org/doc/draft-driscoll-pqt-hybrid-terminology, last accessed 2022 Oct. 18. Work in progress.

[23] Champine, L.: Streaming Merkle Proofs within Binary Numeral Trees. In: Cryptology ePrint Archive, Paper 2021/038. https://eprint.iacr.org/2021/038, last accessed 2022 Oct. 18.

[24] Crosby, S., Wallach, D.: Efficient data structures for tamper-evident logging. In Proceedings of the 18th USENIX Security Symposium, pp. 317-334. USENIX Association (2009). https://dl.acm.org/doi/abs/10.5555/1855768.1855788.

[25] Todd, P.: Merkle Mountain Ranges, https://github.com/opentimestamps/opentimestamps-server/blob/master/doc/merkle-mountain-range.md, last accessed 2022 Oct. 18.

[26] Bünz, B., Kiffer, L., Luu, L., Zamani, M.: FlyClient: Super-light clients for cryptocurrencies. In: 2020 IEEE Symposium on Security and Privacy (SP), pp. 928-946. IEEE (2020), https://doi.org/10.1109/SP40000.2020.00049.

[27] Benaloh, J., de Mare, M.: One-way accumulators: A decentralized alternative to digital signatures. In: Helleseth, T. (ed.) Advances in Cryptology—EUROCRYPT '93, LNCS, vol. 765, pp. 274-285. Springer, Berlin, Heidelberg (1993). https://doi.org/10.1007/3-540-48285-7_24.

[28] Reyzin, L., Yakoubov, S.: Efficient asynchronous accumulators for distributed PKI. In: Zikas, V., De Prisco, R. (eds) Security and Cryptography for Networks, SCN 2016, LNCS, vol. 9841, pp. 292-309. Springer, Cham, 2016. https://doi.org/10.1007/978-3-319-44618-9_16.

[29] Kuszmaul, J.: Verkle Trees, https://math.mit.edu/research/highschool/primes/materials/2018/Kuszmaul.pdf, last accessed 2022 Oct. 18.

[30] Buterik, V.: Verkle Trees, https://vitalik.ca/general/2021/06/18/verkle.html, last accessed 2022 Oct. 18.

[31] Catalano, D., Fiore, D.: Vector commitments and their applications. In: Kurosawa, K., Hanaoka, G. (eds.) Public-Key Cryptography—PKC 2013, LNCS, vol. 7778, pp. 55-72. Springer, Berlin, Heidelberg (2013). https://doi.org/10.1007/978-3-642-36362-7_5. Peikert, C., Pepin, Z., Sharp, C.: Vector and functional commitments from lattices. In:

[32] Nissim, K., Waters, B. (eds.) Theory of Cryptography, TCC 2021, LNCS, vol. 13044, pp. 480-511. Springer, Cham (2021). https://doi.org/10.1007/978-3-030-90456-2_16.

[33] Ben-Sasson, E., Bentov, I., Horesh, Y., Riabzev, M.: Scalable, Transparent, and Post-Quantum Secure Computational Integrity. In: Cryptology ePrint Archive, Paper 2018/046, https://eprint.iacr.org/2018/046, last accessed 2022 Oct. 18.

[34] Boneh, D., Gentry, C., Lynn, B., Shacham, H.: Aggregate and verifiably encrypted signatures from bilinear maps. In: Biham, E. (ed.) Advances in Cryptology—EUROCRYPT 2003, LNCS, vol. 2656, pp. 416-432. Springer, Berlin, Heidelberg (2003). https://doi.org/10.1007/3-540-39200-9_26.

[35] Khaburzaniya, I., Konstantinos, C., Lewi, K., Malvai, H.: Aggregating and thresholdizing hash-based signatures using STARKs. In: Proceedings of the 2022 ACM on Asia Conference on Computer and Communications Security, pp. 393-407. ACM, New York (2022). https://doi.org/10.1145/3488932.3524128.
[36] Goyal, R., Vaikuntanathan, V.: Locally Verifiable Signature and Key Aggregation, In: Cryptology ePrint Archive, Paper 2022/179, https://eprint.iacr.org/2022/179, last accessed 2022 Oct. 18. To appear, Advances in Cryptology—CRYPTO 2022.
[37] Li, F., Yi, K., Hadjieleftheriou, M., Kollios, G.: Proof-infused streams: Enabling authentication of sliding window queries on streams. In: Proceedings of the 33rd International Conference on Very Large Data Bases, pp. 147-158. VLDB Endowment (2007). https://dl.acm.org/doi/10.5555/1325851.1325871.
[38] Papamanthou, C., Shi, E., Tamassia, R., Yi, K.: Streaming authenticated data structures. In: Johansson, T., Nguyen, P. Q. (eds.) Advances in Cryptology—EUROCRYPT 2013, LNCS, vol. 7881, pp. 353-370. Springer, Berlin, Heidelberg (2013). https://doi.org/10.1007/978-3-642-38348-9_22.
[39] Chase, M., Kohlweiss, M., Lysyanskaya, A., Meiklejohn, S.: Malleable signatures: New definitions and delegatable anonymous credentials. In 2014 IEEE 27th Computer Security Foundations Symposium, pp. 199-213. IEEE (2014). https://doi.org/10.1109/CSF.2014.22.
[40] Ahn, J. H., Boneh, D., Camenisch, J., Hohenberger, S., Shelat, A., Waters, B.: Computing on authenticated data. Journal of Cryptology 28(2), 351-395. https://doi.org/10.1007/s00145-014-9182-0.
[41] Attrapadung, N., Libert, B., Peters, T.: Computing on authenticated data: New privacy definitions and constructions. In: Wang, X., Sako, K. (eds) Advances in Cryptology—ASIACRYPT 2012, LNCS, vol. 7658, pp. 367-385. Springer, Berlin, Heidelberg (2012). https://doi.org/10.1007/978-3-642-34961-4_23.
[42] Sikeridis, D., Kampanakis, P., Devetsikiotis, M.: Post-quantum authentication in TLS 1.3: a performance study. In: Network and Distributed Systems Security (NDSS) Symposium 2020, The Internet Society (2020). https://dx.doi.org/10.14722/ndss.2020.24203.
[43] Sikeridis, D., Huntley, S., Ott, D., Devetsikiotis, M.: Intermediate Certificate Suppression in Post-Quantum TLS: An Approximate Membership Querying Approach, In: Cryptology ePrint Archive, Paper 2022/1556, https://eprint.iacr.org/2022/1556, last accessed 2022 Nov. 14. To appear, 18th International Conference on Emerging Networking EXperiments and Technologies (CoNEXT '22).
[44] Kudinov, M., Hülsing, A., Ronen, E. Yogev, E., SPHINCS+ C: Compressing SPHINCS+ With (Almost) No Cost, In: Cryptology ePrint Archive, Paper 2022/778, https://eprint.iacr.org/2022/778, last accessed 2022 Nov. 18.
[45] Baldimtsi, F., Chalkias, K., Chatzigiannis, P., Kelkar, M.: Truncator: Time-space Tradeoff of Cryptographic Primitives, In: Cryptology ePrint Archive, Paper 2022/1581, https://eprint.iacr.org/2022/1581, last accessed 2022 Nov. 18.
[46] Draft Call for Additional Digital Signature Schemes for the Post-Quantum Cryptography Standardization Process, NIST, https://csrc.nist.gov/csrc/media/Projects/pqc-dig-sig/documents/call-for-proposals-dig-sig-sept-2022.pdf, last accessed 2022 Oct. 18.
[47] FIPS PUB 180-4: Secure Hash Standard. NIST (2015). https://doi.org/10.6028/NIST.FIPS.180-4.
[48] Hülsing, A., Rijneveld, J., Song, F.: Mitigating multi-target attacks in hash-based signatures. In: Cheng, CM., Chung, KM., Persiano, G., Yang, BY. (eds) Public-Key Cryptography—PKC 2016, LNCS, vol. 9614, pp. 387-416. Springer, Berlin, Heidelberg, 2016. https://doi.org/10.1007/978-3-662-49384-7_15.
[49] Sloane, N. J. A.: The ruler function: 2^a(n) divides 2n. Or, a (n)=2-adic valuation of 2n. In: The On-Line Encyclopedia of Integer Sequences, Entry A001511, https://oeis.org/A001511, last accessed 2022 Oct. 18.
[50] Sloane, N. J. A., Wilks, A.: a (n)=a (floor (n/2))+n; also denominators in expansion of 1/sqrt(1−x) are 2^a(n); also 2n−number of 1's in binary expansion of 2n. In: The On-Line Encyclopedia of Integer Sequences, Entry A005187, https://oeis.org/A005187, last accessed 2022 Oct. 18.
[51] Schwabe, P., D. Stebila and T. Wiggers. Post-quantum TLS without handshake signatures. In *Proceedings of the* 2020 *ACM SIGSAC Conference on Computer and Communications Security*, pages 1461-1480. ACM, 2020. https://dl.acm.org/doi/abs/10.1145/3372297.3423350.

What is claimed is:

1. A computer-implemented method for forming a data structure comprising:

generating, by a signer, a hash-based data authentication structure;

selecting a first strategy, wherein the first strategy comprises a process for updating a first data structure;

forming, by the signer, the first data structure according to the first strategy, wherein the first data structure comprises one or more node hash values and is configured for verifying digital signatures relative to the hash-based data authentication structure, and wherein the one or more node hash values are associated with one or more nodes of the hash-based data authentication structure; and publishing the first data structure for access by a verifier, wherein the verifier comprises a processor that is configured to determine whether the first data structure is capable of verifying a digital signature and to either:

use the first data structure to verify the digital signature or access a subsequently published second data structure that has been updated according to the first strategy to verify the digital signature.

2. The computer-implemented method of claim 1, wherein the hash-based data authentication structure is a tree structure.

3. The computer-implemented method of claim 1, wherein the hash-based data authentication structure is a tree structure that changes over time.

4. The computer-implemented method of claim 1, wherein the first strategy comprises a full strategy, a single strategy, a basic binary strategy, an extended binary strategy, a spaced strategy, a variable spaced strategy, a bounded strategy, a spaced and bounded strategy, a spaced extended binary strategy, or a bounded extended binary strategy.

5. The computer-implemented method of claim 1, wherein the first data structure is formed during a batch process.

6. The computer-implemented method of claim 1, wherein the first data structure is a set of nodes that collectively spans each of a plurality of leaf nodes.

7. The computer-implemented method of claim 6, wherein each node of the set of nodes is represented as a tuple comprising a lowest index of any node descendants of the node, a highest index of any node descendants of the node, and a hash value for the node, wherein indexes for the set of nodes is used to locate a node within a memory or a storage medium.

8. The computer-implemented method of claim 6, wherein the process for updating the first data structure comprises a process for updating the first data structure as new leaf nodes are added and for choosing which individual nodes in the set of nodes to use in an authentication path.

9. The computer-implemented method of claim 1, wherein the first strategy is a binary strategy.

10. A system comprising one or more processors and one or more non-transitory computer-readable media storing computer-executable instructions that, when executed, cause the system to perform operations comprising:

generating, by a signer, a hash-based data authentication structure;

selecting a first strategy, wherein the first strategy comprises a process for updating a first data structure;

forming, by the signer, the first data structure according to the first strategy, wherein the first data structure comprises one or more node hash values and is configured for verifying digital signatures relative to the hash-based data authentication structure, and wherein the one or more node hash values are associated with one or more nodes of the hash-based data authentication structure; and publishing the first data structure for access by a verifier, wherein the verifier comprises a processor that is configured to determine whether the first data structure is capable of verifying a digital signature and to either:

use the first data structure to verify the digital signature or access a subsequently published second data structure that has been updated according to the first strategy to verify the digital signature.

11. The system of claim 10, wherein the hash-based data authentication structure is a tree structure.

12. The system of claim 10, wherein the hash-based data authentication structure is a tree structure that changes over time.

13. The system of claim 10, wherein the first strategy comprises a full strategy, a single strategy, a basic binary strategy, an extended binary strategy, a spaced strategy, a variable spaced strategy, a bounded strategy, a spaced and bounded strategy, a spaced extended binary strategy, or a bounded extended binary strategy.

14. The system of claim 10, wherein the first data structure is formed during a batch process.

15. The system of claim 10, wherein the first data structure is a set of nodes that collectively spans each of a plurality of leaf nodes.

16. One or more non-transitory computer-readable media storing instructions that, when executed by one or more processors, cause the one or more processors to perform operations comprising:

generating, by a signer, a hash-based data authentication structure;

selecting a first strategy, wherein the first strategy comprises a process for updating a first data structure;

forming, by the signer, the first data structure according to the first strategy, wherein the first data structure comprises one or more node hash values and is configured for verifying digital signatures relative to the hash-based data authentication structure, and wherein the one or more node hash values are associated with one or more nodes of the hash-based data authentication structure; and publishing the first data structure for access by a verifier, wherein the verifier comprises a processor that is configured to determine whether the first data structure is capable of verifying a digital signature and to either:

use the first data structure to verify the digital signature or access a subsequently published second data structure that has been updated according to the first strategy to verify the digital signature.

17. The one or more non-transitory computer-readable media of claim 10, wherein the hash-based data authentication structure is a tree structure.

18. The one or more non-transitory computer-readable media of claim 10, wherein the hash-based data authentication structure is a tree structure that changes over time.

19. The one or more non-transitory computer-readable media of claim 10, wherein the first strategy comprises a full strategy, a single strategy, a basic binary strategy, an extended binary strategy, a spaced strategy, a variable spaced strategy, a bounded strategy, a spaced and bounded strategy, a spaced extended binary strategy, or a bounded extended binary strategy.

20. The one or more non-transitory computer-readable media of claim 10, wherein the first data structure is formed during a batch process.

* * * * *